US012786502B2

(12) United States Patent
Dong et al.

(10) Patent No.: US 12,786,502 B2
(45) Date of Patent: Nov. 3, 2026

(54) DISPLAY DEVICE, AND METHOD FOR DISPLAYING CONTENT FROM EXTERNAL DEVICE

(71) Applicant: HISENSE VISUAL TECHNOLOGY CO., LTD., Qingdao (CN)

(72) Inventors: Ting Dong, Qingdao (CN); Zhiyong Zhang, Qingdao (CN); Yu Duan, Qingdao (CN); Laizhi Zhang, Qingdao (CN); Jingxian Wang, Qingdao (CN); Wenwen Gao, Qingdao (CN); Rongbo Zhang, Qingdao (SD); Zhaofeng Pian, Qingdao (CN); Jinliang Hou, Qingdao (CN)

(73) Assignee: HISENSE VISUAL TECHNOLOGY CO., LTD., Qingdao (CN)

( * ) Notice: Subject to any disclaimer, the term of this patent is extended or adjusted under 35 U.S.C. 154(b) by 245 days.

(21) Appl. No.: 18/615,380

(22) Filed: Mar. 25, 2024

(65) Prior Publication Data

US 2024/0264720 A1 Aug. 8, 2024

Related U.S. Application Data

(63) Continuation of application No. PCT/CN2022/109146, filed on Jul. 29, 2022.

(30) Foreign Application Priority Data

Oct. 29, 2021 (CN) ......................... 202111275373.6
Nov. 11, 2021 (CN) ......................... 202111331354.0
(Continued)

(51) Int. Cl.
*H04N 21/431* (2011.01)
*G06F 3/0482* (2013.01)
(Continued)

(52) U.S. Cl.
CPC ......... *H04N 21/431* (2013.01); *G06F 3/0482* (2013.01); *G06F 3/0483* (2013.01);
(Continued)

(58) Field of Classification Search
CPC ............. H04N 21/431; H04N 21/4622; H04N 21/482; H04N 21/485; G06F 3/0482; G06F 3/0483; G06F 3/0484; G06F 3/0489
See application file for complete search history.

(56) References Cited

U.S. PATENT DOCUMENTS

2006/0036568 A1* 2/2006 Moore .................. G06F 16/168
2007/0124764 A1* 5/2007 Morris ............. H04N 21/47202 725/37
(Continued)

FOREIGN PATENT DOCUMENTS

CN 101425307 A 5/2009
CN 101657789 A 2/2010
(Continued)

OTHER PUBLICATIONS

The State Intellectual Property Office of People's Republic of China The First Office Action for Chinese Application 202111275373.6 Apr. 4, 2024 16 Pages (With Translation).
(Continued)

*Primary Examiner* — Justin R. Blaufeld
(74) *Attorney, Agent, or Firm* — ANOVA LAW GROUP, PLLC

(57) ABSTRACT

The present application provides a display apparatus and a method. The display apparatus, comprises: a display; a communicating device: one or more processors configured to execute instructions to cause the display apparatus to: receive a first command on a first user interface from a user, wherein the first user interface is a user interface corre-
(Continued)

sponding to content from a first external device, the first command is used for indicating to present a first shortcut list, and the first shortcut list comprises device names of one or more external devices; in response to the first command, present the first shortcut list on the first user interface; receive a first selection command for indicating to present content from a second external device different from the first external device.

16 Claims, 35 Drawing Sheets

(30) Foreign Application Priority Data

Nov. 30, 2021 (CN) ......................... 202111441953.8
Dec. 20, 2021 (CN) ......................... 202111563203.8

(51) Int. Cl.
*G06F 3/0483* (2013.01)
*G06F 3/0484* (2022.01)
*G06F 3/0489* (2022.01)
*H04N 21/462* (2011.01)
*H04N 21/482* (2011.01)
*H04N 21/485* (2011.01)

(52) U.S. Cl.
CPC .......... *G06F 3/0484* (2013.01); *G06F 3/0489* (2013.01); *H04N 21/4622* (2013.01); *H04N 21/482* (2013.01); *H04N 21/485* (2013.01)

(56) References Cited

U.S. PATENT DOCUMENTS

2008/0088741 A1 4/2008 Kitajima
2010/0228740 A1* 9/2010 Cannistraro ........... G06Q 30/00 707/E17.101
2011/0138295 A1* 6/2011 Momchilov ............ G06F 9/452 715/740
2014/0173510 A1* 6/2014 Kanno .................... G06F 1/187 715/808
2014/0181655 A1* 6/2014 Kumar .................. G06F 3/0488 715/716
2014/0362294 A1* 12/2014 Majid ................ H04N 21/4312 348/564
2015/0100982 A1 4/2015 Sirpal et al.
2016/0048319 A1* 2/2016 Micheva ............... G06F 3/0482 715/863
2017/0162210 A1 6/2017 Cui et al.
2017/0242713 A1* 8/2017 Darie .................... G06F 11/302
2020/0233548 A1* 7/2020 Baker ................... G06F 3/0482
2024/0264720 A1* 8/2024 Dong ...................... G06F 3/023
2024/0329748 A1* 10/2024 Maeda ...................... G06F 3/01

FOREIGN PATENT DOCUMENTS

CN 102387422 A 3/2012
CN 104735365 A 6/2015
CN 105392047 A 3/2016
CN 106162378 A 11/2016
CN 107390982 A * 11/2017 ......... G06F 3/04817
CN 107870963 A 4/2018
CN 305053912 S 3/2019
CN 111447479 A * 7/2020 ......... H04N 21/8166
CN 111669634 A 9/2020
CN 112181907 A 1/2021
CN 112527737 A 3/2021
CN 112584211 A 3/2021
CN 113542851 A 10/2021
CN 113810747 A 12/2021
CN 114007119 A 2/2022
CN 114168242 A 3/2022
KR 101911379 B1 10/2018
WO 2017181598 A1 10/2017

OTHER PUBLICATIONS

The State Intellectual Property Office of People's Republic of China The First Office Action for Chinese Application 202111563203.8 Sep. 26, 2024 22 Pages (With Translation).
The World Intellectual Property Organization (WIPO) International Search Report for PCT/CN2022/109146 Oct. 28, 2022 6 Pages (including translation).
China National Intellectual Property Administration (CNIPA) Office Action 1 for Application No. 202111441953.8 Aug. 26, 2025 21 Pages (including translation).

* cited by examiner

DISPLAY DEVICE, AND METHOD FOR DISPLAYING CONTENT FROM EXTERNAL DEVICE

CROSS-REFERENCE OF RELATED APPLICATIONS

The application is a continuation application of PCT/CN2022/109146 filed on Jul. 29, 2022, which claims priorities to Chinese Patent Application No. 202111275373.6 filed on Oct. 29, 2021, Chinese Patent Application No. 202111331354.0 filed on Nov. 11, 2021, Chinese Patent Application No. 202111441953.8 filed on Nov. 30, 2021, and Chinese Patent Application No. 202111563203.8 filed on Dec. 20, 2021, all of which are hereby incorporated by reference in their entireties.

TECHNICAL FIELD

The disclosure relates to the technical field of intelligent display apparatus, in particular to a display apparatus and a method for presenting content from an external device.

BACKGROUND

The display apparatus can refer to a terminal device that can output a specific display image, and may be a smart television (TV), a mobile terminal, a smart advertising screen, a projector or other terminal devices. Taking the smart TV as an example, the smart TV is a TV product based on Internet application technology, with an open operating system and a chip, and having an open software platform, which can realize a bidirectional human-computer interaction function, and integrate video, entertainment, data and other functions to meet diverse and personalized needs of users.

The display apparatus can be connected with an external device, for example, an external local device such as a U disk, a mobile hard disk, etc., and an external network device such as a Digital Living Network Alliance (DLNA) device, etc., and can provide richer media resources for a user through these external devices. The display apparatus typically uses a specific application, such as a Data Management Platform (DMP) application, to manage these external devices. In practical applications, the user needs to interact with the display apparatus for many times to present the content from the external device, which is cumbersome and inefficient.

SUMMARY

In a first aspect, the disclosure provides a display apparatus including: a display, configured to present content from an external device or a user interface; a communicating device, configured to connect with one or more external devices; one or more processors in connection with the display and the communicating device and configured to execute instructions to cause the display apparatus to: receive a first command on a first user interface from a user, wherein the first user interface is a user interface corresponding to content from a first external device, the first command is used for indicating to present a first shortcut list, and the first shortcut list includes device names of one or more external devices in connection with the display apparatus; in response to the first command, present the first shortcut list on the first user interface; receive a first selection command for indicating to present content from a second external device different from the first external device, wherein a device name of the second external device is in the first shortcut list; and in response to the first selection command, switch the first user interface to a second user interface which is a user interface corresponding to the content from the second external device.

In a second aspect, the disclosure provides a method performed by a display apparatus, including: receiving a first command on a first user interface from a user, wherein the first user interface is a user interface corresponding to content from a first external device, the first command is used for indicating to present a first shortcut list, and the first shortcut list includes device names of one or more external devices in connection with the display apparatus; in response to the first command, presenting the first shortcut list on the first user interface; receiving a first selection command for indicating to present content from a second external device different from the first external device, wherein a device name of the second external device is in the first shortcut list; and in response to the first selection command, switching the first user interface to a second user interface which is a user interface corresponding to the content from the second external device.

DETAILED DESCRIPTION

Embodiments will be described in detail below, example of which are illustrated in accompanying drawings. When the following description can refer to the drawings, the same numerals in different drawings indicate the same or similar element, unless otherwise indicated. Embodiments described below are not intended to represent all embodiments, but merely examples of systems and methods consistent with some aspects of the disclosure as detailed in the claims.

It should be noted that the brief description of terms in the disclosure is only for the convenience of understanding embodiments described below, and is not intended to limit embodiments of the disclosure. Unless otherwise indicated, these terms should be interpreted according to their ordinary and usual meaning.

Figure 1:
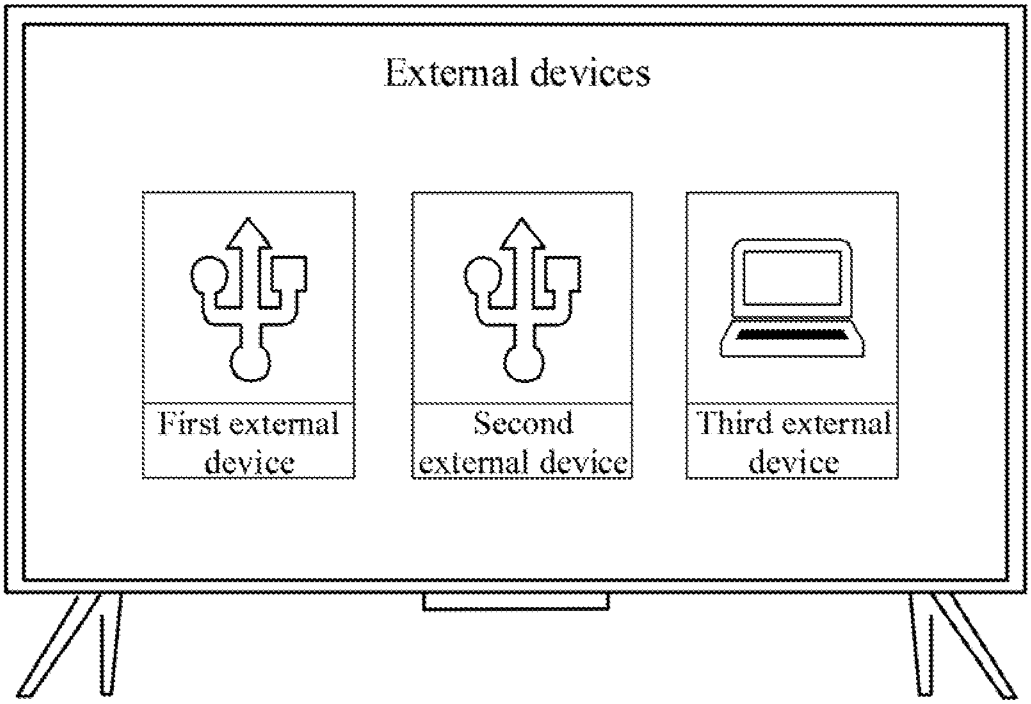
FIG. 1 is a schematic diagram of an external device list.

Display apparatuses typically can use a specific application, such as a Data Management Platform (DMP) application, to manage these external devices. After the user can control the display apparatus to enter the DMP application, an external device list as shown in FIG. 1 is presented, the external device list can present device names of all external devices currently connected with the display apparatus, and the user issues a selection command to the display apparatus through a control device such as a remote controller, so that the display apparatus can present a user interface for showing content from a selected external device (for example, a first external device). In this case, if the user wants to browse a content from another external device (for example, a second external device), it is necessary to select the second external device from the external device list as shown in FIG. 1. In some embodiments, the user may exit the DMP application completely and re-enter the DMP application to make the display apparatus present the external device list as shown in FIG. 1 again, and select a second external device from the external device list to present the content from the second external device. In another embodiment, the user issues multiple back commands to the display apparatus through the control device, so that the display apparatus backs to the external device list as shown in FIG. 1 in sequence from a current user interface, and selects a second external device from the external device list to present the content from the second external device. It can be seen that the user needs to interact with the display apparatus for many times to present the content from the external device, which is cumbersome and inefficient.

Figure 2:
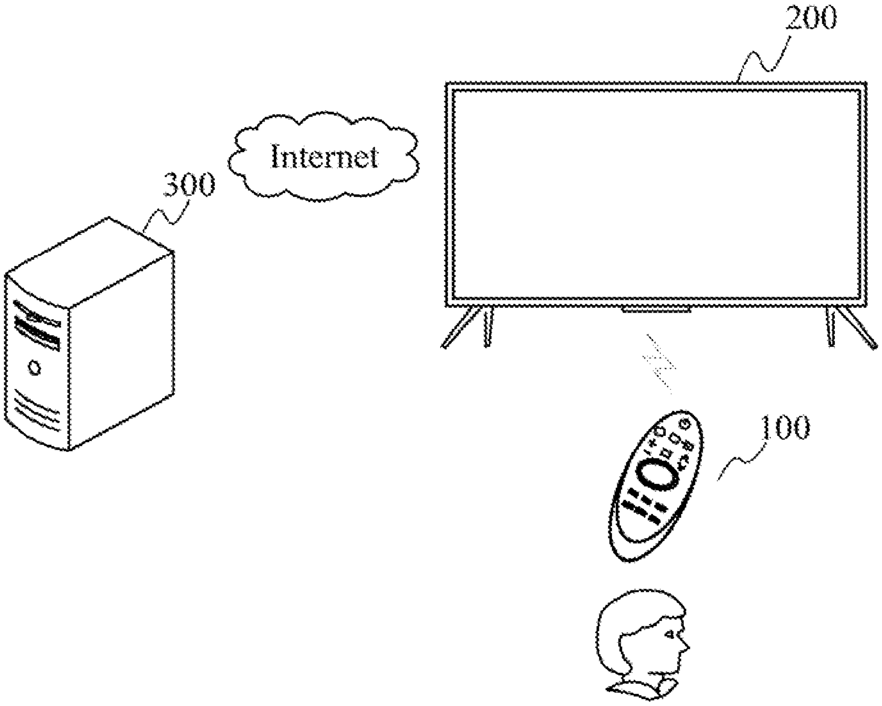
FIG. 2 is a usage scenario of a display apparatus according to some embodiments of the disclosure.

FIG. 2 is a schematic diagram of a usage scenario of a display apparatus according to some embodiments. As shown in FIG. 2, the display apparatus 200 may perform Internet communication with a server 300, and the user may operate the display apparatus 200 through the control device 100.

In some embodiments, the control device 100 may be a remote control, and communication between the remote control and the display apparatus can include at least one of infrared protocol communication or Bluetooth protocol communication, or other short-distance communication methods. The display apparatus 200 can be controlled by wireless or wired methods. The user may control the display apparatus 200 by inputting at least one command through a key on the remote control, a voice input, a control panel input, etc.

Figure 3:
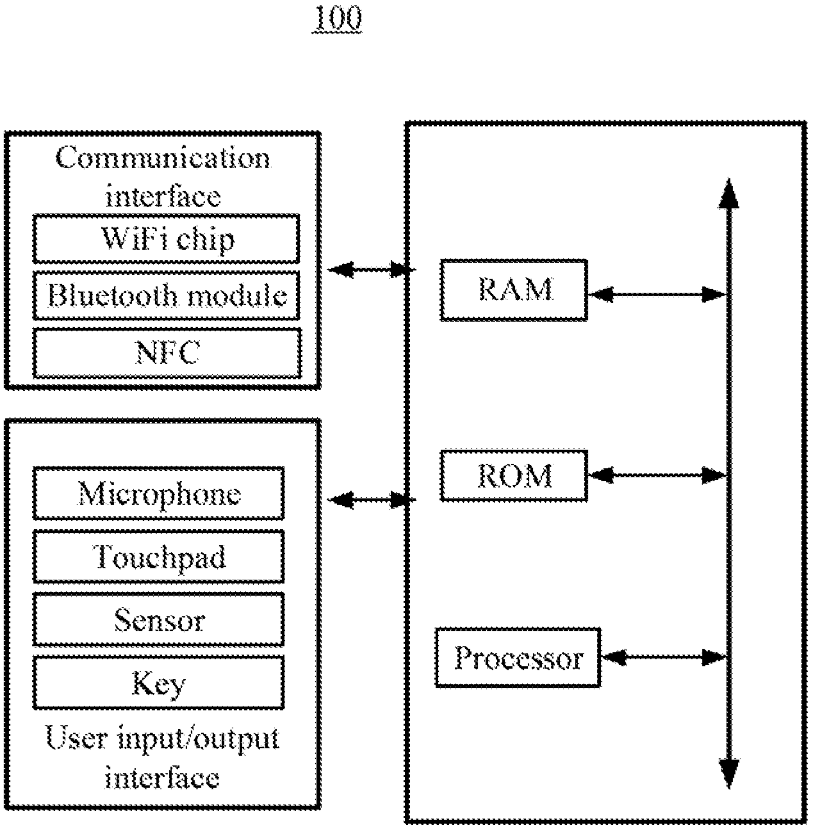
FIG. 3 is a block diagram of a hardware configuration of a control device according to some embodiments of the disclosure.

In some embodiments, the control device 100 may also be a mobile terminal, such as a mobile phone, and communication between the mobile terminal and the display apparatus 200 can include at least one of Internet protocol communication or Bluetooth protocol communication, other short-distance communication or long-distance communication methods. The user may control the display apparatus 200 by inputting at least one user command through a key on the mobile terminal, a voice input, a control panel input, etc. FIG. 3 is a block diagram of a configuration of a control device 100 taking the remote controller as an example. As shown in FIG. 3, the control device 100 can include a processor, a communication interface, a user input/output interface, a memory, and a power supply.

Figure 4:
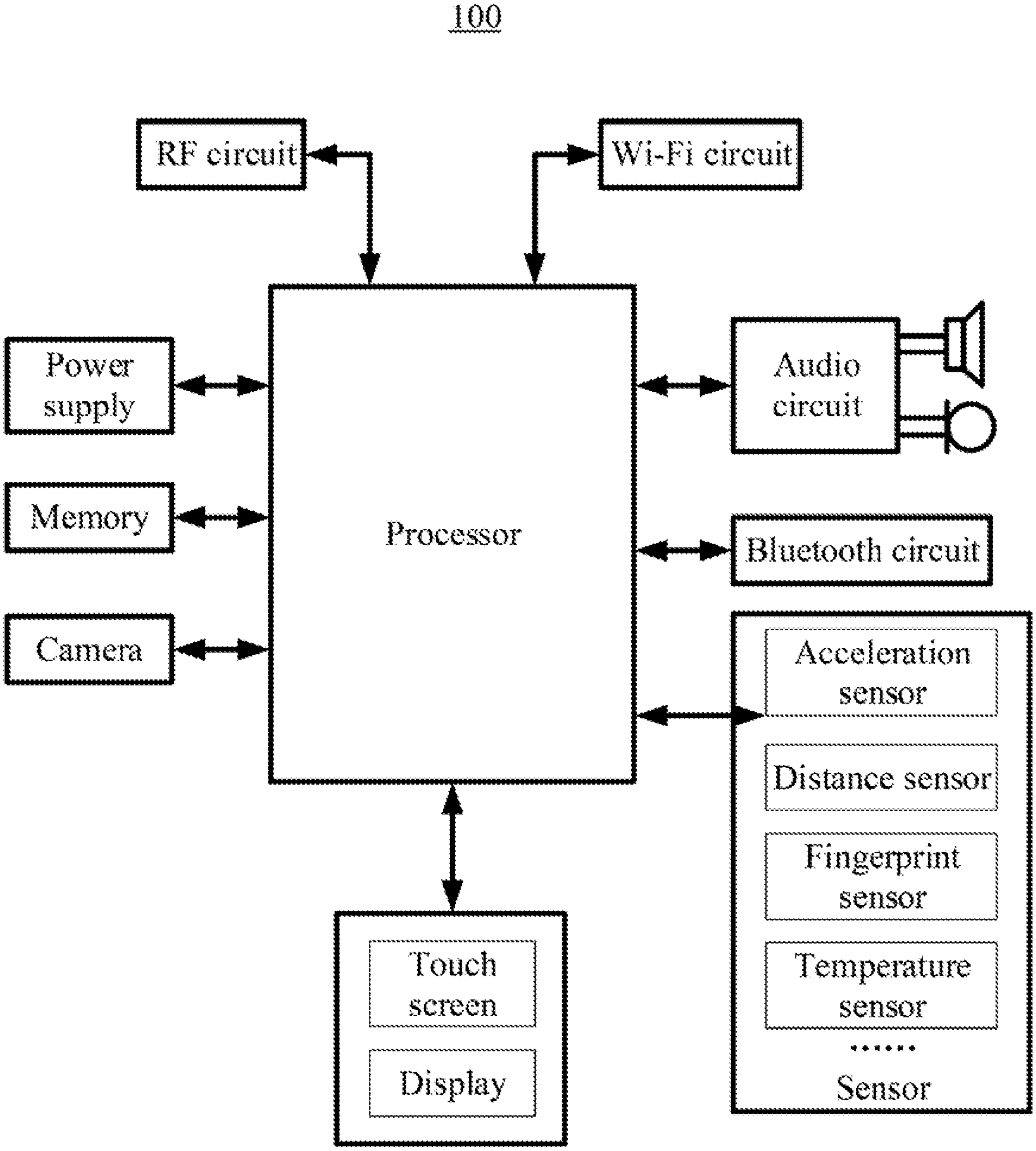
FIG. 4 is a block diagram of a hardware configuration of a control device according to some embodiments of the disclosure.

FIG. 4 is a block diagram of a configuration of a control device 100 taking a mobile terminal as an example. As shown in FIG. 4, the control device 100 can include at least one of components such as a radio frequency (RF) circuit, a memory, a display unit, a camera, a sensor, an audio circuit, a Wireless Fidelity (Wi-Fi) circuit, a processor, a Bluetooth circuit or a power supply.

Figure 5:
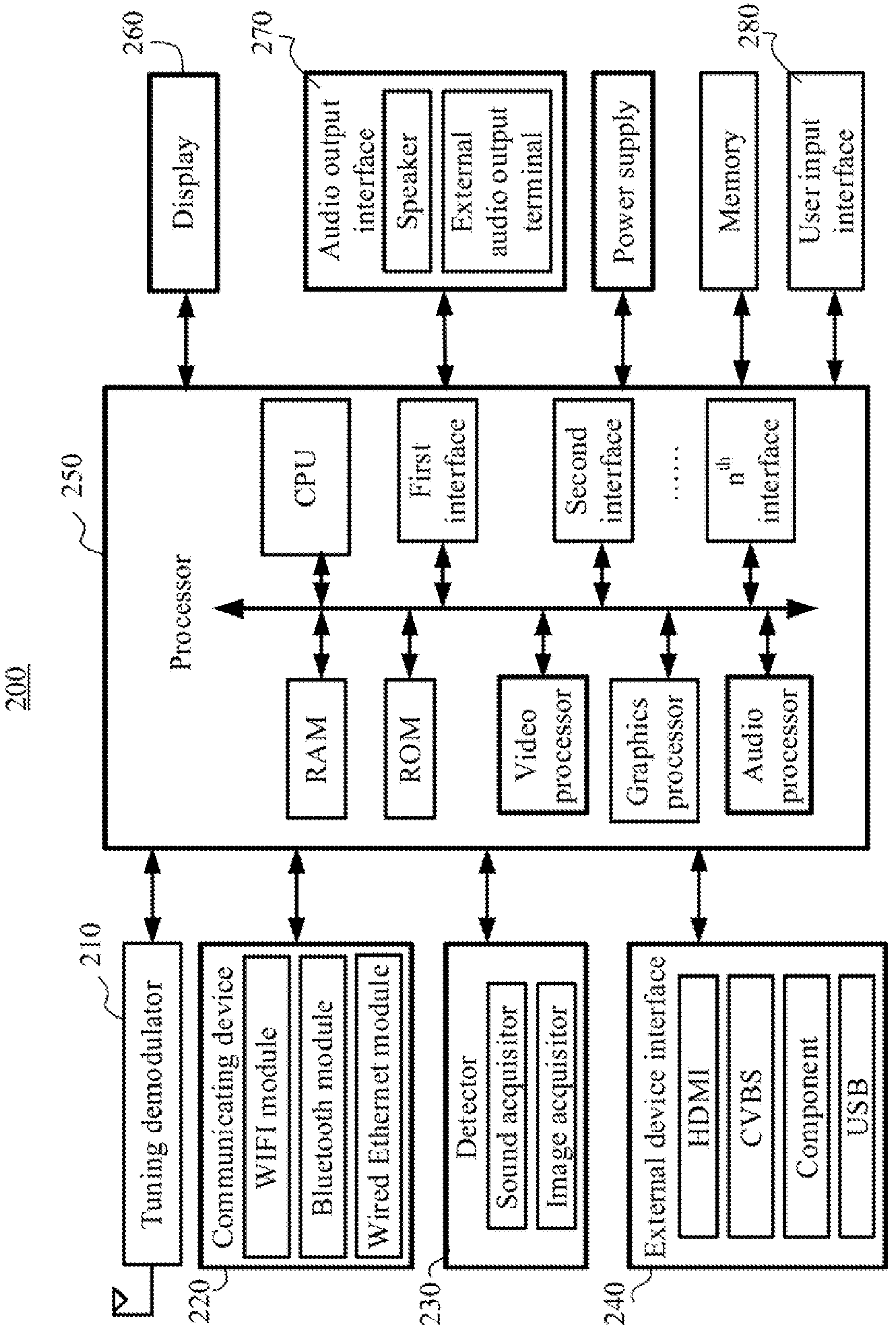
FIG. 5 is a diagram of a hardware configuration of a display apparatus according to some embodiments of the disclosure.

FIG. 5 illustrates a block diagram of a hardware configuration of a display apparatus 200 according to some embodiments.

In some embodiments, the display apparatus 200 can include at least one of a tuning demodulator 210, a communicating device 220, a detector 230, an external device interface 240, a processor 250, a display 260, an audio output interface 270, a memory, a power supply, or a user interface.

In some embodiments, the communicating device 220 is a component for communicating with an external device or a server according to various types of communication protocols. For example, the communicating device may include at least one of a Wi-Fi module, a Bluetooth module, a wired Ethernet module, other network communication protocol chip or near-field communication protocol chip, or an infrared receiver. The display apparatus 200 may send and receive control signals and data signals to/from the control device 100 or the server 300 through the communicating device 220.

In some embodiments, the external device interface 240 may include, but is not limited to, any one or more of a high-definition multimedia interface (HDMI), an analog or data high-definition component input interface (Component), a composite video broadcast signal (CVBS) input interface, a USB input interface (USB), or an RGB port, or may be a composite input/output interface formed by multiple interfaces mentioned above.

In some embodiments, the processor 250 and the tuning demodulator 210 may be located in separate devices, that is, the tuning demodulator 210 may be located in an external device (such as an external set-top box, etc.) of the main device where the processor 250 is located.

In some embodiments, the processor 250 can control operations of the display apparatus and responds to the user's operations through various software programs stored in the memory. The processor 250 can control the overall operation of the display apparatus 200. For example, in response to receiving a user command for selecting a UI object presented on the display 260, the processor 250 may perform an operation associated with the object selected by the user command.

In some embodiments, the user may input a user command on a Graphical User Interface (GUI) presented on the display 260, and the user input interface receives a command input from the user through the Graphical User Interface (GUI). Alternatively, the user may input a user command by inputting a particular sound or gesture, and the user input interface recognizes the sound or gesture through a sensor to receive the command.

Figure 6:
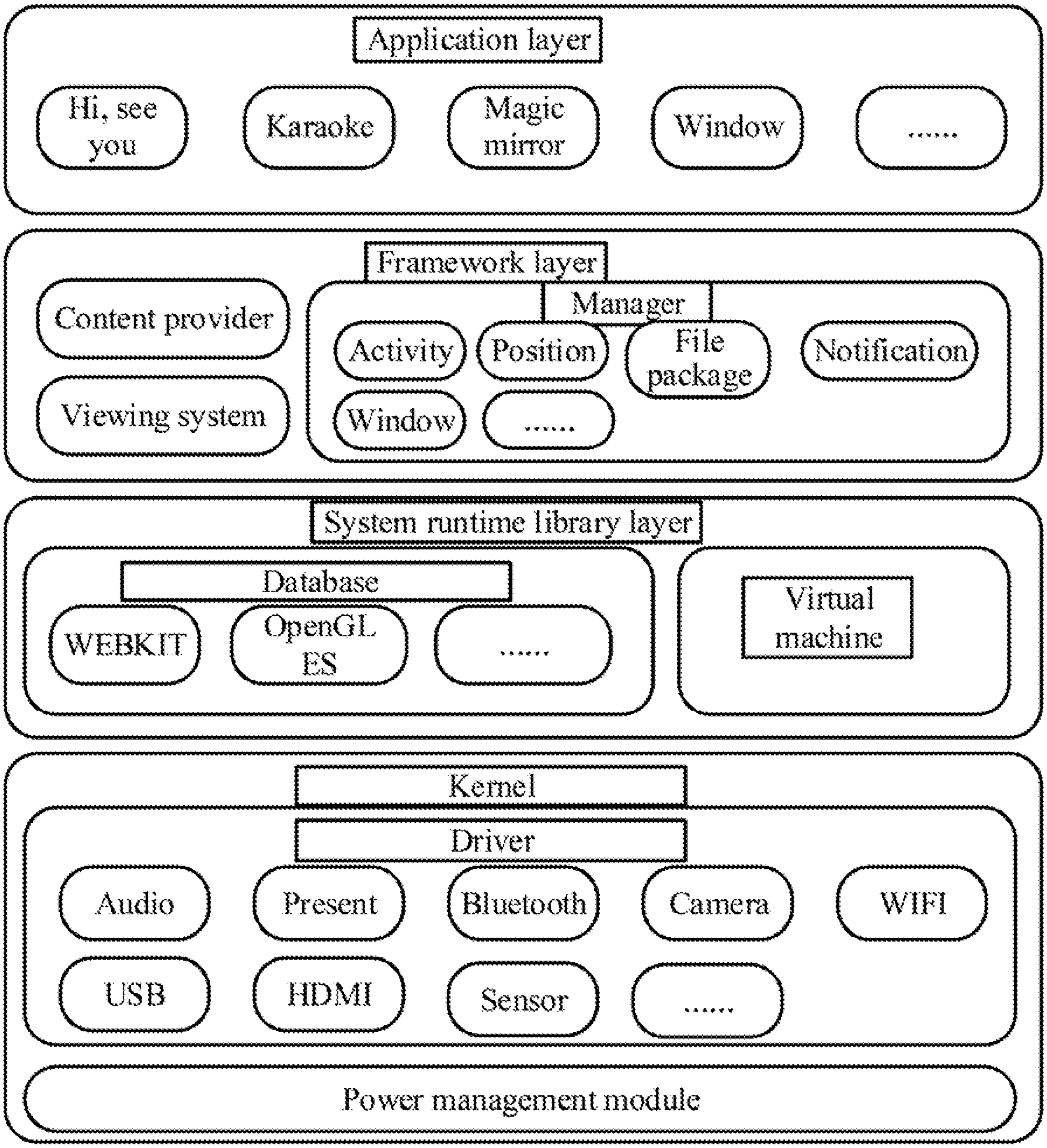
FIG. 6 is a diagram of a software configuration of a display apparatus according to some embodiments of the disclosure.

Referring to FIG. 6, in some embodiments, a system can be divided into four layers, namely, an Application layer (abbreviated as the "application layer"), an Application Framework layer (abbreviated as the "framework layer"), an Android runtime and system library layer (abbreviated as the "system runtime library layer"), and a kernel layer from top to bottom.

As shown in FIG. 6, the application framework layer according to some embodiments of the disclosure can include a manager, a content provider, etc., where the manager can include at least one of: an Activity Manager used to interact with all activities running in the system; a Location Manager used to provide system services or applications with access to system location services; a Package Manager used to retrieve various information related to application packages currently installed on the device; a Notification Manager used to control the presentation and clearing of notification messages; or a Window Manager used to manage icons, windows, toolbars, wallpapers and Desktop widget on the user interface.

In order to expand local data that can be directly used by the display apparatus 200, without occupying a storage space of the display apparatus 200, and enrich flexibility of data acquisition of the display apparatus, etc., an external device may be connected with the display apparatus 200. According to different requirements of the user, the user may connect different types of external devices, for example, a U disk, a mobile hard disk, a DLNA device, etc., with the display apparatus 200. The display apparatus 200 generally sets the DMP application to manage these external devices, the user moves a focus to a control of the DMP application by operating the control device 100, and presses a "Confirm" key to send an application selection command to the display apparatus 200, and the display apparatus 200, in response to the application selection command, can present a user interface, i.e., the external device list shown in FIG. 1, of a subordinate menu corresponding to the DMP application. In some embodiments, the external device list can include icons and device names of all external devices currently in connection with the display apparatus 200, and in order to distinguish different types of external devices, different types of external devices correspondingly present different icons. As shown in FIG. 1, the display apparatus 200 is currently connected with three external devices, namely a first external device, a second external device and a third external device, where the first external device and the second external device are external devices of the same type, such as a U disk, and the third external device is an external device of a different type, such as a DLNA device. The user can quickly and accurately know device information of external devices currently connected with the display apparatus 200 through different icons and device names. In some embodiments, if there are some unusable external devices among all the external devices currently connected with the display apparatus 200, the icons and device names corresponding to these unusable external devices will have prompt identifiers, such as grayed indication, highlighted, etc., to tell the user that these external devices are unavailable for operation.

Figure 7:
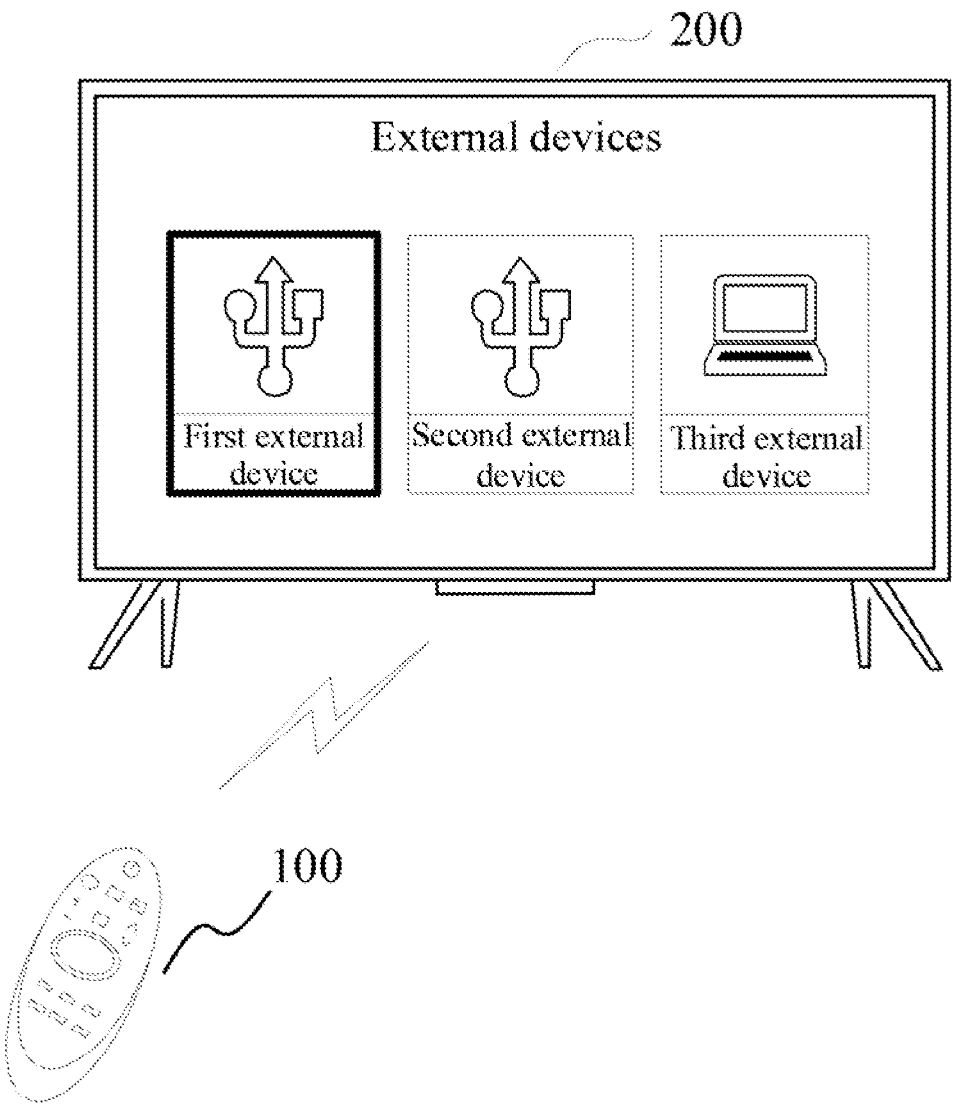
FIG. 7 is a schematic diagram of interaction in which a user can control and selects a first external device according to some embodiments of the disclosure.

Further, the user can select an external device to be viewed by operating the control device 100, and as shown in FIG. 7, taking the remote control as an example, the user moves a focus to an icon and device name corresponding to the first external device by operating the "up", "down", "left" and "right" keys on the remote control, and the user presses the "Confirm" key on the remote control to send an application selection command to the display apparatus 200 to select the first external device. The display apparatus 200 can present a user interface corresponding to content from the first external device in response to the application selection command. As shown in the left side of FIG. 8, the content from the first external device can include a folder a, a folder b, and a folder c. In some embodiments, the content from the external device can refer to the data stored in the external device, where the data stored in the external device has different user interfaces according to storage nodes in a storage path of the data, for example, for "image A" stored in the external device, the corresponding storage path is "Folder a→Folder a'", then the storage nodes corresponding to "image A" are respectively "Folder a" and "Folder a'", and the user can operate the control device 100 to enter a corresponding user interface according to the storage path of "image A" in order to find "image A". Accordingly, in response to the user's command, the display apparatus 200 sequentially can present an user interface (including contents in the folder a, that is, the folder a' and the folder a") corresponding to the storage node "Folder a" as shown in the middle of FIG. 8, and an user interface (including "image A" and "Music A") corresponding to the storage node "Folder a'" as shown on the right side of FIG. 8.

Figure 8:
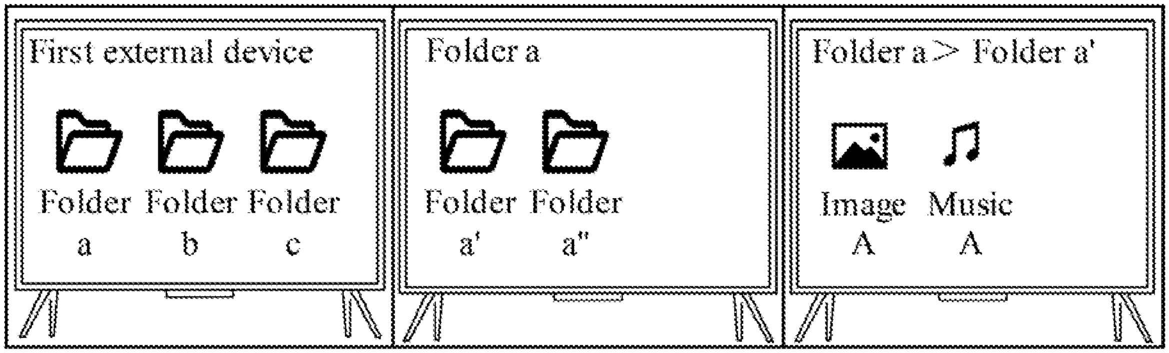
FIG. 8 is a schematic diagram of a user interface of a first external device according to some embodiments of the disclosure.

When the user interface as shown on the right side of FIG. 8 is presented, if the user wants to view the content from another external device, for example, a content from a second external device, the user may control the control apparatus 100 to send a back command to the display apparatus 200. In this case, the display apparatus 200 directly exits the DMP application in response to the back command, that is, can present desktop of the display apparatus 200. The user needs to re-select the DMP application to enter the external device list as shown in FIG. 1, and select the second external device from the external device list to browse the content from the second external device. Alternatively, the quantity of back commands is multiple, and in response to respective back commands, the display apparatus 200 sequentially can present user interfaces as shown in the middle part of FIG. 8, on the left side of FIG. 8, and as shown in FIG. 1, so as to back to the external device list, and then selects a second external device from the external device list to browse the content from the second external device.

Figure 9:
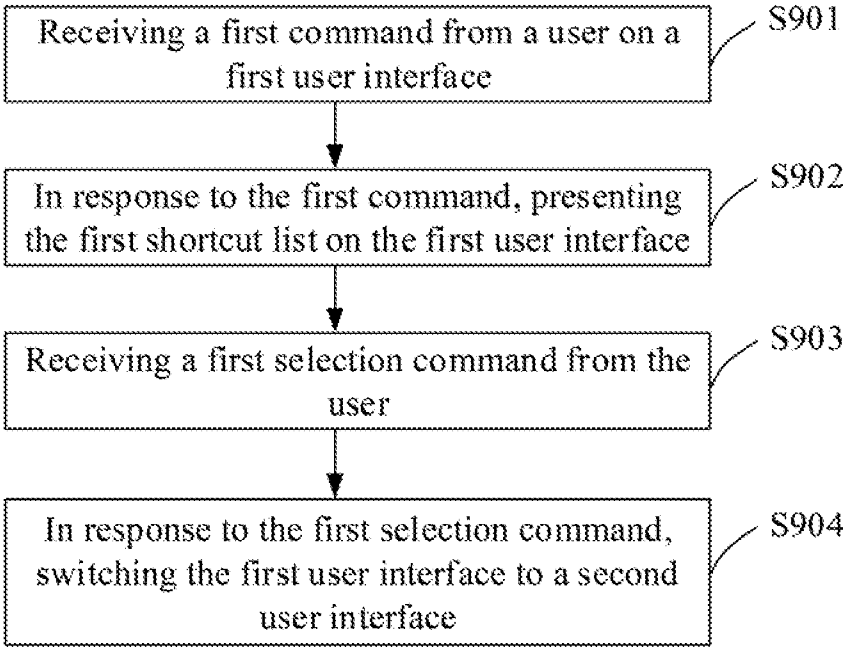
FIG. 9 is a flow chart of a display apparatus presenting a content from a second user interface according to some embodiments of the disclosure.

It can be seen that, if the content from the external device is presented according to the above process, the user needs to interact with the display apparatus 200 for many times, and in the process of presenting the content from another external device, the current content from the external device cannot be presented continuously, which results in that the user cannot browse the current content from the external device. In view of the above issues, some embodiments of the disclosure provide a method for presenting a content from an external device. Referring to the flow shown in FIG. 9, the method is as follows.

S901: receiving a first command from a user on a first user interface, where the first user interface is a user interface for showing content from a first external device in connection with the display apparatus, the first command is used for indicating to present a first shortcut list, and the first shortcut list includes device names of all external devices of the display apparatus.

In some embodiments, the first user interface is a user interface for presenting the content from an external device, for example, taking the first external device is the current external device as an example, the first user interface can refer to a user interface for indicating storage nodes in the first external device, for example, the user interface corresponding to the "Folder a'", that is, the first user interface is as shown on the right side of FIG. 8.

When the first user interface is presented, if the user needs to browse content from another external device, for example, a second external device, the user may directly send a first command on the first user interface to the display apparatus 200, where the first command is used for indicating the display apparatus 200 to present the first shortcut list. In some embodiments, the first command may correspond to one or more different kinds of interactive information, and it should be noted that the interactive information is different from the interactive information corresponding to a command for indicating an original function on the first user interface. The process of receiving the first command sent from the user can include: a corresponding relationship between the first command and the interactive information is pre-stored in the display apparatus 200; and after receiving the interactive information sent from the user, the display apparatus 200 compares the interactive information received with the interactive information in the pre-stored corresponding relationship, if the received interactive information belongs to the interactive information in the corresponding relationship, it is determined that the command sent from the user is the first command, and if the interactive information received does not belong to the interactive information in the corresponding relationship, it is determined that the command sent from the user is not the first command.

Figure 10:
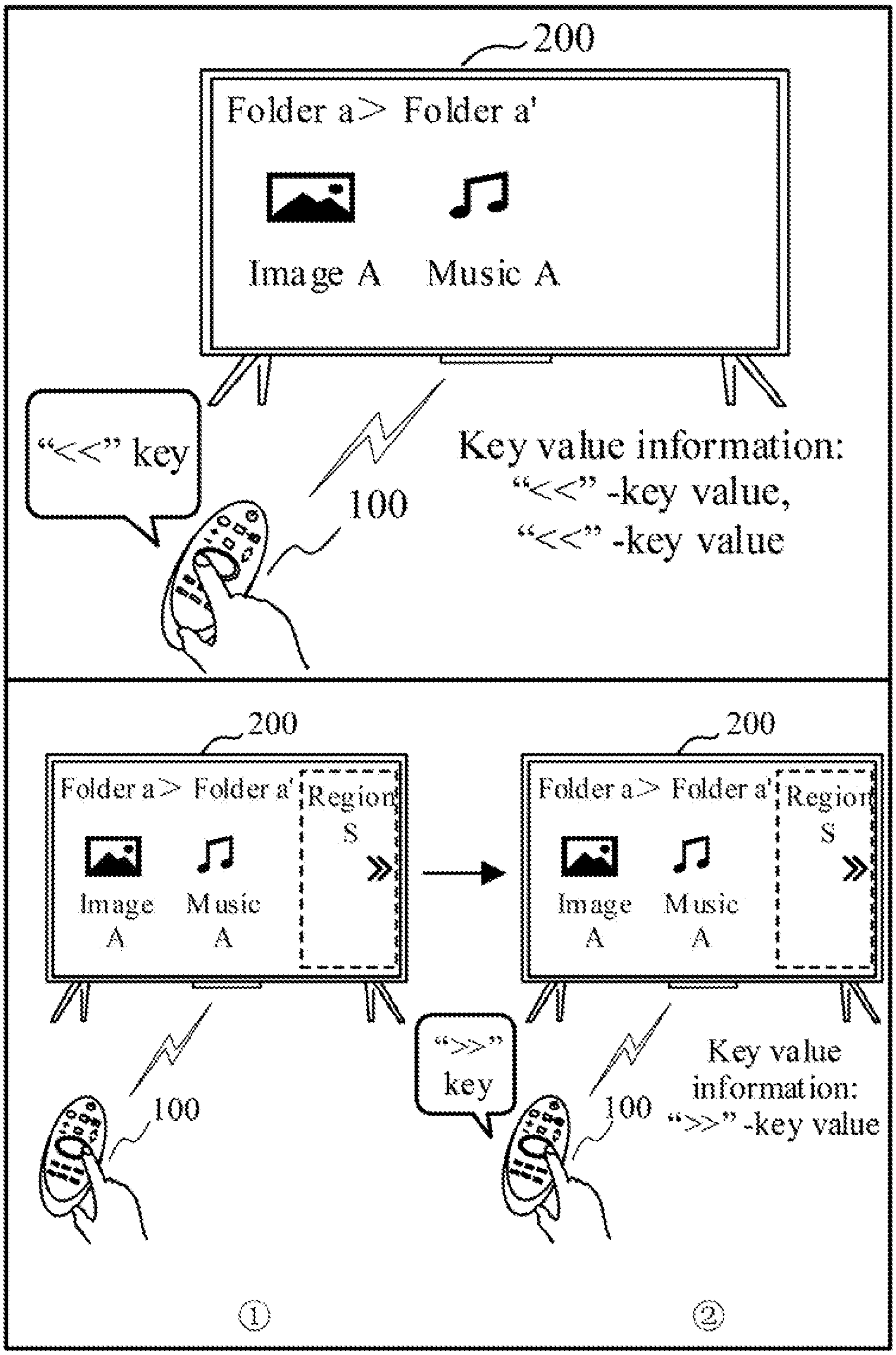
FIG. 10 is a schematic diagram of interaction in which a user issues a first command to a display apparatus according to some embodiments of the disclosure.

In some embodiments, the interaction information corresponding to the first command may be key value information of a designated key combination. For example, the designated key combination is “<<” and “<<”, that is, the key value information of the designated key combination is two consecutive key values corresponding to “<<”. As shown in an upper part of FIG. 10, the user continuously presses the “<<” key on the remote control twice to send the interactive information “key value information: ‘<<’-key value, ‘<<’-key value”, i.e., the first command, to the display apparatus 200. In some embodiments, the key value information of the designated key combination can include a key value of each designated key, a sequence of respective designated keys, and an input time interval between two adjacent designated keys.

In some embodiments, the interactive information corresponding to the first command may be key value information of a designated key. The designated key may be an existing key on the control device 100, or may be a newly configured key. For example, the designated key may be an original key “<<” on the control device 100, or may be a “shortcut” key newly configured on the control device 100, where the “shortcut” key is dedicated to sending the first command. Generally, in order to avoid the overlap with the original function when an original key is used as a designated key, a pressing time duration may be set as key value information of the designated key at the same time, and the first command may be triggered only after the user continuously presses the designated key for a certain time duration. As an example, the user keeps pressing the designated key “<<” on the remote control for 5 seconds, and can send the interactive information “key value information: ‘<<’-key value, pressing time: 5 s”, i.e., the first command, to the display apparatus 200. In some embodiments, the key value information of the designated key at least can include the key value of the designated key and the pressing time duration.

In some embodiments, the interactive information corresponding to the first command may be designated focus information. The first command may be triggered only when the focus is located in a designated region on the user interface and a designated command is issued to the focus. For example, the designated focus information is to issue the designation command “key value information: ‘>>’-key value” to the focus (for example, the “>>” identifier in ②) located in the designated region S. As shown in a lower part of FIG. 10, the user first can operate the remote controller through the operation shown in ①, for example, pressing the “>>” key to move the focus to the designated region S on the first user interface, and then through the operation shown in ②, pressing the “>>” key once to issue the designated indication “key value information: ‘>>’-key value” acting on the focus, to send the interactive information “key value information: ‘>>’-key value”, i.e., the first command, to the display apparatus 200. In this case, the display apparatus 200 recognizes that the user issues the first command by recognizing the position of the focus on the first user interface and the interactive information.

In some embodiments, the interactive information corresponding to the first command may be designated voice information. For example, the designated voice information is “Open First Shortcut List”. In some embodiments, the first command corresponds to designated gesture information. For example, a display screen of the display apparatus 200 is a touch-sensitive screen, which can sense a gesture operation from the user, and the designated gesture information is sliding from a designated region, such as a right boundary, on the first user interface along a designated direction, such as sliding to an inner side of the first user interface.

In the above discussion, only the interactive information of the first command is used. Of course, other interactive information may also be used as the interactive information of the first command. Further, in order to provide the user with more flexible and diverse choices, the above several types of interactive information may be simultaneously used as the interactive information of the first command, and the user only needs to select a type of interactive information to send the first command.

S902: in response to the first command, presenting the first shortcut list on the first user interface.

Figure 11:
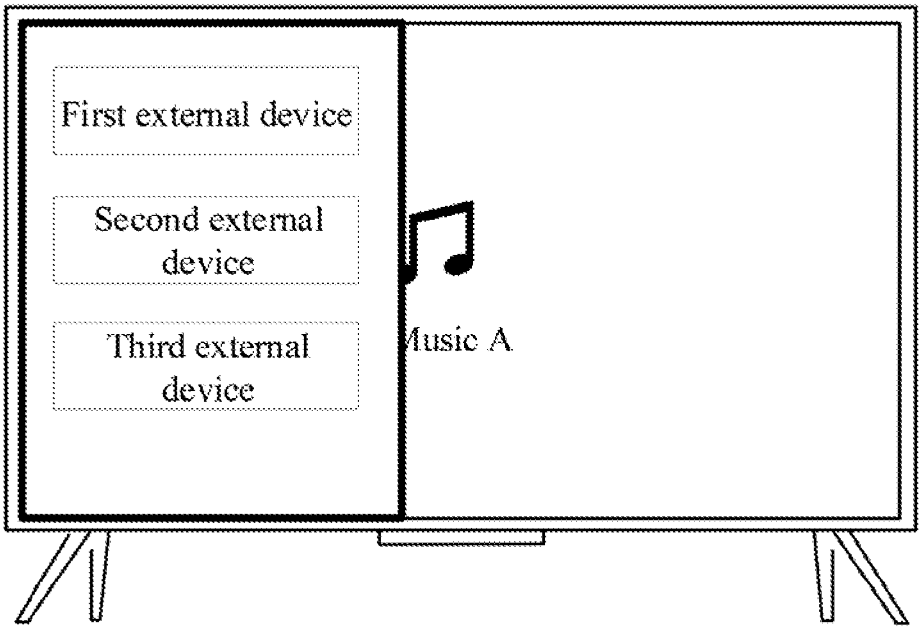
FIG. 11 is a schematic diagram of a first shortcut list presented on a first user interface according to some embodiments of the disclosure.

In response to the first command, the display apparatus 200 can present the first shortcut list on the first user interface as shown in FIG. 11. The first shortcut list can include the device names of all the external devices, such as “First external device”, “Second external device”, and “Third external device”, of the display apparatus 200. The user can quickly and accurately know all the external devices currently connected with the display apparatus 200 by browsing the first shortcut list, and can directly select the second external device whose content is to be presented from the first shortcut list.

In some embodiments, the first shortcut list may be presented at a preset location on the first user interface, such as a left side of the first user interface as shown in FIG. 11. In some embodiments, a presentation position of the first shortcut list on the first user interface may correspond to the interactive information of the first command. Taking the interactive information shown in the lower part of FIG. 10 as an example, in this case, corresponding to the operation on the right side of the first user interface, the first shortcut list is presented on the right side of the first user interface.

According to some embodiments of the disclosure, the first shortcut list and the first user interface are located in two different layers on the display, and the first shortcut list is placed on a display layer on top of a display layer where the first user interface locates, so that both of the first shortcut list and the first user interface can be presented on the display at the same time. Further, because the presentation of the first shortcut list may block a portion of the content from the first user interface, the first shortcut list may be set to be list which can move, that is, the first shortcut list is moved at will in the layer where the first shortcut list is located, and part of the content in the first user interface blocked by the first shortcut list is exposed by moving the first shortcut list, to meet the user's browsing needs. By using two layers to present the first shortcut list and the first user interface at the same time, when the first shortcut list is presented, the presentation of the first user interface does not need to be adjusted, so that the display apparatus 200 is prevented from generating additional display calculation. Moreover, once the user has a misoperation to indicate to expand the first shortcut list, the user may also send a cancel command to close the first shortcut list and directly expose the first user interface, so that the display apparatus 200 has a faster response speed to the cancel command.

In a specific display mode, the first shortcut list may completely cover the first user interface, and although the form is similar to that of the user interface of the external device list shown in FIG. 1, the first shortcut list and the first user interface are located in different layers, that is, instead of exiting from the first user interface to only present the first shortcut list, both of the first shortcut list and the first user interface are still in a state of being presented simultaneously. In this case, when the first shortcut list is closed, the first user interface under the layer in which the first shortcut list is located may still be directly presented, and the display apparatus 200 does not need to perform an operation for presenting the first user interface again.

S903: receiving a first selection command from the user, where the first selection command is used for indicating to present content from a second external device, and a device name of the second external device is in the first shortcut list.

Figure 12:
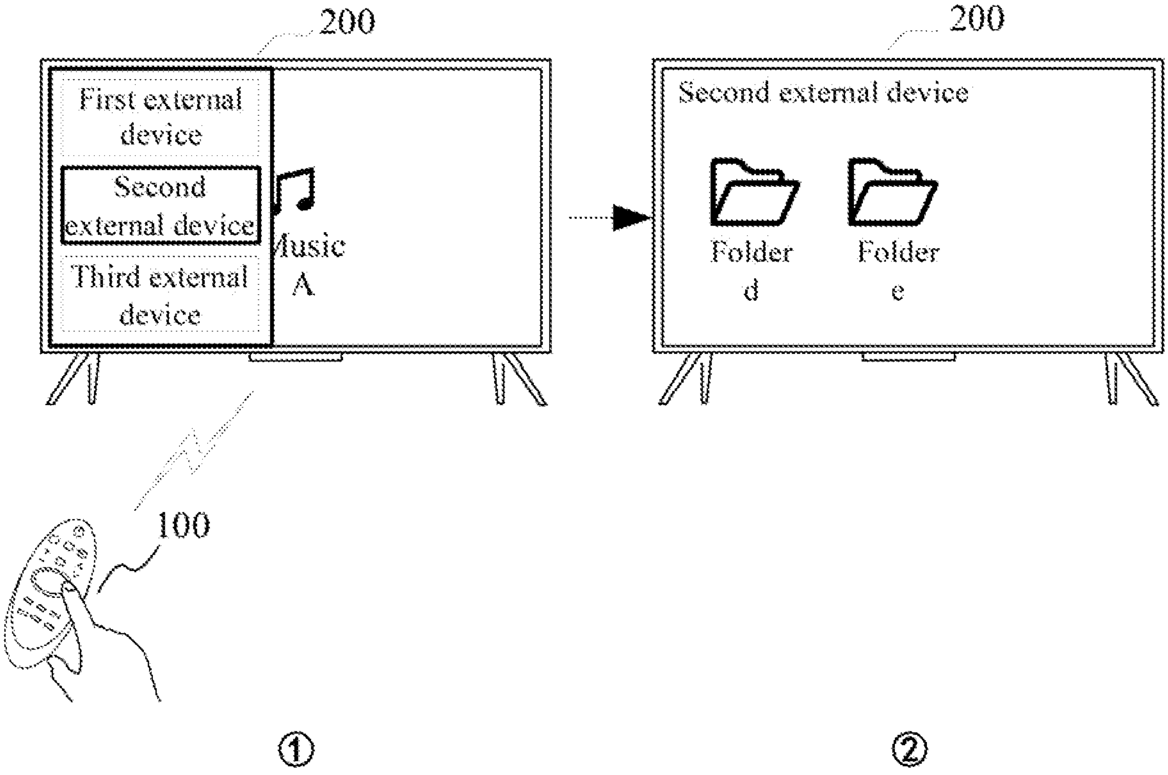
FIG. 12 is a schematic diagram of interaction in which a user can control a display apparatus to present a content from a second external device according to some embodiments of the disclosure.

As shown in ① of FIG. 12, the user can operate the control device 100, for example, by pressing the "up" and "down" keys on the remote control to move a focus (thick black frame) to an item of the second external device, and by pressing the "Confirm" key to send the first selection command to the display apparatus 200. The first selection command can be used for indicating the display apparatus 200 to present a user interface corresponding to a content (i.e., a second user interface) of a selected external device (in some embodiments, the second external device).

S904: in response to the first selection command, switching the first user interface to a second user interface, where the second user interface is a user interface for the content from the second external device.

In response to the first selection command, the display apparatus 200 can directly replace the first user interface with the second user interface, that is, the display apparatus 200 completely can exit from the first external device and only present the second user interface, and as shown in ② of FIG. 12, the second user interface can include the content, such as "Folder d" and "Folder e", of the second external device.

Further, if the user wants to browse content from another external device (including the first external device) when the second user interface is presented, the user may control the display apparatus 200 to present the first shortcut list by referring to the process similar to the above, and select an external device with contents to be browsed from the first shortcut list, which is not described here.

In some embodiments, when the user browses the current user interface and wants to browse content from a historically browsed external device again, for example, when the user browses the second user interface and wants to browse the content from the first external device again, the first user interface of the first external device may be set to be directly presented. The first user interface is the last user interface presented when exiting the first external device. The following process can be implemented.

S1301: in response to the first selection command, recording the first user interface.

After receiving the first selection command, before switching the first user interface to the second user interface, the display apparatus 200 firstly can store the first user interface, for example, storing the first user interfaces as shown on the right side of FIG. 8, and then switching the first interface to the second user interface as shown in ② of FIG. 12.

S1302: receiving the first command from the user on the second user interface.

S1303: in response to the first command, presenting the first shortcut list on the second user interface.

S1304: receiving a second selection command from the user, where the second selection command is used for indicating to present the content from the first external device.

Figure 13:
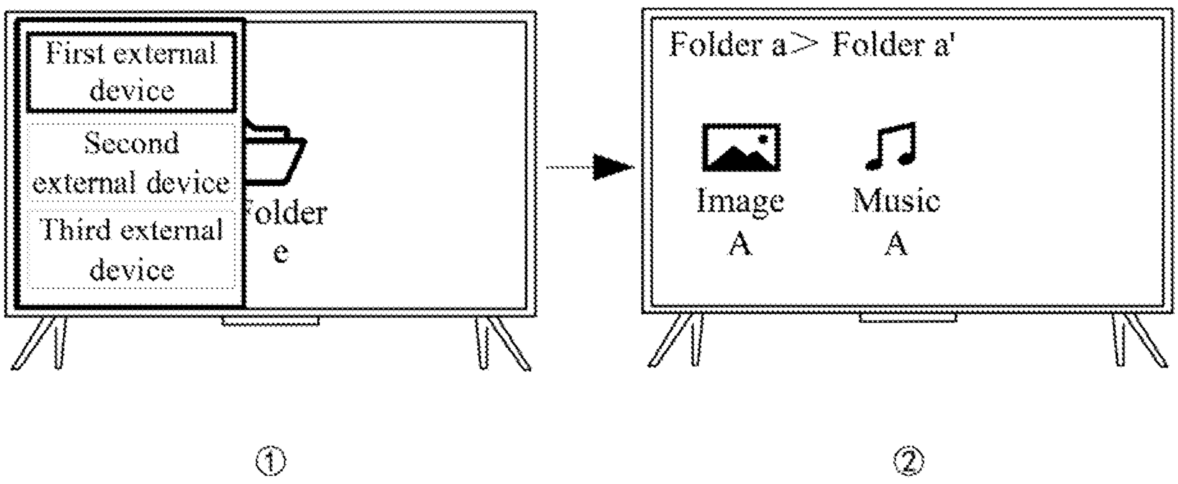
FIG. 13 is a schematic diagram of interaction in which a user can control a display apparatus to present a content from a first external device according to some embodiments of the disclosure.

The steps from S1302 to S1304 may refer to the steps from S901 to S903 above, and are not described here. As shown in ① of FIG. 13, a first shortcut list is presented on the second user interface, and the first shortcut list can include the device names of all the external devices, such as "First external device", "Second external device", and "Third external device". The focus can be moved to the item of "First external device" to send a second selection command to the display apparatus 200, that is, to indicate to present the content from the first external device.

S1405: in response to the second selection command, obtaining the first user interface, and switching the second user interface to the first user interface.

In response to the second selection command, the display apparatus 200 firstly can determine whether the first external device is a historical external device, that is, an external device through which the user has browsed the content. If it is determined that the first external device is a history external device, the stored first user interface, that is, the first user interface as shown on the right side of FIG. 8, is obtained, and the second user interface is directly switched to the stored first user interface, as shown in ② of FIG. 13, where the presented content is the pre-stored first user-interface as shown on the right side of FIG. 8.

In order to facilitate the user to quickly understand the content from each external device, so that the user can accurately select the to-be-browsed external device, the display apparatus 200 may present preview information of each external device by referring to the following process.

S1401: receiving a browsing command from the user on the first shortcut list, where the browsing command is used for indicating a to-be-browsed external device, and a device name of the to-be-browsed external device is indicated in the first shortcut list.

Figure 14:
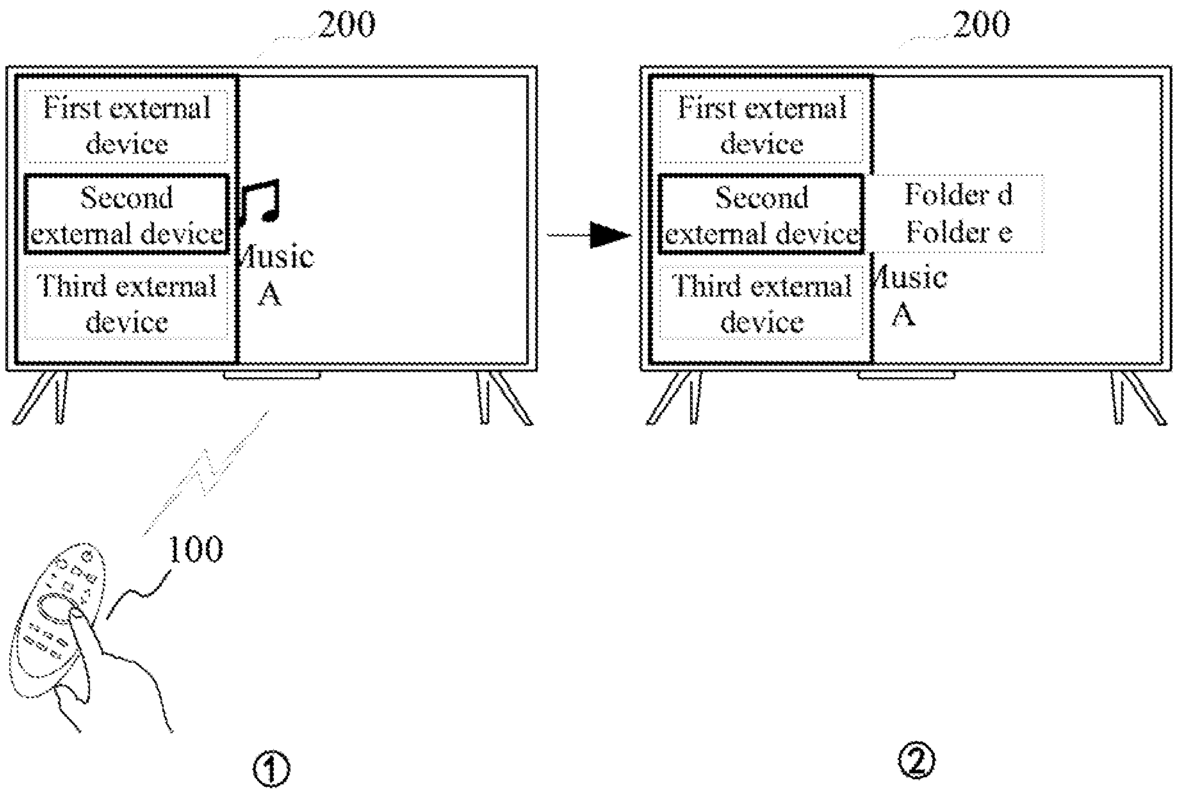
FIG. 14 is a schematic diagram of interaction in which a user can control a display apparatus to present preview information of an external device according to some embodiments of the disclosure.

Taking the display apparatus 200 currently presenting the first shortcut list and the first user interface as shown in FIG. 11 as an example, according to the operations shown in in of FIG. 14, the user issues a browsing command to the display apparatus 200 by operating the control device 100, such as a remote controller. The browsing command is a command for indicating to-be-browsed external device and is different from the command, such as the first selection command and the second selection command, for indicating to present the content from the external device. In some embodiments, the external device whose preview information is to be presented may be defined as the to-be-browsed external device. As shown in ① of FIG. 14, the user moves a focus to an item of the second external device by operating the remote controller, and can send the browsing command to the display apparatus 200 by indicating the to-be-browsed external device, that is, the second external device, through the focus.

S1402: in response to the browsing command, presenting a sub-list on the first user interface, where a position of the sub-list corresponds to a position of the to-be-browsed external device in the first shortcut list, and the sub-list can include preview information of the to-be-browsed external device.

In response to the browsing command, the display apparatus 200 can present a sub-list on the first user interface as shown in ② of FIG. 14, where the sub-list can include the preview information of the to-be-browsed external device. The sub-list, the first shortcut list and the first user interface can be respectively located in different layers, and the sub-list can be presented on top of the layer where the first shortcut list is located. The sub-list generally corresponds to the position of the to-be-browsed external device in the first shortcut list, as shown in ② of FIG. 14, the sub-list is located on the right side of the item of the second external device, and a corresponding relationship between the sub-list and the to-be-browsed external device can be presented through a corresponding relationship between the sub-list and the position of the external device in the first shortcut list. The user can quickly and accurately know which external device the currently presented sub-list corresponds to. The sub-list may also directly cover the region where the item of the to-be-browsed external device is presented on the first shortcut list, so as to prompt the user which external device the currently presented sub-list corresponds to through a covering relationship. In some embodiments, since the sub-list, the first shortcut list and the first user interface are located in different layers respectively, the sub-list, the first shortcut list and the first user interface may be presented simultaneously, and the display apparatus 200 may directly close the list or the user interface on the layer by deleting the corresponding layer, the display of the list or the user interface on other layers is not affected, and the display apparatus 200 does not need to perform repeated display calculations, so that the calculation pressure of the display apparatus 200 can be effectively reduced. For example, when the user issues a browsing command to the display apparatus 200 by a misoperation and the sub-list of the to-be-browsed external device, for example, the sub-list of the second external device is presented, the user may send a cancel command, for example, control the remote controller to move the focus from the item of the second external device, and the display apparatus 200 may directly close the layer where the sub-list is located in response to the cancel command to close the sub-list and directly expose the first shortcut list and the first user interface, and the exposing process does not require the display apparatus 200 to perform related display calculations.

Further, if the user wants to browse the preview information of another external device, the user may send the browsing command to the display apparatus 200 again according to the above process, so as to present the sub-list of another external device.

In some embodiments, the sub-list can include the preview information of the to-be-browsed external device, and the preview information can be used to generally present the content from the to-be-browsed external device. In some embodiments, the preview information may be a quantity of folders in the to-be-browsed external device, capacity information of the to-be-browsed external device, a name of a designated folder in the to-be-browsed external device, a name of designated data in the to-be-browsed external device, etc., as shown in ② of FIG. 14, the preview information presented in the sub-list of the second external device can include names of folders, that is, "Folder d" and "Folder e", of the second external device. The preview information of the to-be-browsed external device may be preset as required, and may also be edited according to subsequent requirements, which is not limited by embodiments of the disclosure.

Presenting the content from each external device through the above process also requires that after a certain external device is selected, the content that the user really wants to browse is presented step by step through multiple interactions between the user and the display apparatus 200, for example, if "image B" on the third page of the second external device is to be presented, the display apparatus 200 needs to respond to a command sent from the user by sequentially presenting the user interface (including "Folder d" and "Folder e") of the first page in the second external device, the user interface (a subordinate user interface of "Folder d", including "Folder d'" and "Folder d''") of the second page in the second external device", the user interface (a subordinate user interface of "Folder d'", including an item of "image B") of the third page in the second external device. In order to improve the display efficiency of the content from the external device and reduce the quantity of interactions between the user and the display apparatus, a skip control may be added to the first shortcut list.

Figure 15:
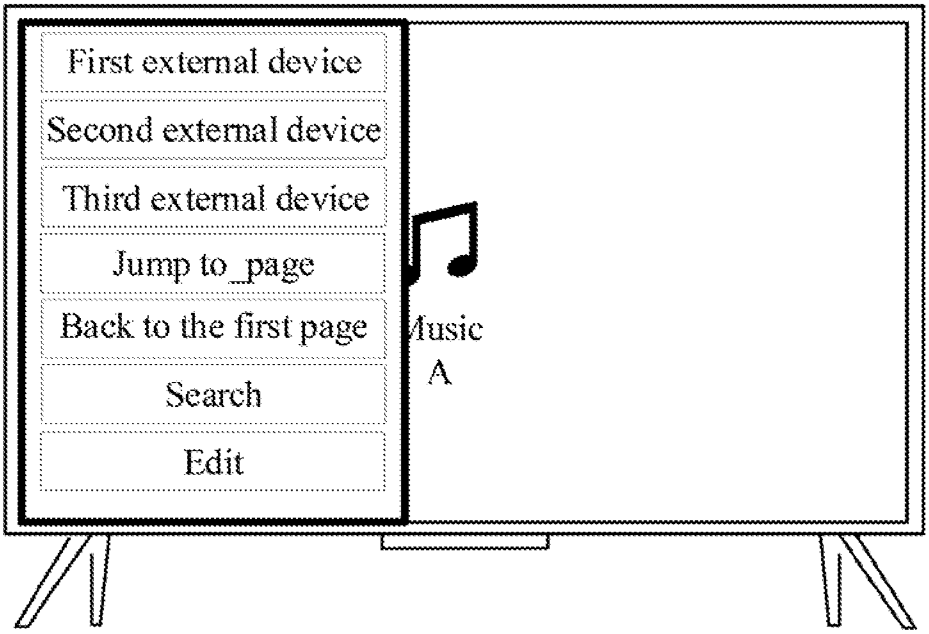
FIG. 15 is a schematic diagram of a first shortcut list presented on a first user interface according to some embodiments of the disclosure.

In some embodiments, a skip control may be used for indicating to present a designated page in a designated external device. In some embodiments, the designated external device can refer to an external device when the first shortcut list is presented, for example, if the first shortcut list is presented when the first user interface of the first external device is presented, the first external device is the designated external device. In some embodiments, the skip control has a text (number) input region, as shown in FIG. 15, "skip to page", where the "_" region is a text (number) input region, the user moves a focus to the skip control by operating the control device 100, and continues to operate the control device 100 to input a page number, such as "3", corresponding to the content to be presented. Taking the designated external device being the second external device as an example, "3" indicates that the display apparatus 200 directly can present the content corresponding to the third page of the second external device. The display apparatus 200 pre-stores a corresponding relationship between the page number in each external device and the content corresponding to the page number, and in response to a skip command, the display apparatus 200 can determine the content corresponding to the third page according to the pre-stored corresponding relationship, and can present the second user interface corresponding to the content. In the above example, the second user interface can include the item of "image B". It can be seen that the content from a certain page in the designated external device can be directly presented through the skip control, thereby effectively reducing the quantity of interactions between the user and the display apparatus 200 and improving the user experience.

In some embodiments, the content corresponding to the first page of the designated external device can be generally the entry of another content in the designated external device, and in some cases, the corresponding content will only correspond to part of the content in the designated external device starting from the second page of the designated external device, for example, the corresponding content from the first page of the designated external device, e.g., the second external device, is "Folder d" and "Folder e", and the corresponding content from the second page is "Folder d'" and "Folder d''" in "Folder d". Obviously, the content from "Folder e" is absent from the second page. Therefore, as shown in FIG. 15, the skip control may further be used to indicate the display apparatus 200 to present a user interface corresponding to the content from the first page in the designated external device, such as the skip control "Back to the first page", and the user issues a skip command to the display apparatus 200 through the skip control. In response to the skip command, the display apparatus 200 directly can present the user interface of the first page from the designated external device.

In some embodiments, if the user does not know the page number of the folder to be browsed in the designated device, the user cannot directly skip to the corresponding user interface through the skip control. In this case, as shown in FIG. 15, a search (Search) key may be set in the first shortcut list, the user can issue a first search command to the display apparatus 200 through the search key, the display apparatus 200 can present a search interface in response to the first search command, and the search interface can be used for inputting a name of a folder or data to be searched. The user inputs a corresponding name in the search interface to issue a second search command to the display apparatus 200, and the display apparatus 200, in response to the second search command, directly can present the user interface of the page where the folder or data corresponding to the name is located.

In some embodiments, as shown in FIG. 15, a first edit control, such as an edit (Edit) control, may be set in the first shortcut list, and the first edit control is used for indicating to enable a function of editing an item in the first shortcut list. The user issues a first edit command to the display apparatus 200 through a first edit control, and the display apparatus 200 can change an item in the first shortcut list in response to the first edit command, that is, the display apparatus 200 may perform an operation, such as deletion or hide, on each item in the first shortcut list, or may add an item to the shortcut list. For example, "Back to the first page" is deleted from the first shortcut list. Or an item is added to the first shortcut list, for example, the display apparatus 200 can present an item list including all items that can be added to the first shortcut list in response to a first edit command, in this case, the first edit command is used for indicating to add a target item to the first shortcut list, and the user may select a target item from the item list to add to the first shortcut list.

In the above embodiments, the display apparatus 200 may directly present the first shortcut list on the current user interface in response to the first command sent from the user, and can further present the user interface corresponding to the content from the external device in response to the command sent from the user based on the first shortcut list, thereby improving the efficiency of the display apparatus 200 to present the user interface for content from the external device. For example, only the user interface of the content from the third page of the second external device is presented.

Figure 16:
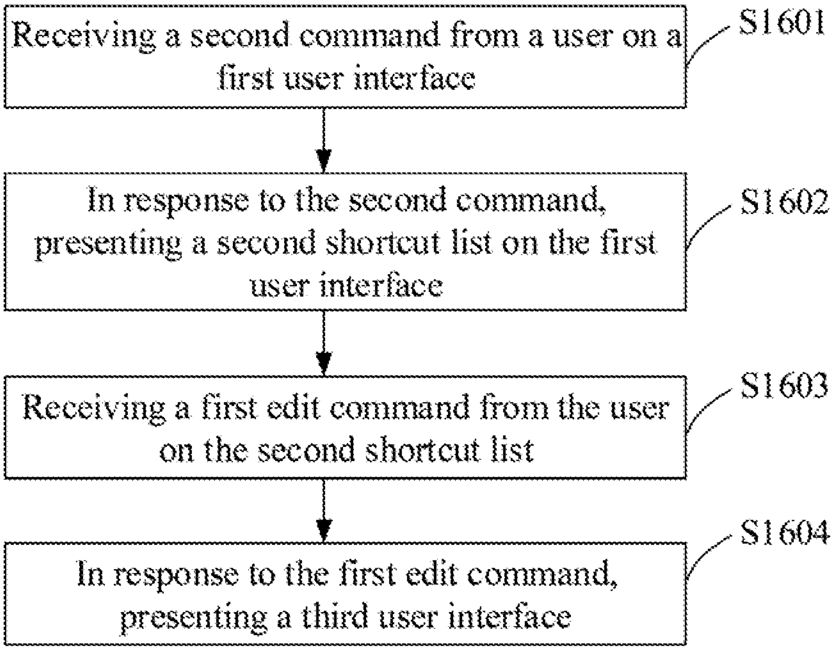
FIG. 16 is a flow chart of a display apparatus presenting a main content and a target sub-content according to some embodiments of the disclosure.

The display apparatus according to the embodiments of the disclosure can not only implement the above processing, but also present other contents while the display apparatus 200 can present the content from the current user interface through the flow shown in FIG. 16.

In some embodiments, the content currently presented on the user interface may be denoted as a main content, where the main content may be presented in parallel with another content, and the another content presented in parallel with the main content may be denoted as a sub-content, that is, the display apparatus 200 may run different threads corresponding to the main content and the sub-content at the same time, so as to present the main content and sub-content simultaneously.

S1601: receiving a second command from a user on a first user interface, where the second command is used for indicating to present a second shortcut list, and the second shortcut list can include a sub-content in the first external device which can be presented in parallel with the main content.

Figure 17:
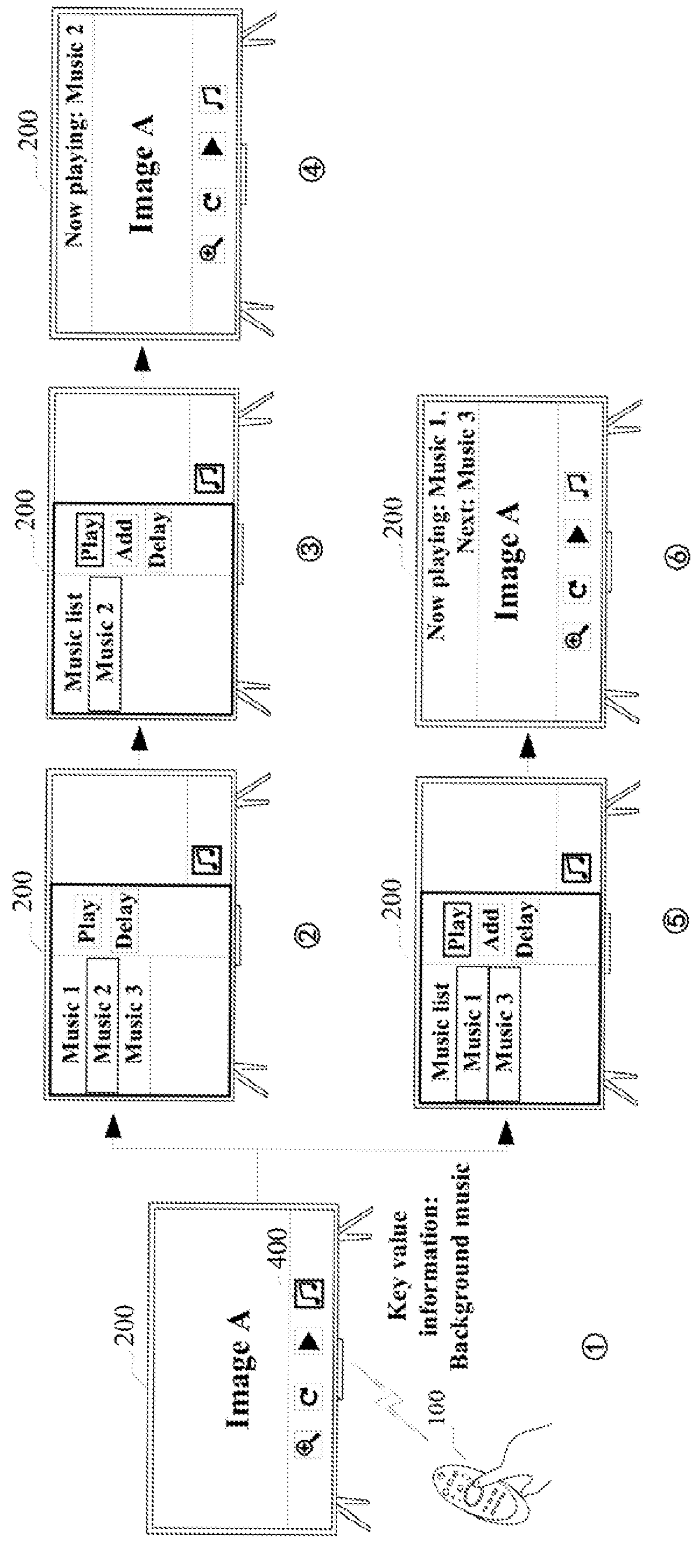
FIG. 17 is a schematic diagram of interaction in which a user issues a first edit command to a display apparatus according to some embodiments of the disclosure.

Taking the first user interface as the current user interface for illustration, as shown in ① of FIG. 17, the content presented on the first user interface is "image A" which can be presented simultaneously with another content. The user issues a second command to the display apparatus 200 by operating the control device 100, where the second command is used for indicating the display apparatus 200 to directly present the second shortcut list on the first user interface. Interactive information corresponding to the second command may refer to the interactive information corresponding to the first command in the above embodiments. It should be noted that the interactive information corresponding to the second command is different from the interactive information corresponding to the first command, so as to distinguish the first command and the second command. For example, the interactive information of the second command is key value information of a designated key, as shown in ① of FIG. 17, the designated key is a "Background music" key 400 on the first user interface, and the user moves a focus to the "Background music" key 400 by operating the control device 100, and presses the "Confirm" key on the control device 100 to send the key value information "Background music", i.e., the second command, to the display apparatus 200. In other embodiments, other interactive information may be set as the interactive information of the second command, and the user issues the second command by sending the corresponding interactive information to the display apparatus 200, which are not listed here.

S1602: in response to the second command, presenting a second shortcut list on the first user interface.

In response to the second command, the display apparatus 200 directly can present the second shortcut list on the first user interface as shown in ② of FIG. 17. In some embodiments, the second shortcut list and the first user interface are located in different layers, and a presentation relationship between the second shortcut list and the first user interface may be referred to the presentation relationship between the first shortcut list and the first user interface in the above embodiments.

In some embodiments, the second shortcut list can include all sub-contents presentable in parallel with the main content from a current external device. The current external device can refer to an external device that currently can present the content. In the above example, the current external device is the first external device corresponding to currently presented content (the first user interface).

S1603: receiving a first edit command from the user on the second shortcut list, where the first edit command is used for indicating to present a target sub-content.

In some embodiments, as shown in ② of FIG. 17, the second shortcut list can include all sub-contents that can be currently presented simultaneously with the main content "image A", for example, the names of "Music 1", "Music 2" and "Music 3".

The user may send a first edit command to the display apparatus 200, and the first edit command is used for indicating to present the target sub-content. For example, the user moves a focus to an item of the target sub-content by operating the control device 100, as shown in ② of FIG. 17, moves the focus to "Music 2", and selects "Music 2" by pressing the "Confirm" key on the control device 100, and moves the focus to a function key, such as a "Play" key, on the second shortcut list and can send a first edit command, i.e., playing "Music 2", to the display apparatus 200 by pressing the "Confirm" key on the control device 100.

Further, before sending the first edit command to the display apparatus 200, a to-be-presented list may be created for the selected target sub-content, for example, after selecting "Music 2" according to the above process, a to-be-presented list, for example, a "music list" which can include names of all target sub-contents, is presented as shown in ③ of FIG. 17. In this case, the user issues a first edit command to the display apparatus 200 based on a function key, i.e., the "Play" key, to indicate to play all the target sub-contents according to the to-be-presented list.

In another embodiment, the second shortcut list can include a to-be-presented sub-content selected from all the sub-contents in advance. Taking a "music list" as shown in ⑤ of FIG. 17 as an example, the second shortcut list is the "music list", which can include to-be-presented sub-contents "Music 1" and "Music 3".

The user may issue a first edit command to the display apparatus 200, and the first edit command is used for indicating to present a target sub-content. For example, the user moves a focus to a function key on the second shortcut list, for example, a "Play" key, by operating the control device 100, and issues a first edit command to the display apparatus 200 by pressing a "Confirm" key on the control device 100, to indicate to present all the to-be-presented sub-contents, that is, to play "Music 1" and "Music 3".

Further, the user can modify the to-be-presented sub-content by editing the second shortcut list. For example, the user issues a first edit command to the display apparatus 200 to indicate to present the target sub-content. In this case, the first edit command can include a plurality of commands.

In some embodiments, the user moves a focus to an item of a to-be-deleted sub-content, such as "Music 1", on the second shortcut list by operating the control device 100, and the user selects the to-be-deleted sub-content "Music 1" by pressing the "Confirm" key on the control device 100. The user moves the focus to a function key, such as a "Delete" key, on the second shortcut list by operating the control device 100, and can send a first command to the display apparatus 200 by pressing a "Confirm" key on the control device 100, where the first command indicates to delete the to-be-deleted sub-content "Music 1" from the second shortcut list. In response to the first command, the display apparatus 200 can delete "Music 1" from the second shortcut list. In this case, the second shortcut list can include "Music 3", that is, "Music 3" is all the to-be-presented sub-content. The user moves the focus to a function key, for example, a "Play" key, on the second shortcut list by operating the control device 100, so as to send a second command, which indicates to present all the to-be-presented sub-contents, that is, to play "Music 3", to the display apparatus 200. As described above, the first edit command can include the first command and the second command.

Figure 18:
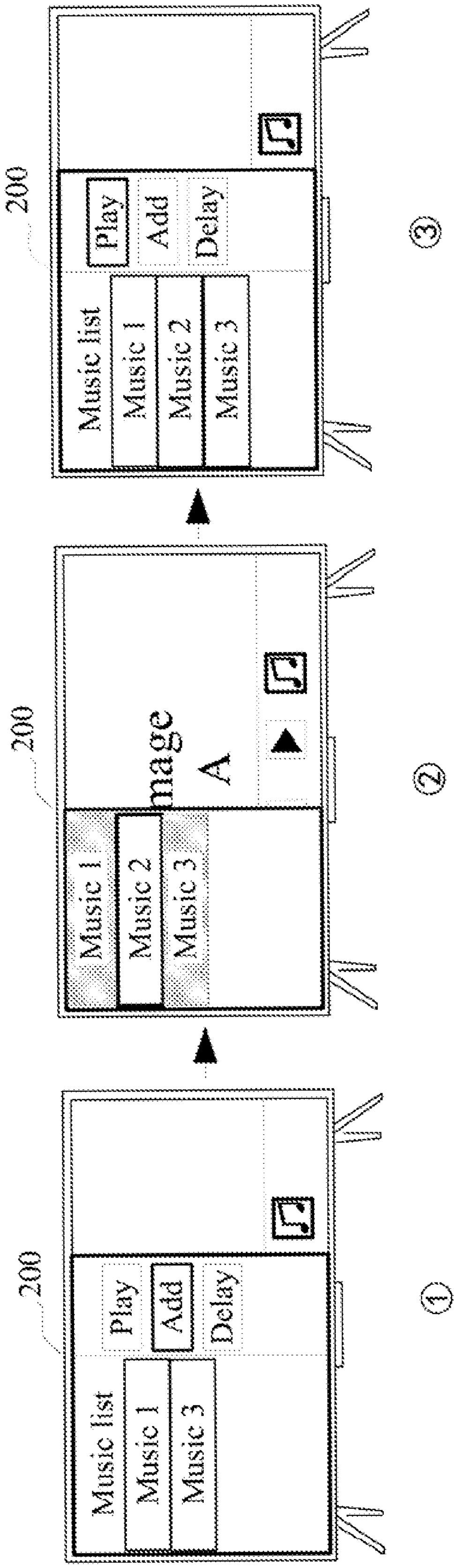
FIG. 18 is a schematic diagram of interaction in which a user can control a display apparatus to edit a second shortcut list according to some embodiments of the disclosure.

In some embodiments, as shown in ① of FIG. 18, the user moves a focus to a function key, for example, an "Add" key on the second shortcut list, by operating the control device 100, and presses a "Confirm" key on the control device 100 to send a third command to the display apparatus 200, the third command can be used for indicating to present a selectable list, where the selectable list can include all sub-contents in the first external device, and the to-be-presented sub-contents that have been already in the second shortcut list can be identified from all the sub-contents. The selectable list and the second shortcut list may be presented in different layers, or may be presented in same layer, however, the selectable list and the first user interface can be presented in different layers. As shown in FIG. 18 ②, taking the selectable list and the second shortcut list being presented in the same layer as an example, in this case, only the selectable list is presented, and the second shortcut list presented is deleted, and the selectable list can include all sub-contents "Music 1", "Music 2" and "Music 3", where the second shortcuts list can include "Music 1" and "Music 3". Options for "Music 1" and "Music 3" in the selectable list may be grayed out to alert the user that these two items have been already in the second shortcut list. The user moves a focus to a to-be-added sub-content, such as "Music 2", in the selectable list by operating the control device 100, and presses the "Confirm" key on the control device 100 to issue a fourth command to the display apparatus 200, where the fourth command is used for indicating to add an item of the to-be-added sub-content to the second shortcut list for the presentation. In response to the fourth command, the display apparatus 200 can delete the presented selectable list, and can present the second shortcut list as shown in ③ of FIG. 18 again. In this case, the second shortcut list is an edited second shortcut list, that is, the edited second shortcut list can include a newly added "Music 2". In this case, all the to-be-presented sub-contents include "Music 1", "Music 2", and "Music 3". The user moves a focus to a function key, for example, a "Play" key, on the second shortcut list by operating the control device 100, so as to send a fifth command, which indicates to present all the to-be-presented sub-contents, that is, to play "Music 1", "Music 2" and "Music 3", to the display apparatus 200. As described above, the first edit command can include the third command, the fourth command, and the fifth command.

S1604: in response to the first edit command, presenting a third user interface, where the third user interface corresponds to the main content and the target sub-content.

In response to the first edit command, the display apparatus 200 can present the target sub-content, such as the target sub-content "Music 2" in the flows shown in ① to ④ of FIG. 17, or the target sub-contents "Music 1" and "Music 3" in the flows shown in ① and ⑤ to ⑥ of FIG. 17, or the target sub-contents "Music 1", "Music 2" and "Music 3" in the flow shown in FIG. 18.

In some embodiments, if any one of the main content or the target sub-content is a content with no image, the third user interface corresponds to a user interface having a content with an image in the main content and the target sub-content, and at the same time, the third user interface further can include overview information of the content with no image. For example, in the flows shown in ① to ④ of FIG. 17, the main content is "image A", which is a content with an image, and the target sub-content is "Music 2", which is a content with no image, then the third user interface is shown in ④ of FIG. 17, which can include "image A" and the overview information of "Music 2", such as "Now playing: Music 2". For another example, in the flows shown in ①, ⑤ to ⑥ of FIG. 17, the main content is "image A", which is a content with an image, and the target sub-contents are "Music 1" and "Music 3", both of which are contents with no image, then the third user interface is as shown in ⑥ of FIG. 17, which can include the overview information of "image A" and "Music 1" and "Music 3", for example, "Now playing: Music 1, Next: Music 3. For another example, the main content is music, which is a content with no image. In this case, the first user interface corresponds to the main desktop of the display apparatus 200, and the target sub-content is an image, so the third user interface can include the image and the overview information corresponding to the music of the main content.

In some embodiments, if both the main content and the target sub content include images, the third user interface can present the images corresponding to the main content and the target sub content at the same time, where the images of the main and target sub content may be presented according to a certain proportion or may be partially overlapped.

In the above embodiments, the display apparatus 200 may directly present the second shortcut list on the current user interface in response to the second command sent from the user, and further present other contents in the current external device simultaneously in response to the first edit command sent from the user based on the second shortcut list.

Figure 19:
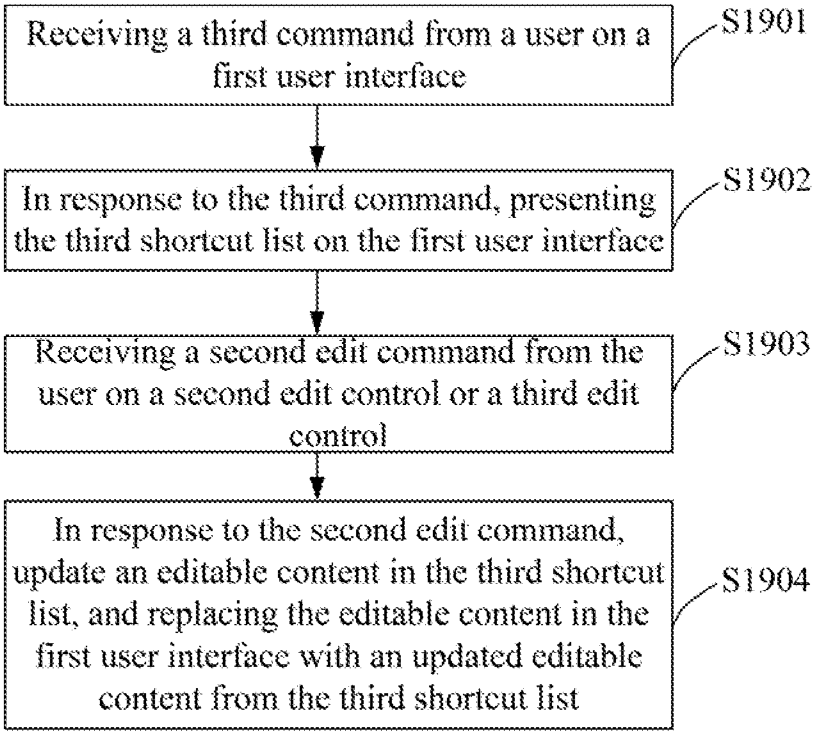
FIG. 19 is a flow chart of a display apparatus modifying a user interface according to some embodiments of the disclosure.

In addition to the above processing, the display apparatus according to embodiments of the disclosure may also edit the user interface currently presented on the display apparatus 200 according to the flow shown in FIG. 19.

S1901: receiving a third command from a user on a first user interface, where the third command is used for indicating to present a third shortcut list, and the third shortcut list can include an editable content, a second edit control, and a third edit control, where the second edit control is used for indicating a presentation state of the editable content. The third edit control is used for indicating to present a fourth shortcut list, and the fourth shortcut list can include an available content in the first external device addable to the editable content.

In some embodiments, the user is restricted from directly editing the current user interface, so as to avoid the user's misoperation on the current user interface. The current user interface can be indirectly edited by providing a shortcut list, that is, a third shortcut list, dedicated to editing the current user interfaces. Taking the first user interface as the current user interface for illustration, the first user interface can include an editable content, as shown in ① of FIG. 20, the first interface is a "music playing interface", where a music list in a dotted line box is an editable content, including items of "Music 1" and "Music 2". The user cannot edit the music list directly, and needs to edit the music list indirectly through the third shortcut list.

The user may issue a third command to the display apparatus 200 by operating the control device 100, and the third command is used for indicating the display apparatus 200 to directly present the third shortcut list on the first user interface. Interactive information corresponding to the third command may refer to the interactive information corresponding to the first command in the above embodiments, and the interactive information of the second command in the above embodiments. It should be noted that the interactive information corresponding to the third command, the interactive information corresponding to the second command and the interactive information corresponding to the first command are different, so as to distinguish the first command, the second command and the third command.

S1902: in response to the third command, presenting the third shortcut list on the first user interface.

Figure 20:
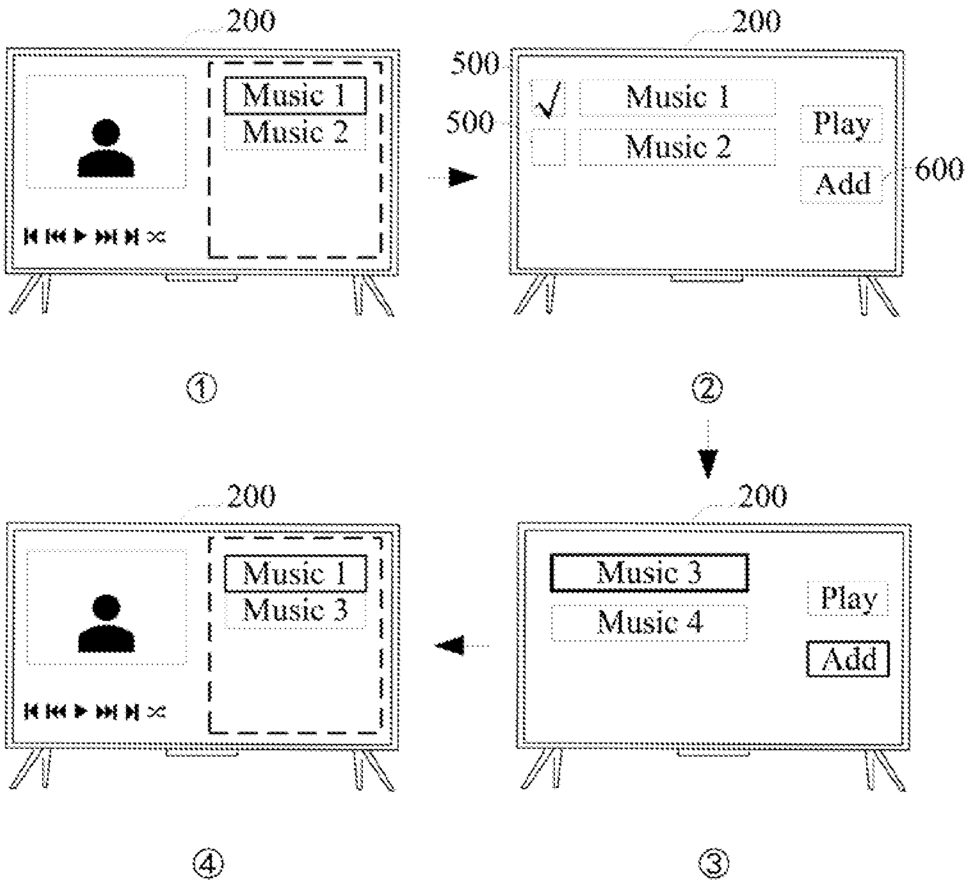
FIG. 20 is a schematic diagram of interaction in which a user can control a display apparatus to modify a user interface according to some embodiments of the disclosure.

In response to the third command, the display apparatus 200 directly can present a third shortcut list on the first user interface, as shown in ② of FIG. 20. The third shortcut list can include the editable content, that is, the music list, in the first user interface and also can include a second edit control 500, and a third edit control 600 ("Add" key shown in FIG. 20).

Step S1903: receiving a second edit command from the user on a second edit control or a third edit control, where the second edit command is used for indicating to change the presentation state of the editable content, and/or indicating to add a designated available content to the editable content.

In some embodiments, the user can issue a second edit command to the display apparatus 200 through the second edit control 500 by operating the control device 100. In some embodiments, the second edit control 500 is used for indicating the presentation state of the editable content, where the second edit control 500 is marked with a "√", indicating that the presentation state of the editable content is "presented". If the second edit control 500 is not marked with "√", it indicates that the presentation state of the editable content is "not presented". As shown in ② of FIG. 20, the editable content can include items of "Music 1" and "Music 2", and the left sides of the items are respectively provided with corresponding second edit controls 500, where a second edit command is sent on the second edit control 500 corresponding to "Music 1" to indicate that the presentation state of "Music 2" is "presented", and the second edit control 500 is provided with an identifier "√". A second edit command is sent on the second edit control 500 corresponding to "Music 2" to indicate that the presentation state of "Music 2" is "not presented", and the second edit control 500 does not have the mark "√".

In some embodiments, the user can issue a second edit command to the display apparatus 200 through the third edit control 600 by operating the control device 100. In some embodiments, the third edit control 600 is used for indicating to present a fourth shortcut list, as shown in ② of FIG. 20, and the third edit control 600 is an "Add" control. As shown in ③ of FIG. 20, the fourth shortcut list can include an available content, such as "Music 3" and "Music 4", in the first external device addable to the editable content. The user can issue a second edit command to the display apparatus 200 on the designated available content, such as the item of "Music 3", by operating the control device 100, such as moving the focus to the item of "Music 3", and by clicking an "Add" control on the fourth shortcut list, to indicate the display apparatus 200 to add an item of the designated available content "Music 3" to the editable content.

S1904: in response to the second edit command, update an editable content in the third shortcut list, and replacing the editable content in the first user interface with an updated editable content from the third shortcut list.

In response to the second edit command, the display apparatus 200 can update the editable content in the third shortcut list. For example, in response to the second edit command shown in ② and ③ of FIG. 20, the display apparatus 200 does not present "Music 2", but adds "Music 3" to the editable content. The display apparatus 200 can replace the editable content in the first user interface with the updated editable content to obtain an updated first user interface, as shown in ④ of FIG. 20, where the editable content can include "Music 1" and "Music 3", and the editing for the first user interface is completed.

In the above embodiments, the display apparatus 200 may directly present the third shortcut list on the current user interface in response to the third command sent from the user, and further modify the content from the current user interface in response to the second edit command sent from the user based on the third shortcut list.

In the display apparatus and the method for presenting a content from an external device according to the above embodiments, the display apparatus 200 may directly present the first shortcut list on the first user interface in response to the first command sent from the user, present information of all external devices to the user through the first shortcut list, and present the second user interface corresponding to the content from the second external device in response to the first selection command sent from the user based on the first shortcut list, so that the efficiency of presenting the content from the external device by the display apparatus 200 is improved, the operation from the user is simplified, and the experience of the user is improved.

Figure 21:
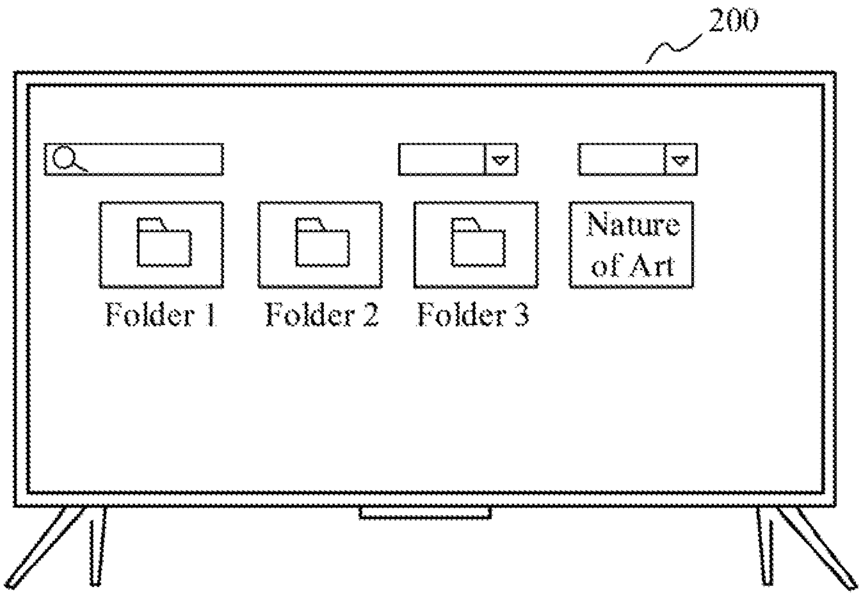
FIG. 21 is a schematic diagram of a page in which resources in a U disk are presented on a display apparatus 200 according to some embodiments of the disclosure.

Currently, the display apparatus 200 may play a video content in full screen or in a window. Playing in full screen is conventional, such as playing TV series, movies and so on. Playing in a window generally can refer to a play mode in which the display apparatus 200 provides preview content for the user. For example, when the display apparatus 200 is connected with an external device such as a U disk, the display apparatus may present a small window corresponding to each video resource in the U disk, as shown in FIG. 21. A small window called "Nature of Art" shown in FIG. 21 can play first few seconds of a corresponding video for the user to preview.

Generally, when the display apparatus 200 can play a Dolby Vision video, a Dolby Vision Bright mode can be used by default, and then the user can switch an image mode to a Dolby Vision Dark mode according to his/her own needs. However, when a quantity of local dimming partitions of the display apparatus 200 is less than 64, the display apparatus 200 may enable a global dimming function in the Dolby Vision Dark mode, so that a video content played in a small window of the U disk may appear in the image constantly light and dark changes.

It can be seen that when the display apparatus 200 uses the small window to play the Dolby Vision video on the U disk, if the current image mode is the Dolby Vision Dark mode, brightness of a video image will be unstable, thereby affecting user experience.

In view of the issues, such as, when the Dolby Vision video content from an external device such as a U disk is previewed through a small window on the display apparatus 200, the image is likely to have light and dark changes often, some embodiments of the disclosure provide a display apparatus 200. The display apparatus 200 may set a current image mode as a target mode after an external device 500 such as a U disk is connected and when a peripheral interface of the external device 500 is presented, so that even if the user has previously set the image mode as the Dolby Vision Dark mode or other modes, when the display apparatus 200 can play a Dolby Vision video in a small window on the external device 200, a target mode such as the Dolby Vision Bright mode can be used for play to avoid the problem of unstable image brightness caused by the Dolby Vision Dark mode.

Figure 22:
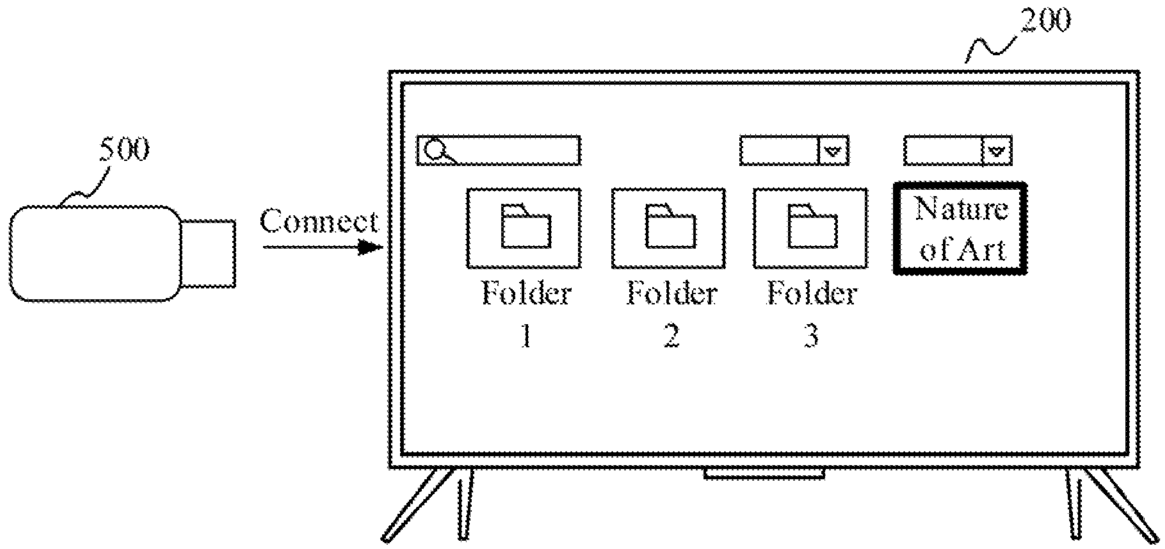
FIG. 22 is a schematic diagram of an external storage device 500 connected with a display apparatus 200 according to some embodiments of the disclosure.

FIG. 22 is a schematic diagram of an external device 500 connected with the display apparatus 200 according to some embodiments of the disclosure. As shown in FIG. 22, after the display apparatus is connected with the external device 500, the peripheral interface of the external device is generally directly presented. On the peripheral interface, a file in the external device 500 may be presented. If the file itself is a video resource, the peripheral interface will directly present the video resource in form of a window, which may present an image content from a certain frame of the video resource and a total duration of the video resource.

Figure 23:
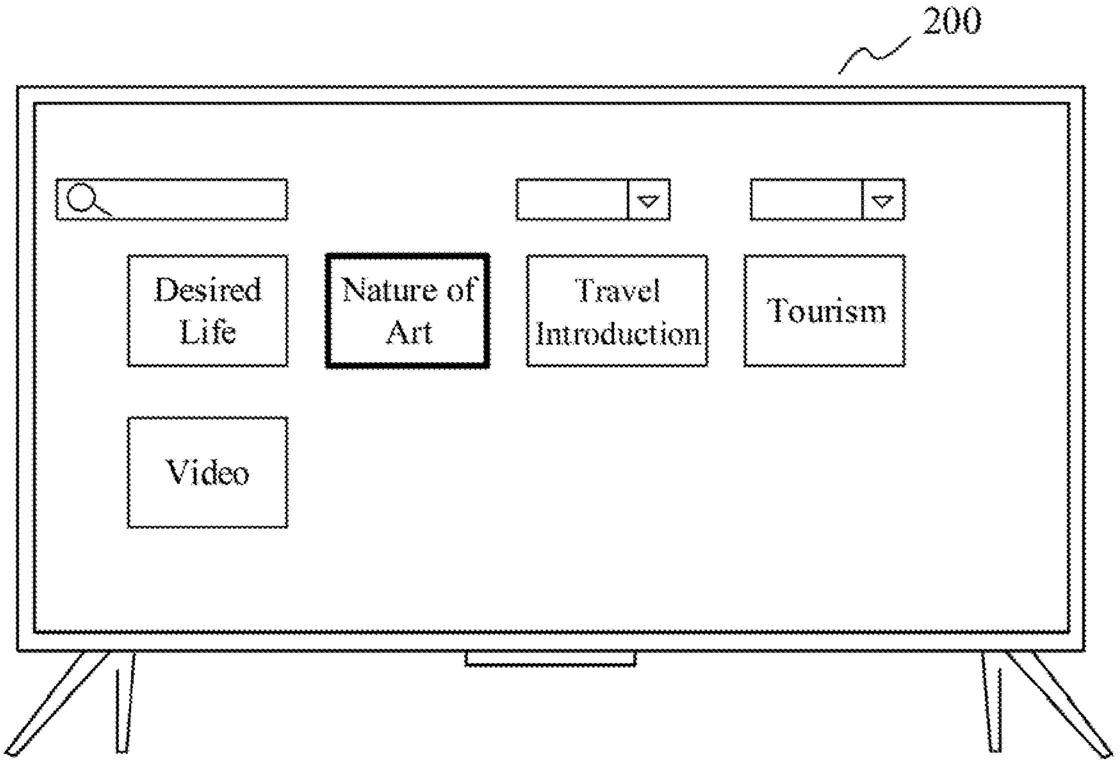
FIG. 23 is a schematic diagram of a peripheral interface on a display apparatus 200 according to some embodiments of the disclosure.

FIG. 23 is a schematic diagram of a peripheral interface on the display apparatus 200 according to some embodiments of the disclosure. For example, if only five video resources are stored in the external device 500, as shown in FIG. 23, five video windows corresponding to the five video resources are presented on the peripheral interface. After viewing the peripheral interface, the user can select a target content to continue viewing by moving a focus on the interface. When the focus moves to a video window, the video window may automatically circularly play the video content for a time duration after waiting for a time duration. For example, 2 seconds after the focus is moved to the second video window in FIG. 23, the video content from the first 5 seconds is automatically cyclically played in the second video window.

Figure 24:
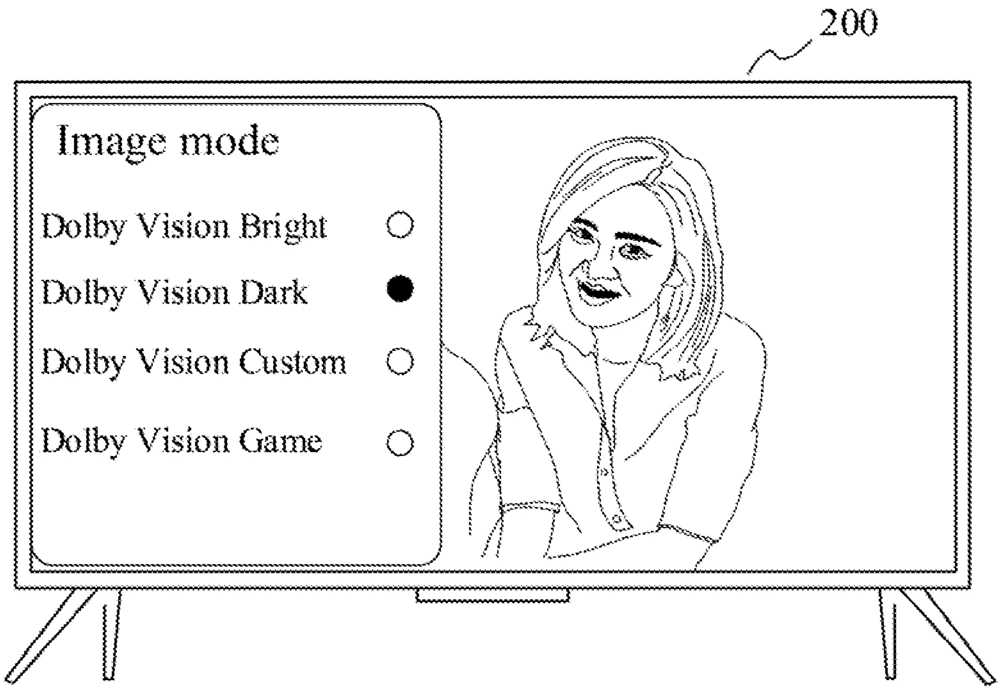
FIG. 24 is a schematic diagram of an image mode setting page on a display apparatus 200 according to some embodiments of the disclosure.

FIG. 24 is a schematic diagram of an image mode setting page on the display apparatus 200 according to some embodiments of the disclosure. As shown in FIG. 24, image modes presented on the image mode setting page may include image modes such as Dolby Vision Bright, Dolby Vision Dark, Dolby Vision Custom, and Dolby Vision Game. When watching any Dolby Vision video on the display apparatus 200, the user may select a target image mode for use according to his/her own needs. For example, the user may select a Dolby Vision Dark option on the image mode setting page by moving the focus to the Dolby Vision Dark option through the control device 100 such as a remote controller and then pressing "Confirm" on the control device 100. The display apparatus 200 may play Dolby Vision video content using the Dolby Vision Dark mode.

When the display apparatus 200 can present the peripheral interface, the display apparatus 200 automatically sets the image mode to the Dolby Vision Bright mode even if the user has previously set the Dolby Vision Dark or other image modes. In this case, the display apparatus 200 also automatically can update the selected image mode on the image mode setting page, that is, changing the Dolby Vision Bright mode to the selected mode on the image mode setting page.

When the display apparatus 200 is in the Dolby Vision Bright mode, no matter whether the local dimming partition of the display apparatus 200 is smaller than 64, the global dimming function will not be enabled when the video preview content is played on the video window on the peripheral interface. The image played on the video window will not have light and dark changes.

Figure 25:
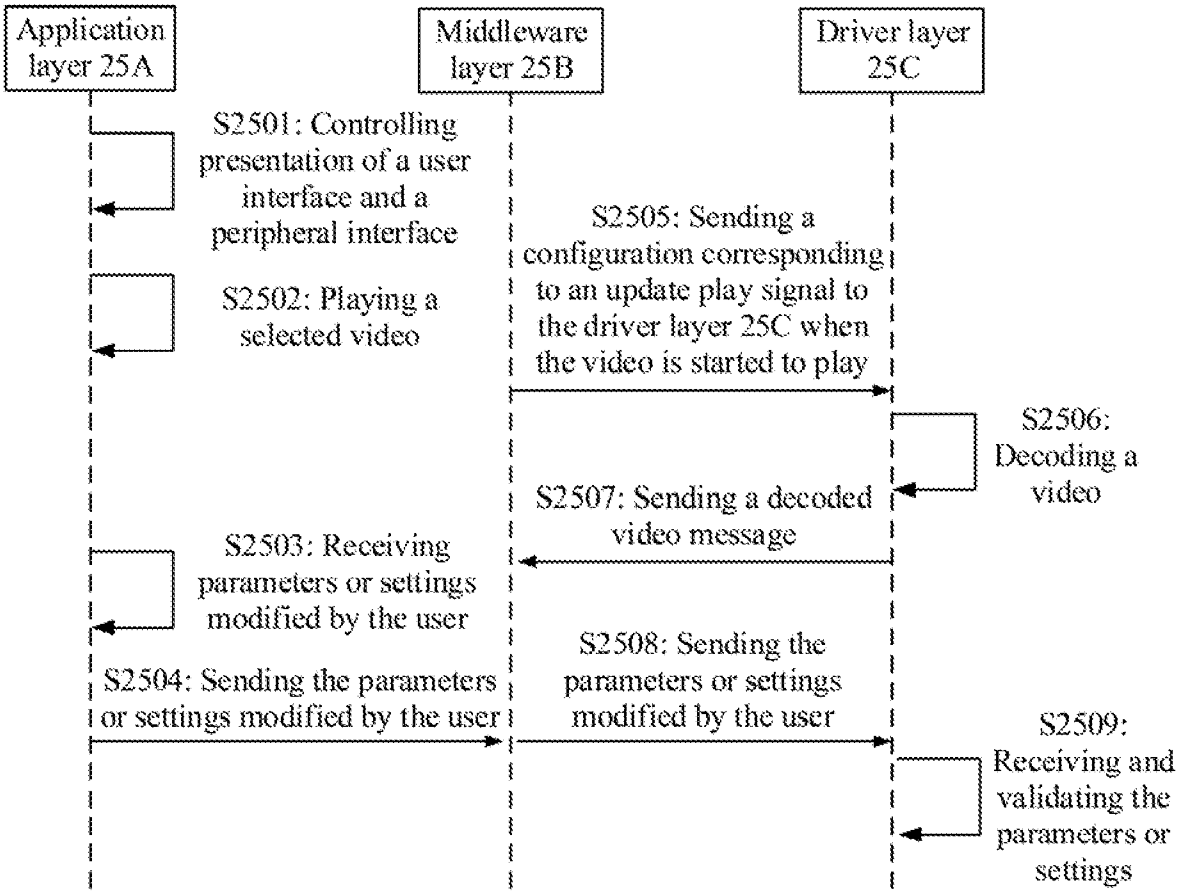
FIG. 25 is a schematic diagram of a processing flow among processing layers in a display apparatus 200 according to some embodiments of the disclosure.

In the display apparatus 200, layers such as an application layer, a middleware layer, and a driver layer, etc., can be generally provided to implement different processes in video playback. FIG. 25 is a schematic diagram of a processing flow among processing layers in the display apparatus 200 according to some embodiments of the disclosure. As shown in FIG. 25, the application layer 25A may perform the step S2501 as shown in FIG. 25 to control presentation of a user interface and a peripheral interface. On the user interface and the peripheral interface, the user may select to play different video contents, that is, the application layer can perform step S2502 to play a selected video. In addition, various settings or parameters of the display apparatus 200 may also be modified in the interface, that is, after the application layer receives parameters or settings modified by the user in step S2503, step S2504 is performed to send the parameters or settings modified by the user to the middleware layer. The middleware layer 25B serves as a connecting link between the preceding and the following. When the application layer can perform the above step S2502, the middleware layer can perform step S2505 to send a configuration corresponding to an update play signal to the driver layer 25C when the video is started to play. In this case, the driver layer 25C can perform step S2506 to decode a video when the video is played, and can perform step S2507 to send a decoded video message to the middleware layer 25B. Correspondingly, when the application layer can perform the above step S2504, the middleware layer can perform step S2508 to send the parameters or settings modified by the user to the driver layer 25C. After receiving the parameters or settings from the middleware layer 25B, the driver layer 25C can perform step S2509 to receive and validate the parameters or settings.

Through the above process, the display apparatus 200 according to some embodiments of the disclosure can implement the process of automatically setting the image mode when presenting the peripheral interface and the process of playing a previewed video content in a video window in a set image mode based on the application layer 25A, the middleware layer 25B, and the driver layer 25C. Moreover, the middleware layer 25B may automatically set the target mode when the display apparatus 200 can present the peripheral interface, and send the target mode to the driver layer 25C, so that the driver layer 25C can play the video content in the target mode.

Figure 26:
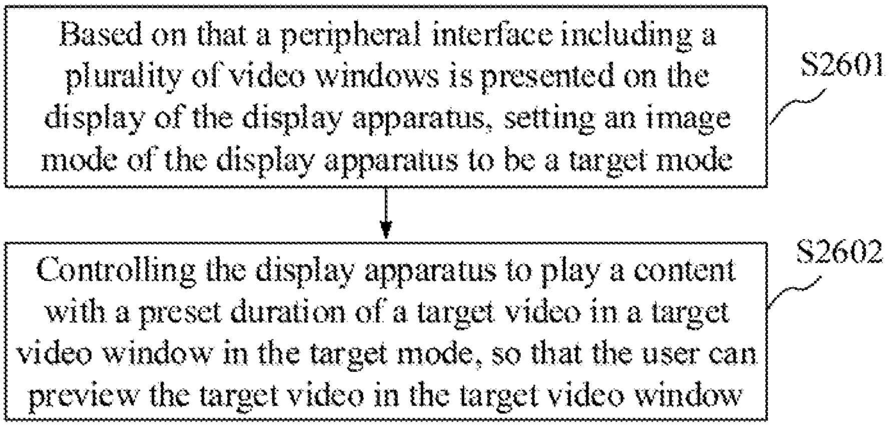
FIG. 26 is a schematic diagram of a method for playing a video according to some embodiments of the disclosure.

Some embodiments of the disclosure further provide a method for playing a video, which can be applied to the display apparatus 200 of the foregoing embodiments. The processor in the display apparatus may be configured to implement the steps of the method for playing a video. FIG. 26 is a schematic diagram of a method for playing a video according to some embodiments of the disclosure. As shown in FIG. 26, the method may include following steps.

Step S2601, based on that a peripheral interface including a plurality of video windows is presented on the display of the display apparatus, setting an image mode of the display apparatus to be a target mode.

The target mode may be the Dolby Vision Bright mode described in the foregoing embodiments. The peripheral interface is a user interface provided by the display apparatus 200 for an external device, and each video window on the peripheral interface corresponds to a video content.

The display apparatus 200 may directly present the peripheral interface after the external device 500 is connected with the display apparatus 200. Alternatively, the display apparatus 200 may also present the peripheral interface after exiting from another display page. For example, the user has selected a certain target video content on the peripheral interface to play in full screen, and when the user can control the display apparatus 200 to exit from the current full-screen play page, the display apparatus 200 may present the peripheral interface including several video windows. The peripheral interface can include not only the video window corresponding to the video content that has exited full-screen play, but also another unselected video window.

When the display apparatus 200 is not connected with the external device 200, the display apparatus 200 may also play a video resource in another channel. In addition, the user may also select different image modes according to his/her own needs. When the video resource being played is a Dolby Vision resource, the display apparatus 200 may also provide the user with four image modes as shown in FIG. 24. When the user selects a certain image mode and then connects the external device 500 with the display apparatus 200, the image mode can still be set as the target mode when the display apparatus 200 presents the peripheral interface.

Step S2602: controlling the display apparatus to play a content with a preset duration of a target video in a target video window in the target mode, so that the user can preview the target video in the target video window.

The content with the preset duration can be generally the content from the first few seconds, for example, 5 seconds, 3 seconds, etc., of the target video. Moreover, if the content with the preset duration in the target video window is played completely, and the user does not perform other operations all the time, that is, the focus is positioned on the target video window all the time, the content with the preset duration will be played circularly in the target video window until the user performs other operations.

Figure 27:
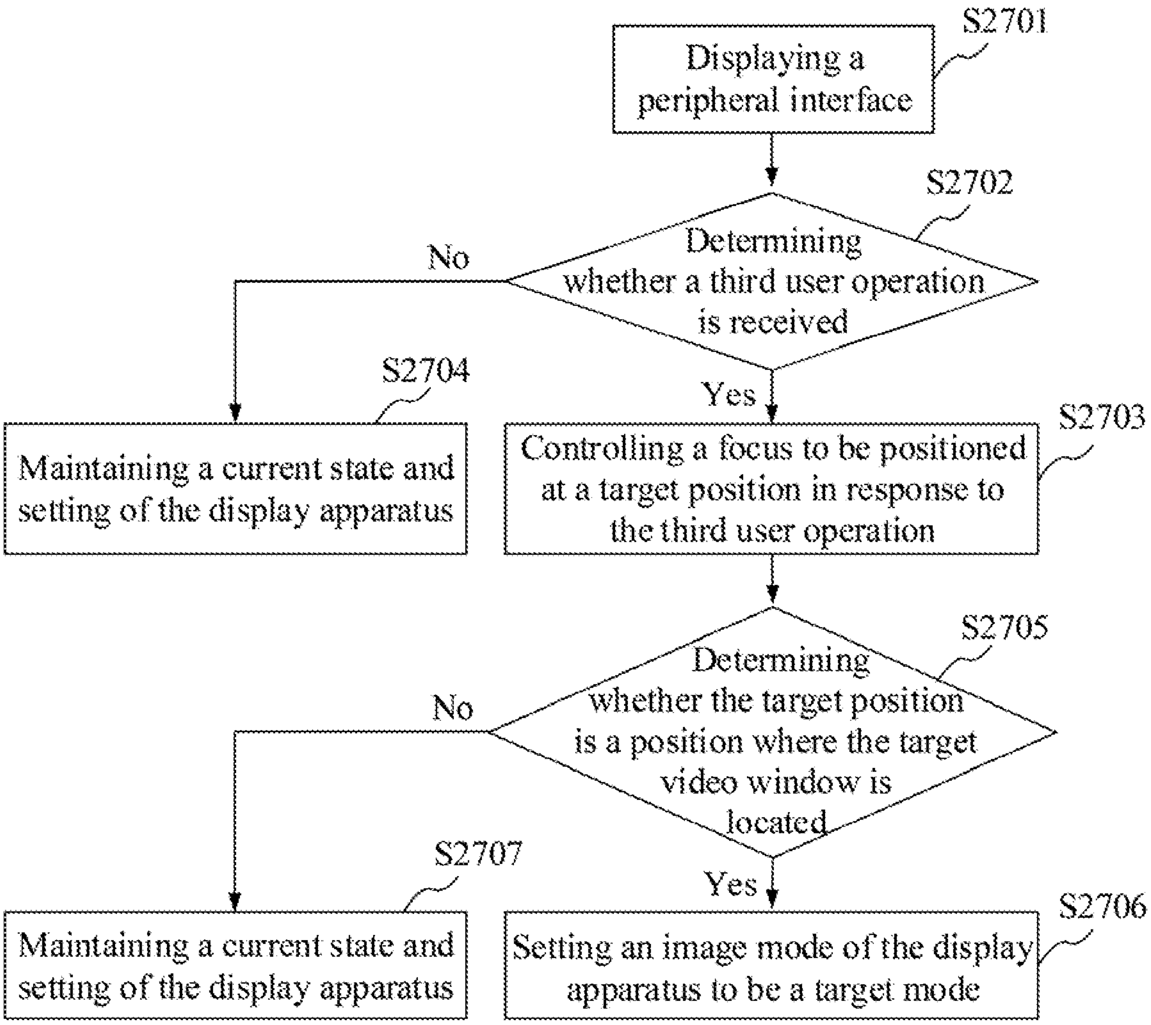
FIG. 27 is a flowchart of setting a target mode according to some embodiments of the disclosure.

In some embodiments, if the display apparatus 200 directly can present the peripheral interface after the external device 500 is connected with the display apparatus 200, the display apparatus 200 may set the image mode to the target mode when the user selects the target video window. Step S2601 may further include steps S2701 to S2707, as shown in FIG. 27. Step S2701, the display apparatus is controlled to present a peripheral interface including a plurality of video windows. Step S2702, whether a third user operation from the user to move the focus on the peripheral interface is received will be determined. The third user operation is an operation in which the user moves the focus on the peripheral interface via the control device 100, such as a remote controller, and may also be an operation in which the user inputs a voice command to the display apparatus 200 to position the focus on the peripheral interface. In step S2703, if the third user operation is received, the display apparatus can control a focus to be positioned at a target position in response to the third user operation. If the third user operation is not received, in step S2704, the display apparatus 200 is not controlled to perform any operation, and a current state and setting of the display apparatus 200 are maintained.

In some cases, when the display apparatus 200 can present the peripheral interface, in addition to presenting a plurality of video windows on the peripheral interface, some other menu windows or active windows, such as a search window located above the video windows and some selection windows with pull-down options in FIG. 23, may be also presented the peripheral interface. If the focus is positioned on these non-video windows, the display apparatus 200 needs to present corresponding content or options on the respective non-video windows.

In order to determine whether the user selects the target video window on the peripheral interface during operation, as shown in FIG. 27, in step S2705, it is also necessary to determine whether the target position after focus positioning is a position where the target video window is located. Also, in step S2706, if the target position is the position where the target video window is located, an image mode of the display apparatus 200 is set to be a target mode. If the target position is not the position where the target video window is located, in step S2707, the display apparatus 200 is not controlled to perform any operation, and a current state and setting of the display apparatus 200 are maintained.

In some embodiments, when determining whether the target position is the position where the target video window is located, it can be determined by obtaining a region size of the target position. Generally, a size of a video window under the DMP channel is fixed, and then it can be determined whether the region size of the target position is the fixed size of the video window. This fixed size can be used as a preset size, for example, the size of the video window is 687 mm in width, 921 mm in height, etc. If the region size of the target position is the preset size, it may be determined that the target position is the position where the target video window is located, that is, the focus is positioned on the target video window. If the region size of the target position is not the preset size, it may be determined that the target position is not the position where the target video window is located, i.e., the focus is not positioned on the target video.

In the above embodiments, before the display apparatus 200 automatically sets the target mode, the image mode historically set by the user in the display apparatus 200 may be the Dolby Vision Dark mode, the Dolby Vision Bright mode or other modes. If the user's historical set is a mode other than the Dolby Vision Dark mode, the brightness of the image in the target video window remains stable during the process of the display apparatus 200 presenting the peripheral interface and automatically setting the target mode.

However, if the user's historical set is to the Dolby Vision Dark mode, during the process of the display apparatus 200 presenting the peripheral interface and automatically setting the target mode, the image in the target video window may be dark at the start of the video playback, and then will be presented in a stable and bright manner. According to some embodiments of the disclosure, this phenomenon can be specifically explained as follows based on the application layer 25A, the middleware layer 25B, and the driver layer 25C in the foregoing embodiment.

Figure 28:
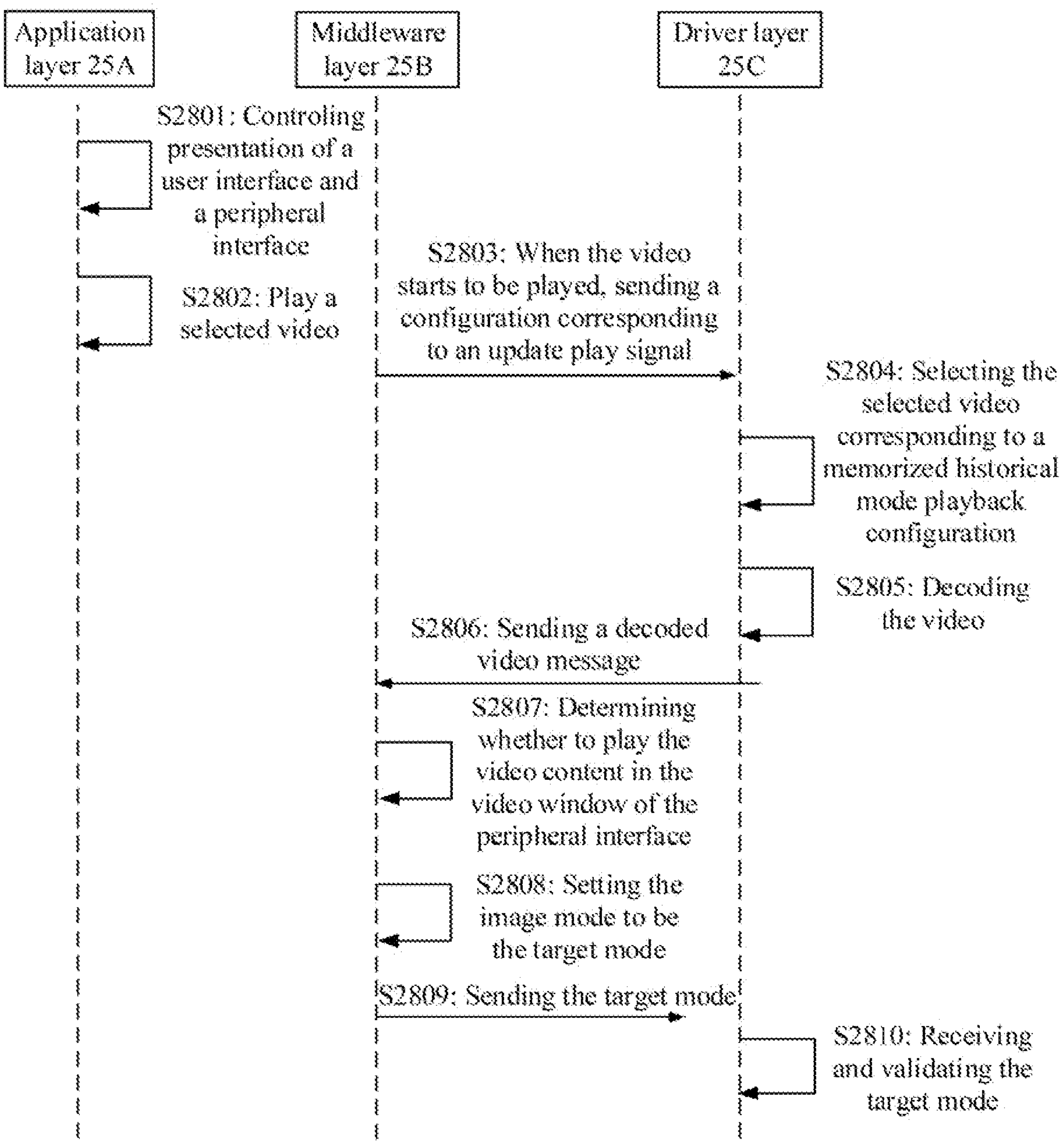
FIG. 28 is another schematic diagram of a processing flow among processing layers in a display apparatus 200 according to some embodiments of the disclosure.

In the process as shown in FIG. 28, when the user enters the DMP source (for example, a U disk) and selects to play a video in full screen, the DMP can first notify the driver layer 25C, and the driver layer 25C first decodes the video to determine that a signal format of the currently played video is Dolby Vision, and then notifies the middleware layer 25B that this is a Dolby Vision signal. After receiving a message from the driver layer 25C, the middleware layer 25B refreshes the image mode and parameters (for example, obtains the image mode and parameters set when the Dolby Vision video was played last time) corresponding to Dolby Vision and can send the image mode and parameters to the driver layer 25C for validation. It can be seen that when the Dolby Vision video starts to be played, the driver layer 25C knows first, and the middleware layer 25B knows later.

If the Dolby Vision image mode set by the user in the previous playback is the Dolby Vision Dark mode, the middleware layer 25B can send the Dolby vision Dark mode to the driver layer 25C for validation. In this case, the driver layer 25C memorizes the image mode of Dolby Vision Dark. When the display apparatus 200 can play the Dolby Vision video in the video window of the DMP, the driver layer 25C knows it first and can play it in the Dolby Vision Dark mode, which causes the image to be dark for a while, and then notifies the middleware layer 25B. The middleware layer 25B then automatically sets the Dolby Vision Bright mode and can send the Dolby Vision Bright mode to the driver layer 25C for validation, so that the image is lit up, and thereafter the brightness is kept unchanged.

It can be seen that when the display apparatus 200 can determine that the user moves the focus to the target video window and then sets the target mode, although the brightness of the image in the video window can be kept stable on the whole, if the Dolby Vision Dark mode has been set before, then there will still be a dark phenomenon when the video starts to be played in the video window, which may still make users feel abnormal.

In order to further avoid the phenomenon where the video in the video window is dark when starting to be played, in the above step S2601, when the display apparatus 200 can present the peripheral interface, the image mode of the display apparatus 200 may be directly set to be the target mode, that is, it is not necessary to determine whether the user moves the focus, and it is not necessary to determine whether the user selects the target video window. After the target mode is set when the display apparatus 200 can present the peripheral interface, if the user selects a target video window on the peripheral interface, the display apparatus 200 may directly use the set target mode to play when a video in the target video window starts to be played, thereby avoiding setting the target mode after the video is played, so that the video in the video window has stable brightness from the start of playing, and the phenomenon of brightness change will not occur.

In addition, as described above, the case where the display apparatus 200 can present the peripheral interface may also be a case where the display apparatus 200 firstly can play the Dolby Vision video in the external device 500 in full screen and then exits from the full-screen playing page. The user may set the current image mode according to his/her own needs when the Dolby Vision video is played in full screen, and then, when the user selects to exit the full-screen play, the display apparatus 200 can present a peripheral interface, and in this case, according to the contents of the foregoing embodiments, the previously set image mode may be changed to the target mode.

Figure 29:
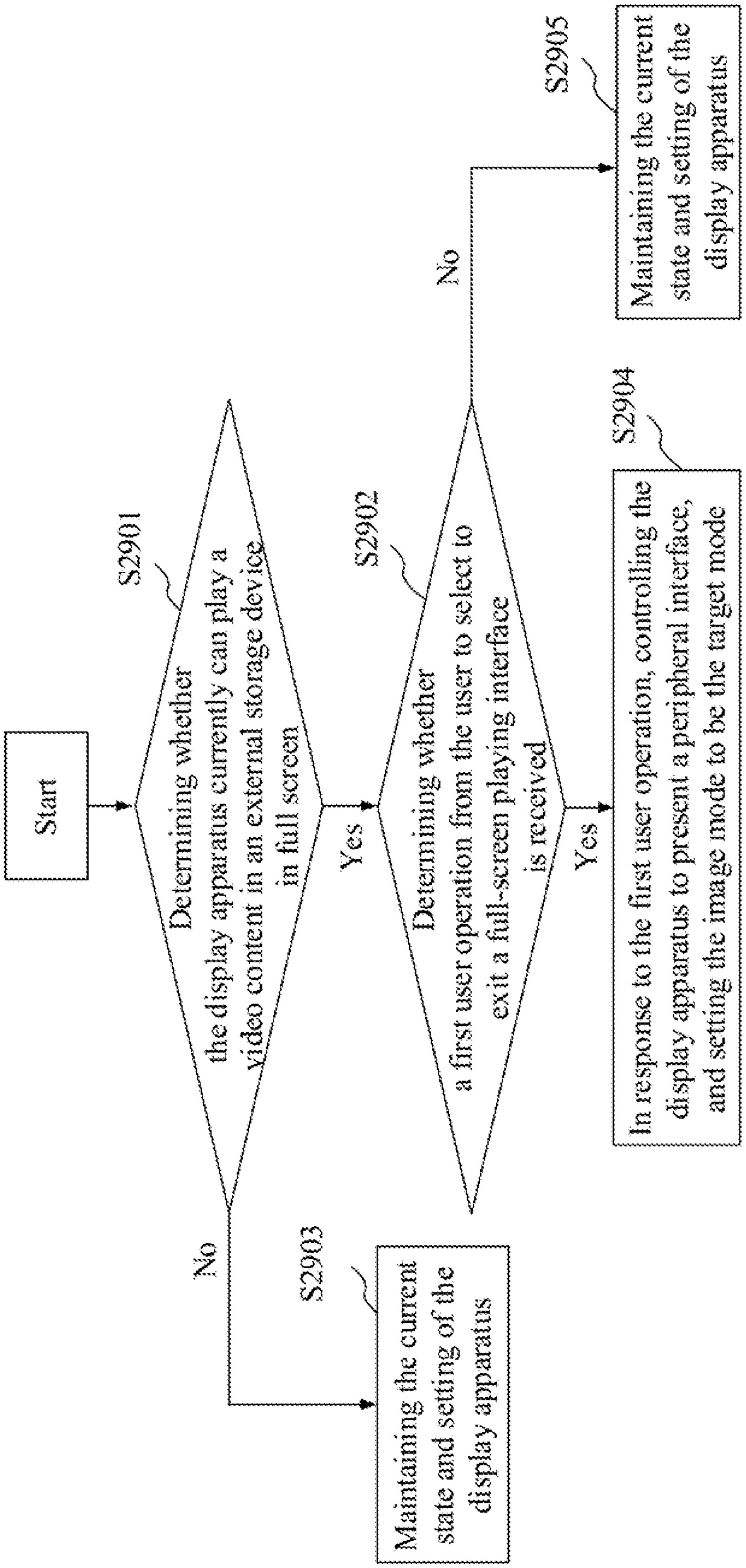
FIG. 29 is another flowchart for setting a target mode according to some embodiments of the disclosure.

Furthermore, in some embodiments, as shown in FIG. 29, step S2601 may further include steps S2901 to S2905. In step S2901, it is determined whether the display apparatus 200 currently can play a video content in an external device 500 in full screen. In step S2902, if the display apparatus 200 currently can play the video content in the external device 500 in full screen, it may further determine whether a first user operation from the user to select to exit a full-screen playing interface is received. If the display apparatus 200 does not present the video content in the external device 500 in full screen, then the flow goes to step S2903, the target mode is not set, and the current state and setting of the display apparatus 200 are maintained.

In step S2904, if the first user operation is received, in response to the first user operation, the display apparatus 200 is controlled to present a peripheral interface including a plurality of video windows, and the image mode of the display apparatus 200 is set to be the target mode. If the first user operation is not received, the target mode is not set and the current state and setting of the display apparatus 200 are maintained in step S2905.

The first user operation may be an operation in which the user controls the display apparatus 200 by pressing a "back" key on the control device 100 such as a remote controller, or may be an operation in which the user inputs a voice command to the display apparatus 200 to realize a control function.

In the process shown in FIG. 29, after the target mode is set, it may be continuously determined whether the display apparatus 200 receives a second user operation from the user to select a target video window on the peripheral interface, and if the display apparatus 200 receives the second user operation, the display apparatus 200 may position a focus on the peripheral interface to a position of the target video window in response to the second user operation. In addition, in response to the second user operation, it is also necessary to determine whether the target position of the moving focus selected by the user is the position of the target video window, and the specific determination method can refer to the contents of the foregoing embodiments.

In addition, regardless of the manner of setting the target mode in the foregoing embodiments, when determining whether the user moves the focus to the target video window, if it is determined that the target position where the user moves the focus is not the position where the target video window is located, it is necessary to determine a history mode previously set, and control the display apparatus to continue playing a video content currently selected by the user in the history mode.

For example, when the display apparatus 200 can present a Dolby Vision video, the user sets the Dolby Vision Dark mode according to his/her own needs, and if the user moves the focus on the peripheral interface but does not select any video window, the current Dolby Vision Dark mode is not changed to the target mode in the above step S2601. The display apparatus 200 will still play another Dolby Vision video using the Dolby Vision Dark mode.

It should be noted that a prerequisite for implementing the method of the foregoing embodiments of the disclosure is that the video content played by the display apparatus 200 is a Dolby Vision resource, or a format of the video content is Dolby Vision. Furthermore, in the foregoing embodiments, if the target position where the user moves the focus on the peripheral interface is the position where the target video window is located, it needs to further determine whether the content from the target video corresponding to the target video window is a Dolby Vision resource; in a case where the content from the target video is a Dolby Vision resource, the image mode of the display apparatus 200 is set to be the target mode again.

Alternatively, when the display apparatus 200 receives the first user operation and can present the peripheral interface in response to the first user operation, it is determined whether the video content played in full screen is a Dolby Vision resource, and in a case that the video content is the Dolby Vision resource, the image mode of the display apparatus 200 is set to be the target mode.

In addition, in some embodiments, before step S2601, it needs to determine whether the external device 500 is connected with the display apparatus 200. If the display apparatus 200 is connected with the external device 500, the display apparatus 200 may be controlled to present the peripheral interface corresponding to the external device 500. If the display apparatus 200 is not connected with the external device 500, the display apparatus 200 does not need to present the peripheral interface.

The processor in the display apparatus 200 may be configured to perform various steps in the method for playing a video. According to schemes of embodiments of the disclosure, when the display apparatus 200 can present the peripheral interface of the external device 500, no matter which mode is previously set as the image mode, the image mode is automatically set as the Dolby Vision Bright mode to control the brightness of the video content presented thereafter to be stable. Further, when the user selects a video window corresponding to a certain target video on the peripheral interface, the display apparatus will play a piece of content from the target video in the video window in Dolby Vision Bright mode, and the light and dark changes in the image will not appear when the content is played, so that the user can have a good preview experience.

Figure 30:
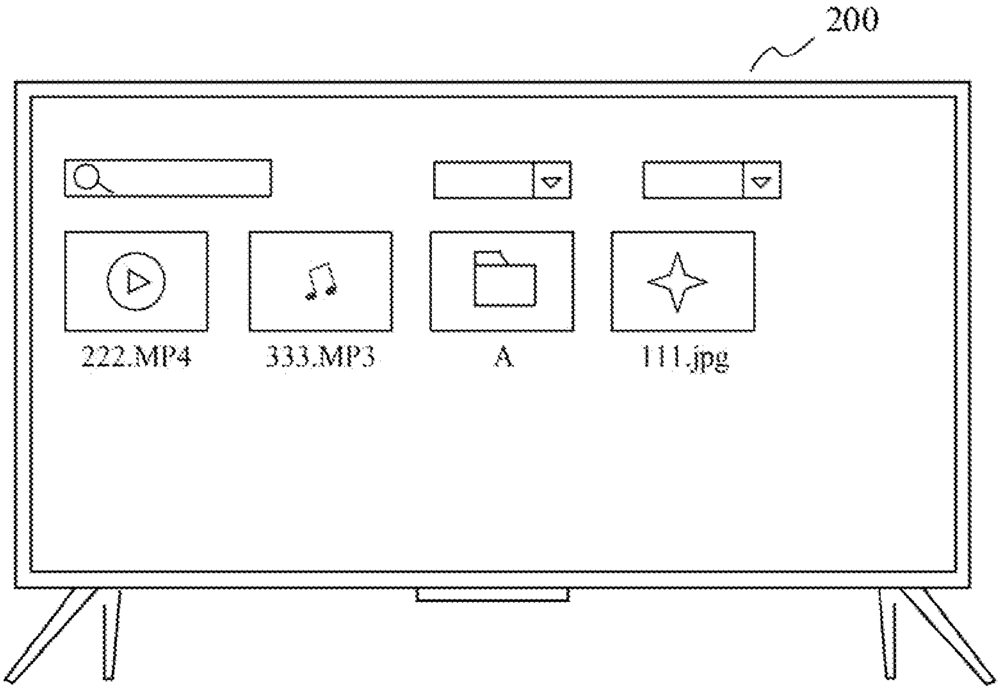
FIG. 30 is a schematic diagram of a file page on a display apparatus 200 according to some embodiments of the disclosure.
Figure 31:
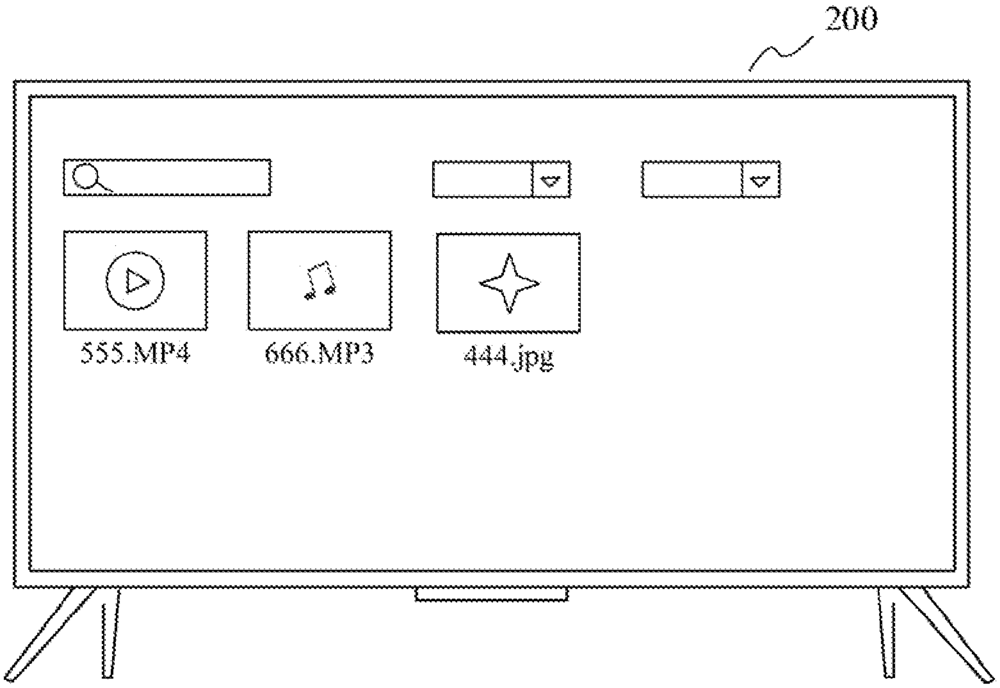
FIG. 31 is a schematic diagram of a file page corresponding to a folder A according to some embodiments of the disclosure.

FIG. 30 is a schematic diagram of a file page on a display apparatus 200 according to some embodiments of the disclosure. As shown in FIG. 30, the display 260 of the display apparatus 200 can present a file page including an image 111, a video 222, a music 333, and a folder A. A plurality of media files such as an image, a video and a music are also included in the folder A. If the user selects to open the folder A on the file page shown in FIG. 30, the display 260 continues to present the file page corresponding to the folder A. As shown in FIG. 31, the page corresponding to the folder A may further include an image 444, a video 555, a music 666, and the like.

When using the display apparatus 200 to view the above media files, the user may create a playlist, and add the media files of the same type to be played on the file page corresponding to the folder to the playlist one by one. However, for multi-level folders, the user can only select media files in the folder of the current level, and cannot select media files in other folders in the current level.

For example, on the file page as shown in FIG. 30, the user can only select a target file from the current media files such as the image, the video and the music to add to the playlist, and cannot open the folder A to continue to select during the process of creating the playlist, that is, the user cannot enter the file as shown in FIG. 31 from the file page as shown in FIG. 30 to add a certain target file on the file page in FIG. 31.

It can be seen that in the above method, it is impossible to add media files in multiple folders to the same playlist. Therefore, this method has certain limitations, and the user cannot free to select the content to be played.

Figure 32:
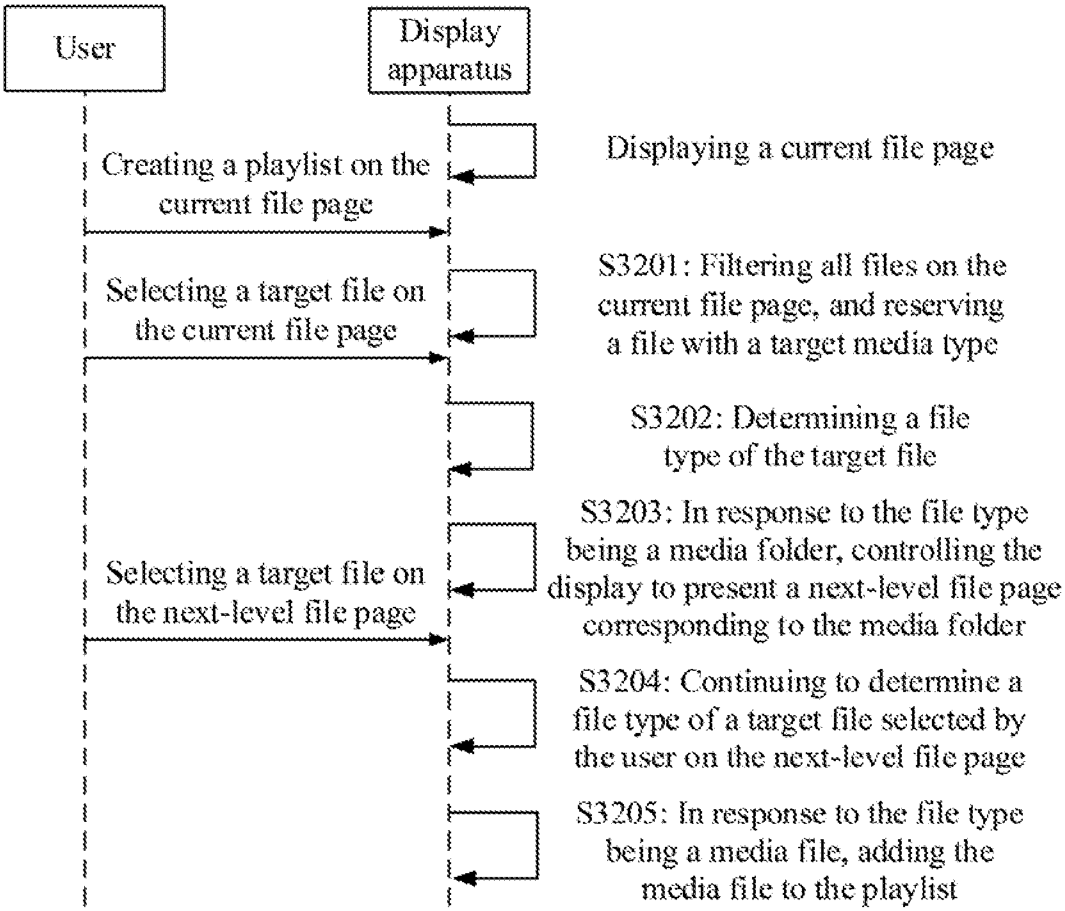
FIG. 32 is a flowchart of creating a playlist on a display apparatus 200 according to some embodiments of the disclosure.

In view of the above issues during creation of a playlist, a display apparatus 200 is provided according to some embodiments of the disclosure. The display apparatus 200 can include a display and a processor. Here, as shown in FIG. 32, the processor may be configured to perform following steps.

Step S3201: in response to an operation from the user to create a playlist on a current file page, all files on the current file page are filtered, and a file with a target media type is reserved.

All files on the current file page can include a media file and a media folder including the media file, for example, media files such as an image, a video, and a music shown in FIG. 30 described above and the folder A including the media file such as the image, the video, and the music shown in FIG. 31.

After the user opens a file page on the display apparatus 200, the user may send a command to the display apparatus 200 through the control device 100, such as a remote controller, to control the display apparatus to start creating a playlist. Alternatively, the user may also input a voice command, such as “create a playlist”, to the display apparatus 200 to control the display apparatus 200 to start creating a playlist.

In addition, media types of media files saved in playlists of different types are also different, for example, an image playlist correspondingly saves an image file, a music playlist correspondingly saves a music file, and a video playlist correspondingly saves a video file.

The user may proceed with selection for the playlist type after inputting a command to the display apparatus 200. After the user determines the desired playlist type, the display apparatus 200 can filter files that do not correspond to the type from the current file page, and simply presents only the files that correspond to the playlist type. According to some embodiments of the disclosure, the file corresponding to the playlist type is the file having the target media type.

Figure 33:
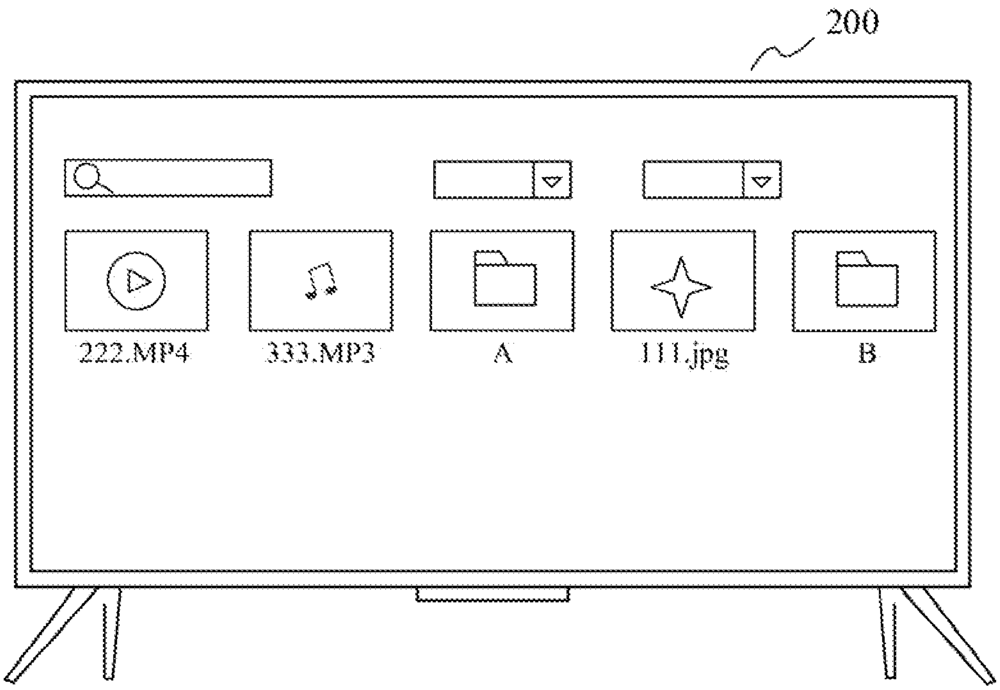
FIG. 33 is a schematic diagram of a current file page on a display apparatus 200 according to some embodiments of the disclosure.
Figure 34:
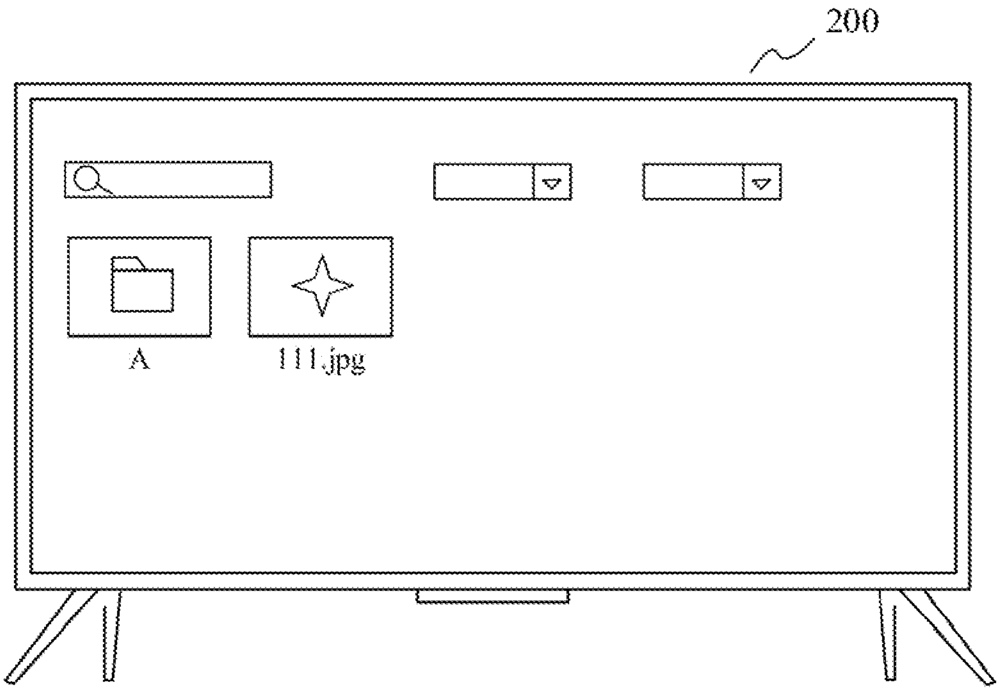
FIG. 34 is another schematic diagram of a current file page on a display apparatus 200 according to some embodiments of the disclosure.

FIG. 33 is a schematic diagram of a current file page on the display apparatus 200 according to some embodiments of the disclosure. As shown in FIG. 33, an image 111, a video 222, music 333, a folder A, and a folder B are originally presented on the current file page, and the folder A can include other images and videos, while the folder can include only other music. If the user selects to create an image playlist, as shown in FIG. 34, only the image 111 and the folder A including an image are presented on the current file page, and other media files and folders are not presented.

According to some embodiments of the disclosure, only the file with the target media type is presented, which is convenient for the user to select a target file.

Step S3202, in response to an operation from the user to select a target file on the current file page, a file type of the target file is determined.

When the user selects a target file on the current file page, the user may press through the control device 100 such as a remote controller to move a focus on the current file page to a position of the target file, and then press the "Confirm" key on the control device 100 such as a remote controller to input a selection command to the display apparatus 200, thereby completing the operation of selecting the target file. Alternatively, the user may also input a voice command, such as "select a video 555", to the display apparatus 200, to select the target file on the current file page.

Since all the files presented on the current file page may be media files or media folders including media files, the files also have two file types of media file and media folder.

Step S3203, in response to the file type being a media folder, the display is controlled to present a next-level file page corresponding to the media folder.

Files with the target media type can continue to be presented on the next-level file page, including media files and media folders. The user can continue to select the target file on the next-level file page.

Step S3204, a file type of a target file selected by the user on the next-level file page is determined.

If the file type of the target file selected by the user on the next-level file page is still the media folder, the display continues to present the next-level file page corresponding to the media folder.

Step S3205, in response to the file type being a media file, the media file is added to the playlist.

In addition, in step S3204, if the file type of the target file selected by the user on the next-level file page is also a media file, the media file may also be added to the playlist.

Figure 35:
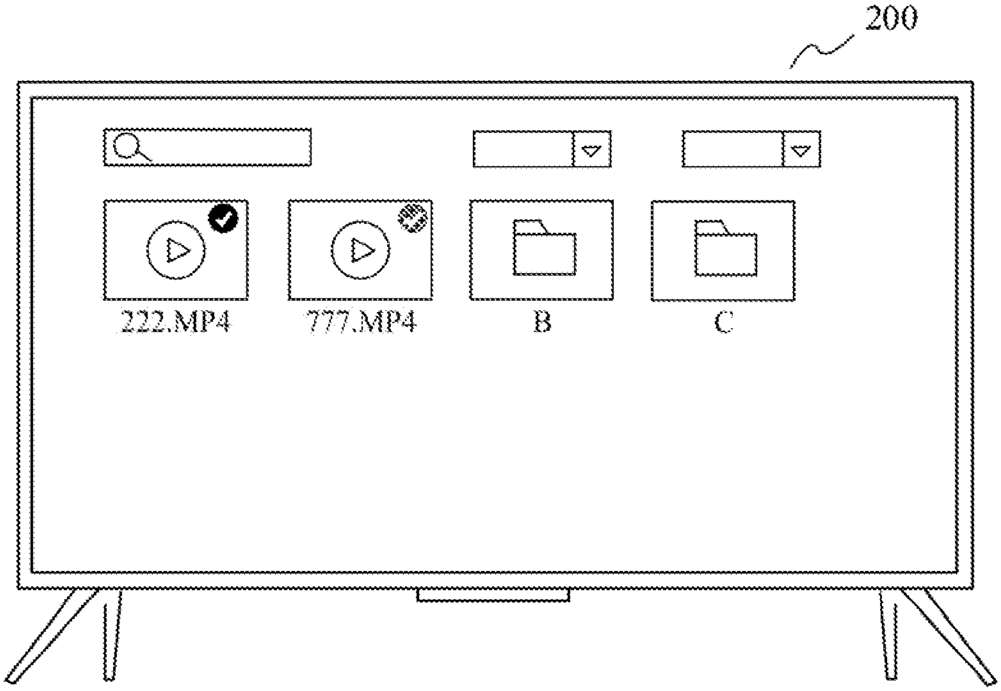
FIG. 35 is a schematic diagram of a media file having a selection control on a current file page according to some embodiments of the disclosure.

To facilitate the user's understanding of which media files have been added, selection can control may also be provided on those media files having a target media type. FIG. 35 is a schematic diagram of a media file having a selection control on a current file page according to some embodiments of the disclosure. As shown in FIG. 35, on the file page, video files and a video folder including video files are presented, and a selection control can be set at an upper right corner of each video file and presented in a form of a "check mark". The overall background of the selection control on the video file that is not added at present may be a light color, such as gray, and the transparency at the "check mark" is zero, so that the color at the "check mark" is the same as that of the video file, indicating that the video file is not selected; the overall background of the selection control on the added video file may be a dark color, such as green, black, etc., and the color at the "check mark" is the same as the color of the video file, so that the color of the added selection control is more prominent, indicating that the video file is selected, which is convenient for the user to view.

Figure 36:
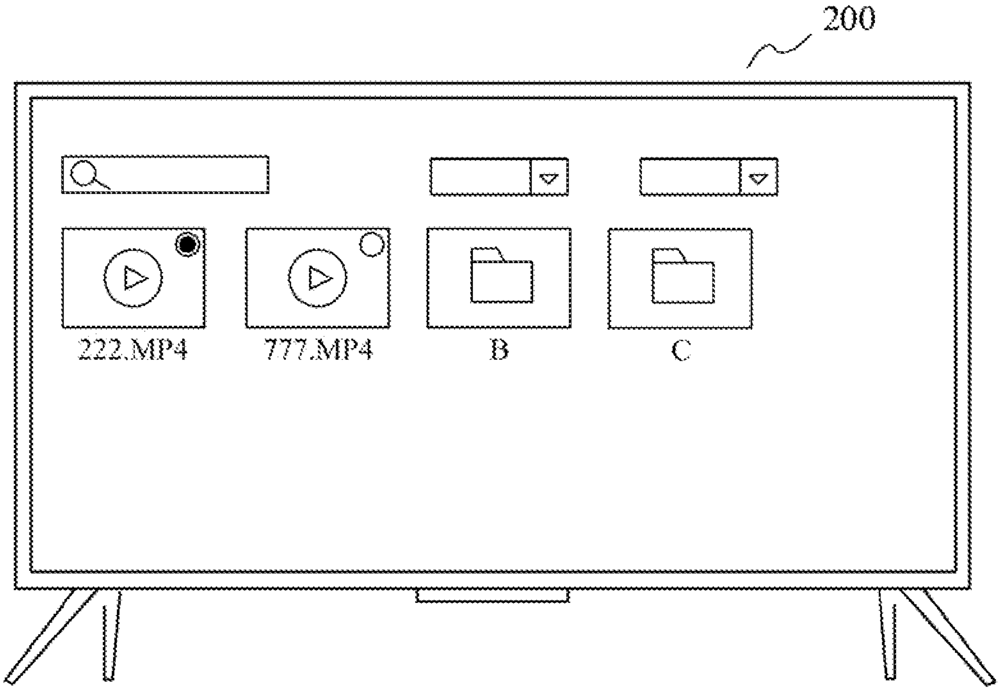
FIG. 36 is another schematic diagram of a media file having a selection control on a current file page according to some embodiments of the disclosure.

Alternatively, the selection control can also be presented as a "circle". FIG. 36 is another schematic diagram of a media file having a selection control on a current file page according to some embodiments of the disclosure. As shown in FIG. 36, the selection control on the video file that is not added may be a light gray hollow circle, indicating that the video file is not selected; while the selection control on the added video file may be a solid circle, and the solid circle may be green, indicating that the video file is selected.

The display apparatus 200 according to some embodiments of the disclosure may change an originally unselectable folder into a selectable folder when the user creates a playlist, and continue to present contents saved in the folder for the user to select after the user selects the folder. In this way, instead of only being able to select the file he/she wants to play on a current file page of a folder, the user can select files he/she wants to play from multiple folders, thereby avoiding the limitation for adding media files to be played when creating the playlist.

Figure 37:
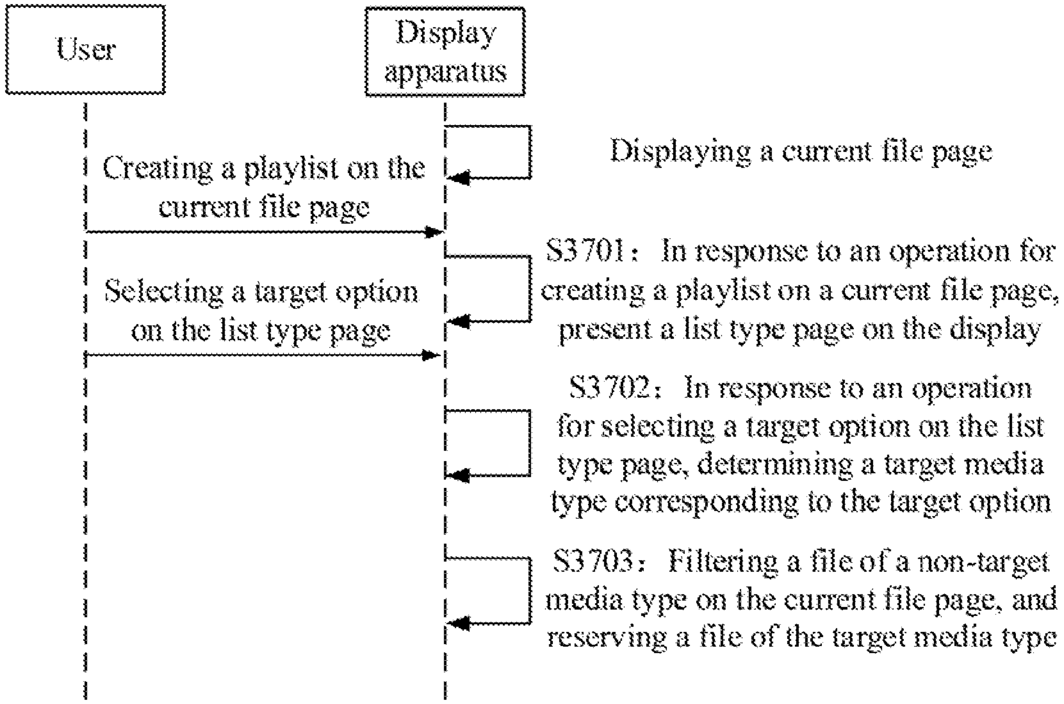
FIG. 37 is a flowchart of filtering a file of a non-target media type on a display apparatus 200 according to some embodiments of the disclosure.

In some embodiments, in order to facilitate the user to select the playlist type to be created, the display apparatus 200 may further present a list type page to the user after the user selects to create the playlist on the current file page. In this process, as shown in FIG. 37, the processor in the display apparatus may be further configured to execute instructions to perform following steps.

Step S3701, in response to an operation for creating a playlist on a current file page, present a list type page on the display.

Figure 38:
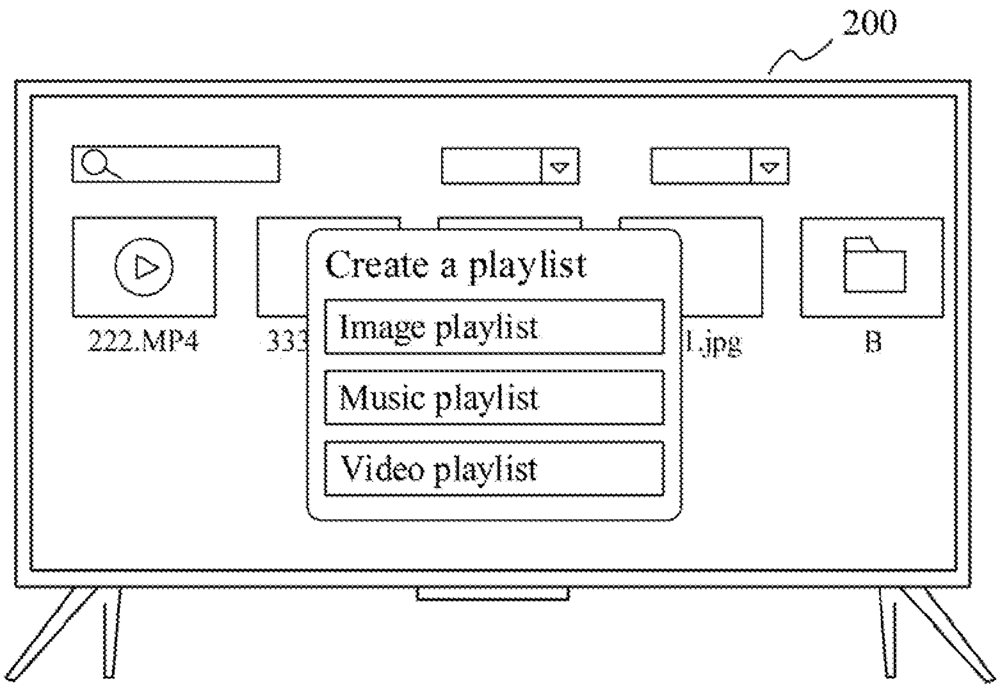
FIG. 38 is a schematic diagram of a list type page on a display apparatus 200 according to some embodiments of the disclosure.

FIG. 38 is a schematic diagram of a list type page on a display apparatus according to some embodiments of the disclosure. As shown in FIG. 38, type options such as an image playlist, a music playlist, and a video playlist may be presented on the list type page. If the user wants to select a certain type option, the user may press a key on the control device 100 such as a remote controller to move a focus to a target option, and then press a "Confirm" key to complete the operation of selecting the target option. Alternatively, the user inputs a voice command such as "select an image playlist" or the like to the display apparatus 200, thereby completing the operation of selecting the target option.

Step S3702: in response to an operation for selecting a target option on the list type page, determining a target media type corresponding to the target option.

The image playlist corresponds to an image media type, the music playlist corresponds to a music media type, and the video playlist correspond to a video media type. That is, only image files are saved in the image playlist, only music files are saved in the music playlist, and only video files are saved in the video playlist.

Step S3703, filtering a file of a non-target media type on the current file page, and reserving a file of the target media type.

After the user selects an image playlist, only the image file and the folder including the image file are presented on the current file page. After the user selects a music playlist, only the music file and the folder including the music file are presented on the current file page. After the user selects a video playlist, only the video file and the folder including the video file are presented on the current file page.

The above filtering operation can take out a large number of files of non-target media types for the user, thereby narrowing the selection range for the user. For example, before filtering, 15 media files and media folders may be presented on the current file page, but only 12 media files may be presented on a file page at most. In this case, the user also needs to scroll down to check whether the other 3 files that are not presented are the target files to be selected. After filtering, only 8 media files and media folders with the target media type may be reserved on the current file page, so the user can only select from these 8 media files and media folders, and there is no need to do page-scrolling for viewing.

After the above filtering operation, a plurality of media files with the target media type may be determined on the file page. If the user wants to add all of the media files to the playlist, it may be necessary to select the media files one by one. For example, if there are 5 media files on the current file page, the user needs to select the media files 5 times; if there are 10 media files on the current file page, the user needs to select the media files 10 times. It can be seen that the more media files that can be selected on the current file page, the more times the user manually selects the media files when he/she wants to add all the media files to the playlist.

Figure 39:
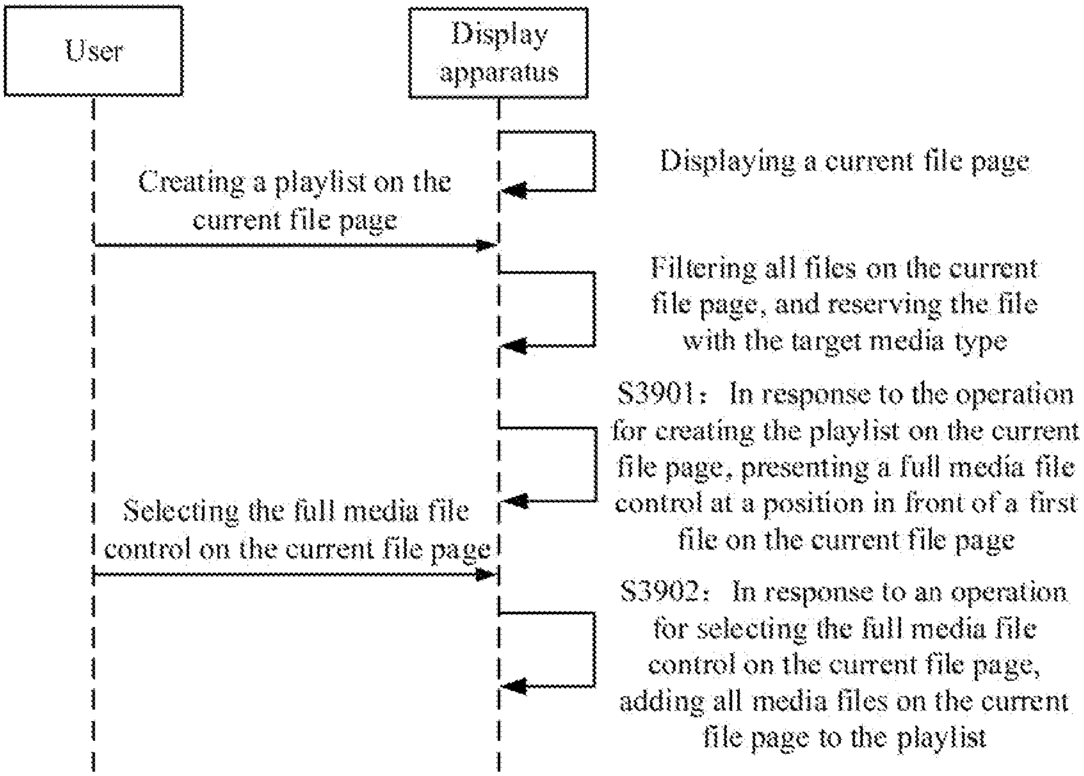
FIG. 39 is a schematic flow chart of adding a media file by using a full media file control on a display apparatus 200 according to some embodiments of the disclosure.

In order to avoid the complicated operation from the user manually selecting the media files for a plurality of times, in some embodiments, as shown in FIG. 39, the processor(s) in he display apparatus may be further configured to execute instructions to perform following steps.

Step S3901: after filtering all files on the current file page, and reserving the file with the target media type, in response to the operation for creating the playlist on the current file page, presenting a full media file control at a position in front of a first file on the current file page. As described in the foregoing embodiments, the first file may be a first media file or a first media folder.

Figure 40:
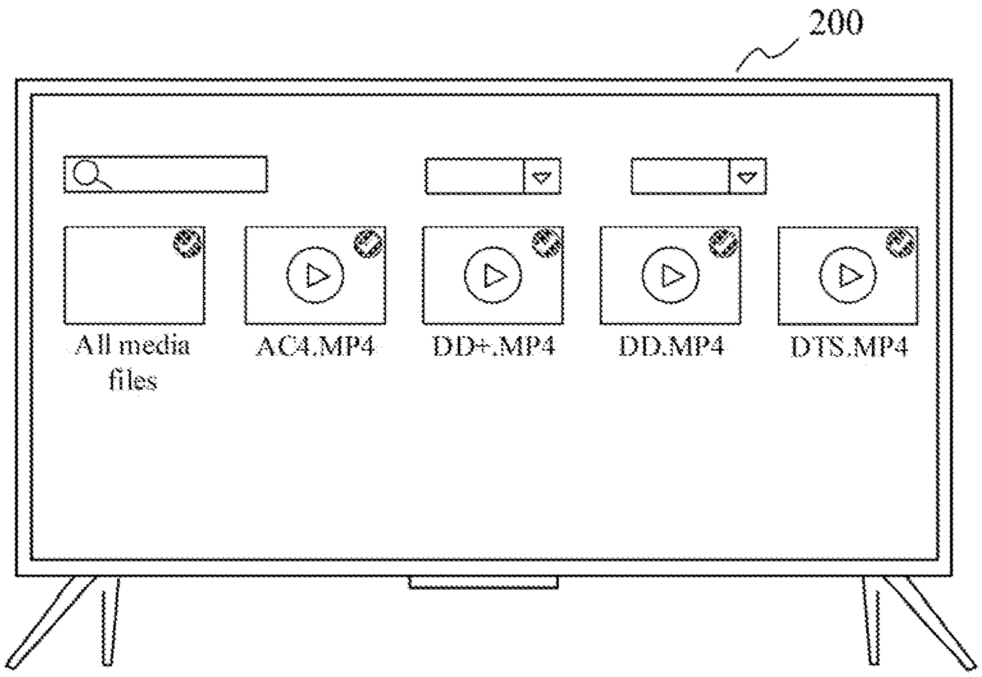
FIG. 40 is a schematic diagram of a file page with a full media file control on a display apparatus 200 according to some embodiments of the disclosure.

FIG. 40 is a schematic diagram of a file page with a full media file control on the display apparatus according to some embodiments of the disclosure. As shown in FIG. 40, the first file originally presented on the current file page should be a media file named "AC4", but after the above filtering process, the media file "AC4" is now at the second position, and a full media file control named "all media file" is presented at the first position.

If the user wants to select all the media files on the current file page, the user may press a key on the control device 100 such as a remote controller to control a focus to move to the full media file control, and then press a "Confirm" key to realize the operation of selecting the full media file control. Alternatively, the user inputs a voice command, such as "select all media files", to the display apparatus to realize the operation of selecting the full media file control.

Step S3902, in response to an operation for selecting the full media file control on the current file page, adding all media files on the current file page to the playlist.

After the user selects the full media file control, all the media files on the current file page become selected and are added to the playlist. After all the media files are selected, the user can still continue to select the media folder on the current file page, and then control the display 260 to present the next-level file page. On the next-level file page, similarly, a full media file control is presented at a position in front of a first file. The user may continue to select all media files on the next-level file page to add to the playlist.

It should be noted that the sequence in which media files are saved in the playlist is the sequence in which the user adds the media files. When the media files are played according to the playlist, the play sequence is also the same as the added sequence of the respective media files. If all the media files on the current file page are selected to be added to the playlist at one time, the media files can be added to the playlist in sequence from left to right and from top to bottom according to positions of the media files on the current file page. In this case, the play sequence of the respective media files in the playlist can be the position sequence of the respective media files on the current file page.

Figure 41:
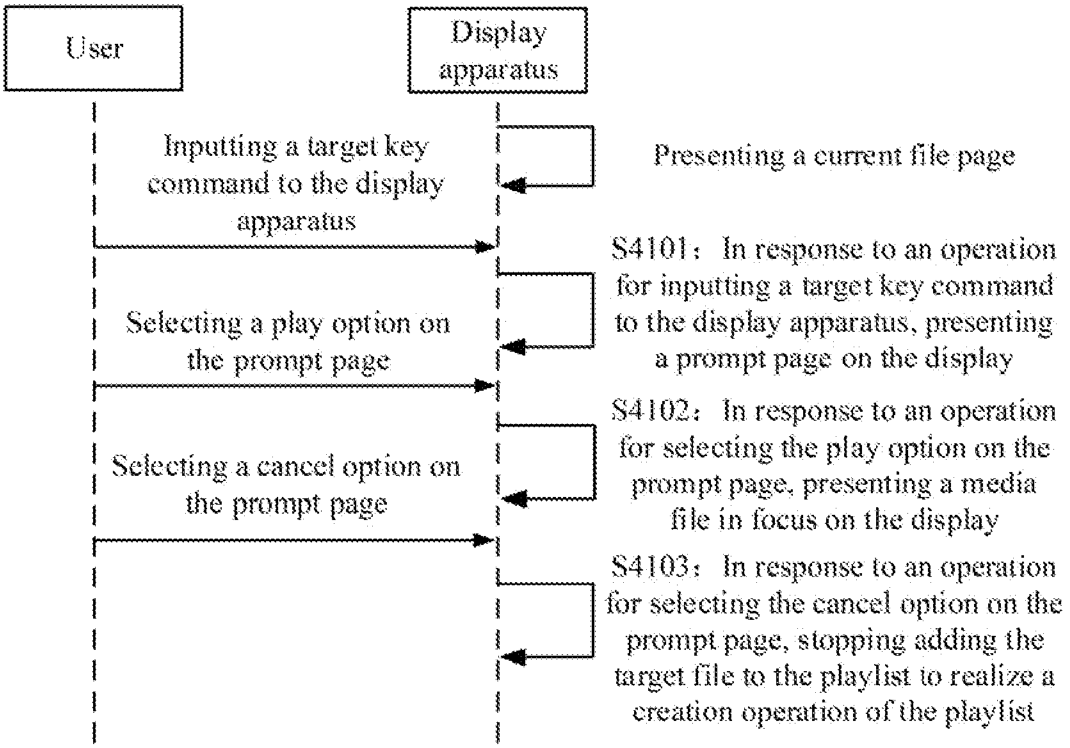
FIG. 41 is a flowchart of prompting a page on a display apparatus 200 according to some embodiments of the disclosure.

The user may choose to end the operation of creating a playlist after the desired media files have been added to the playlist. Alternatively, the user can immediately play the current media file in the process of selecting to add the media file. Accordingly, in some embodiments, as shown in FIG. 41, the processor(s) in the display apparatus may be further configured to execute instructions to perform following steps.

Step S4101, in response to an operation for inputting a target key command to the display apparatus, presenting a prompt page on the display.

The target key command may refer to a command sent from the user by pressing a target key on the control device 100 such as a remote controller, for example, pressing a "Menu" key on the remote controller, or pressing a "Home" key on the remote controller, etc.

Figure 42:
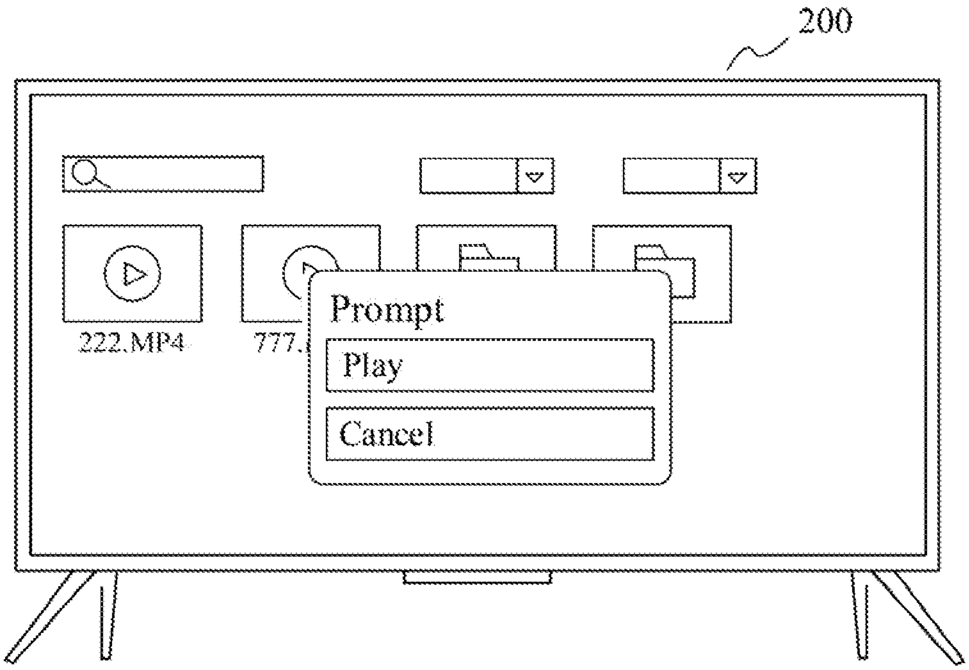
FIG. 42 is a schematic diagram of a prompt page on a display apparatus 200 according to some embodiments of the disclosure.

FIG. 42 is a schematic diagram of a prompt page on the display apparatus according to some embodiments of the disclosure. As shown in FIG. 42, a play option and a cancel option are included on the prompt page. If the user wants to directly play a certain file during the process of adding a media file, the user may press the target key as described above after a focus is positioned at a position of a certain target media file, so as to control the display to present a prompt page, and then select a "Play" option on the prompt page. If the user wants to end the operation of creating the playlist, the user can press the target key as described above at any time, regardless of where the focus is positioned, so as to control the display to present the prompt page, and then select a "Cancel" option on the prompt page.

In addition, in the step S101 of the foregoing embodiments, on the current file page, the user may also input a command to the display apparatus by pressing the target key as described above, so as to control the display apparatus to start creating a playlist.

Step S4102, in response to an operation for selecting the play option on the prompt page, presenting a media file in focus on the display.

The operation for selecting the play option on the prompt page may be that the user moves the focus to the "play" option by pressing a key on the control device such as a remote controller, and then presses a "Confirm" key on the control device. Alternatively, the user inputs a voice command such as "select to play" or the like to the display apparatus.

The media file in current focus can refer to the media file that the user has selected on the current file page before the prompt page is presented. For example, the user moves the focus to the media file named "AC4" on the file page as shown in FIG. 40, and then presses the target key, and the display can present a prompt page as shown in FIG. 42. On the prompt page shown in FIG. 42, if the user selects the "Play" option, the display will directly play the media file named "AC4" on the file page shown in FIG. 40.

Step S4103: in response to an operation for selecting the cancel option on the prompt page, stopping adding the target file to the playlist to realize a creation operation of the playlist.

The operation for selecting the cancel option on the prompt page may be that the user moves the focus to the "Cancel" option by pressing a key on the control device such as a remote controller, and then presses a "Confirm" key on the control device. Alternatively, the user inputs a voice command such as "select to cancel" or the like to the display apparatus 200.

After the playlist is created, all file pages on the display apparatus enter a normal browsing mode. That is, after the user selects a certain media file on the file page, the display 260 will directly play the media file; or, after the user selects a certain media folder on the file page, the display will further present a next-level file page corresponding to the media folder.

At present, when selecting various function options or files on the display apparatus 200, it is necessary to first determine an object to be selected by focus move. Generally, the focus has no memory function, that is, after the user selects a folder on a file page and enters a next-level file page corresponding to the folder by using the focus, when the user selects to go back to a previous file page, the focus will be directly positioned to a position of a first file on the previous file page.

Figure 43:
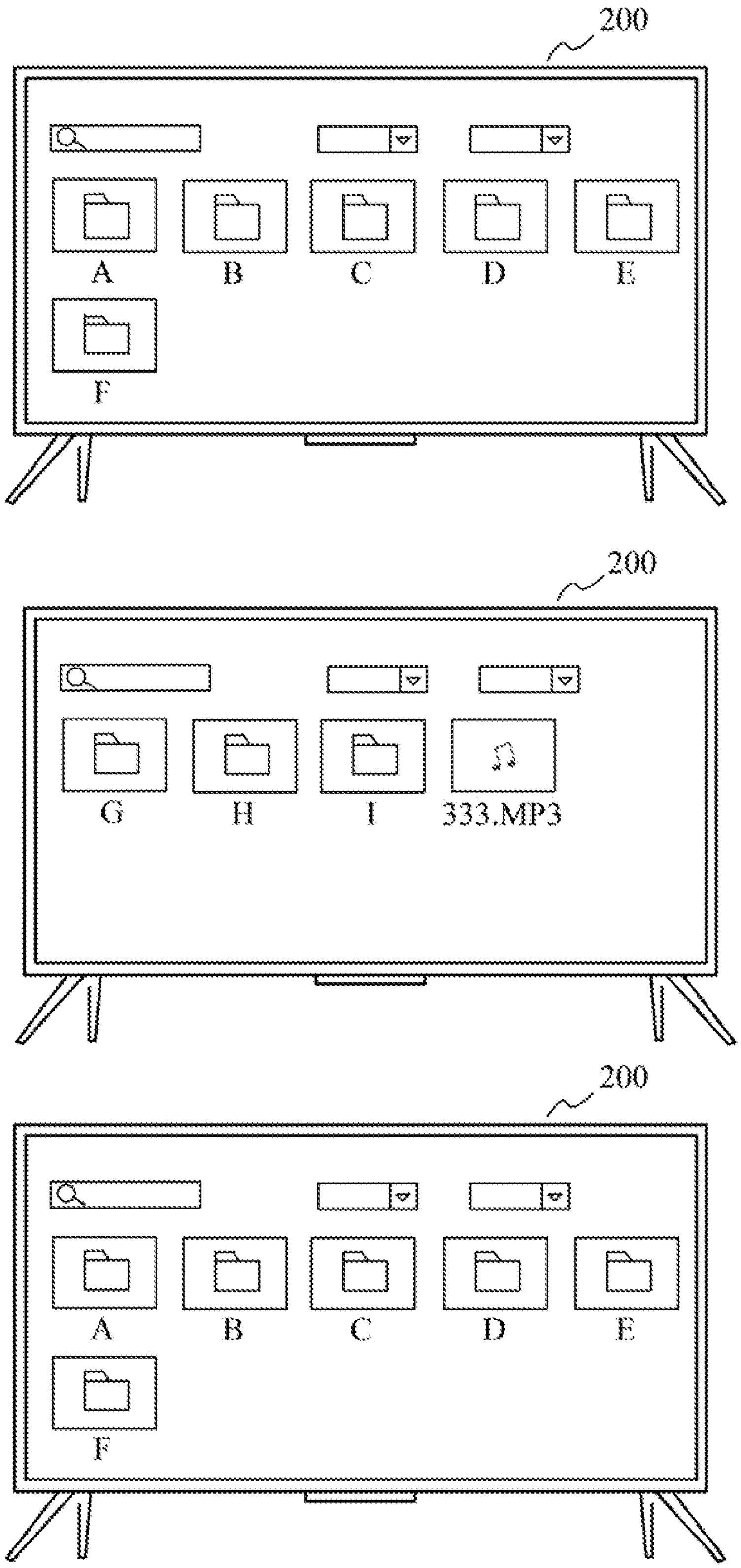
FIG. 43 is a schematic diagram of a first-level file page on a display apparatus 200 according to some embodiments of the disclosure.

As shown in an upper portion of FIG. 43, a folder A, a folder B, a folder C, a folder D, a folder E, and a folder F are presented on a first-level file page. After moving a focus to a position of the folder E on the first-level file page and confirming to select the folder E, the display 260 may skip to present a second-level file page under the folder E, and in this case, the focus may be directly positioned to a position of a first file. As shown in a middle part of FIG. 43, a folder G, a fold H, a folder I, and music 333 are presented on the second-level file page, and the focus is positioned to the area of the folder G.

On the second-level file page, the user selects to go back to the first-level file page. In this case, the display may present the page as shown at the upper part of FIG. 43, but the focus is also located at the position of the first folder A, as shown in a bottom part of FIG. 43.

It can be seen that if the focus has no memory function, then after the user returns from the second-level file page to the first-level file page, because the focus is repositioned to the position of folder A, if the user wants to continue viewing contents in folder F after folder E, the focus needs to be moved again so as to reposition the focus to the position of folder F. In this operation mode, when the user needs to view contents from the respective folders in sequence, the user needs to repeatedly move the focus, thereby affecting the user's experience of using the display apparatus.

Figure 44:
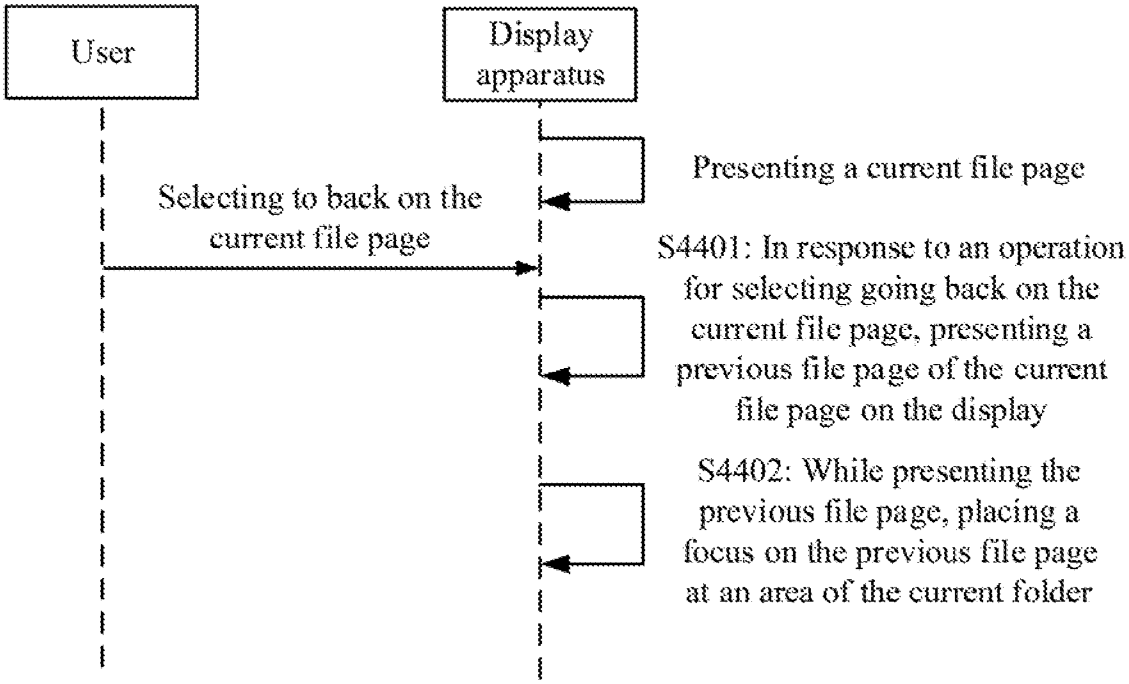
FIG. 44 is a flowchart of controlling focus positioning on a display apparatus 200 according to some embodiments of the disclosure.

In view of the above issues, in some embodiments, the display apparatus may land the focus on the position of the folder of the current file page on the previous file page when the user selects to go back to the previous file page from the current file page. In this process, as shown in FIG. 44, the processor(s) in the display apparatus may be configured to execute instructions to perform following steps.

Step S4401, in response to an operation for selecting going back on the current file page, presenting a previous file page of the current file page on the display.

The previous file page can present a current folder in which the current file page is located. For example, as shown in the upper part of FIG. 43 and the middle part of FIG. 43, if the current file page is a page shown in the middle part of FIG. 43, then the previous file page of the current file page is a page shown in the upper part of FIG. 43.

Step S4402: while presenting the previous file page, placing a focus on the previous file page at an area of the current folder.

Still taking the upper part and middle part of FIG. 43 as an example, when the display 260 is presenting the previous file page as shown in the upper part of FIG. 43, the focus can be directly positioned at the position of the folder E, so that the focus has a memory function. In this way, when the user returns to the previous file page as shown in the upper part of FIG. 43, if he/she wants to continue to view contents in the folder F, he/she only needs to press a right direction key on the remote controller once to quickly position the focus to the position of the folder F.

In some embodiments, when implementing the above steps S4401-S4402, in order to enable the focus to have a memory function, a position list may be created to record a position of the focus, and whenever the user selects a folder to open, the processor will add a position of the folder into the position list. When the user selects to return to the previous file page, the processor(s) may obtain this position from the list, and when presenting the previous file page, the focus is made to be positioned to the folder at this position, thus realizing the memory function of the focus.

Figure 45:
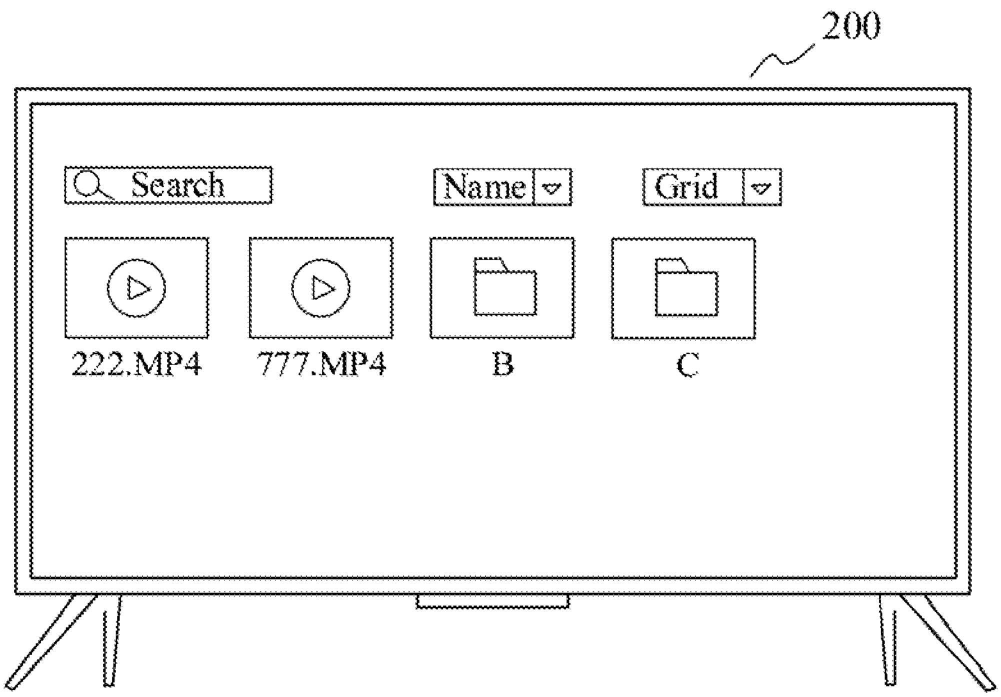
FIG. 45 is a schematic diagram of a file page with a search box on a display apparatus 200 according to some embodiments of the disclosure.

FIG. 45 is a schematic diagram of a file page with a search box on the display apparatus 200 according to some embodiments of the disclosure. As shown in FIG. 45, the search box, and filter menu drop-down, etc. are presented at the top of the file page. Typically, the search box and filter menu drop-down, etc., are present on every file page. The user may input a name, a keyword, a full name, etc. in the search box to search for a file to be viewed; or the user may also select a filtering condition in the drop-down menu, and after confirmation, the display apparatus 200 will filter files on the current file page according to the filtering condition and present a target file meeting the filtering condition.

In some cases, when the display 260 is presenting a previous file page, the focus may be first positioned to the search box at the top of the file page as shown in FIG. 45 because it takes a certain amount of time for data to be loaded, and after the data is loaded, the focus may be returned to a certain folder. In this case, the user can see the skip process of the focus very intuitively, which may cause a bad experience for the user. To avoid this situation, in some embodiments, the processor(s) in the display apparatus may set the search box to an unselectable state during the data loading process, and the focus cannot be positioned to the search box in this case. After the data loading is completed, the processor sets the search box to a selectable state. This not only ensures that the phenomenon of focus skip will not occur, but also ensures that the search function can be used normally.

It can be seen from the above that the display apparatus according to some embodiments of the disclosure can change an originally unselectable folder into a selectable folder when the user creates a playlist, and continue to present contents saved in the folder for selecting after the user selects the folder. In this way, instead of only being able to select the file he/she wants to play on a current file page of one folder, the user can select files he/she wants to play from multiple folders, thereby avoiding the limitation for adding media files to be played when creating the playlist.

In view of the issues in creating a playlist in the foregoing embodiments, some embodiments of the disclosure further provide a method for creating a playlist on a display apparatus. The method can be applied to the display apparatus of the foregoing embodiments, and can be implemented by the processor(s) in the display apparatus. The method may specifically include following steps.

Step 101, in response to an operation for creating a playlist on a current file page, all files on the current file page is filtered, and a file with a target media type is reserved.

All files on the current file page can include a media file and a media folder including a media file.

Step 102, in response to an operation for selecting a target file on the current file page, a file type of the target file is determined.

Step 103, based on that the file type is a media folder, a next-level file page corresponding to the media folder is presented.

Step 104, a file type of a target file selected by the user on the next-level file page is further determined.

Step 105, based on that the file type is a media file, the media file is added to the playlist.

The method for creating the playlist on the display apparatus in the embodiments of the disclosure can be applied to the display apparatus as in the foregoing embodiments, and can be implemented by the processor(s) in the display apparatus.

It is also noted that the display apparatus generally receives audio and video data through a physical channel. The physical channel generally can include a signal source such as AV (Audio Video, composite video interface), component, HDMI (High Definition Multimedia Interface), VGA (Spike Video Game Awards, a video image adapter). The HDMI is widely used in the display apparatus because the HDMI can transmit uncompressed high-definition video and multi-channel audio data with high quality. There will be multiple channels of HDMI on the display apparatus, and each channel of HDMI corresponds to a HDMI control. Some users rename HDMI control to make the HDMI control to be easily distinguished. The method for rename an HDMI on the existing display apparatus can include following steps: when an HDMI control is required to be renamed, a user firstly selects the HDMI control required to be renamed, and a display can present an input interface at this moment, where the input interface can include a device control and a custom name control associated with the HDMI, and the custom name control is located below the device control. When the content presented on the display skips to the input interface, a focus is on the topmost device control, and the user needs to control the focus to move to the custom name control. When the focus is moved to the custom name control, the display can present a renaming port in response to a confirmation command from user. The user can enter a custom name on the renaming port. According to the method for renaming the HDMI on the conventional display apparatus, when the user selects an HDMI control for renaming, the user also needs to control the focus to move to the custom name control, so that the control process is complicated, and the user experience is poor.

Figure 46:
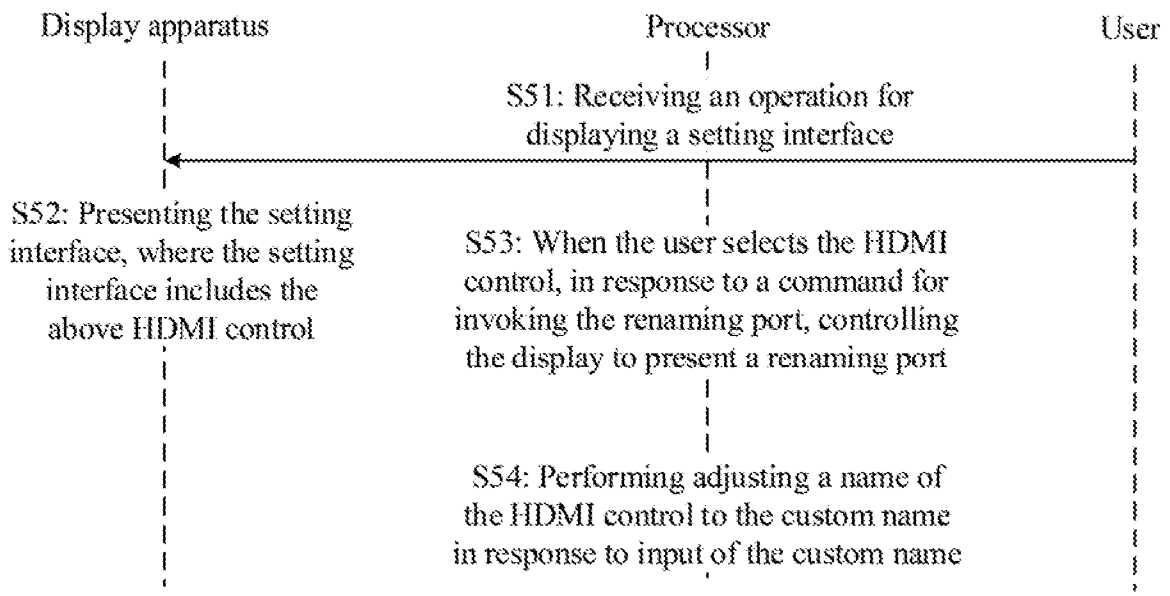
FIG. 46 is a flowchart of interaction between a display apparatus and a user according to some embodiments of the disclosure.

In view of the above issue, some embodiments of the disclosure provide a display apparatus, and the structure and functions of each part of the display apparatus may refer to the above embodiments. In addition, based on the display apparatus shown in the above embodiments, some functions of the display apparatus are further optimized in some embodiments, referring to FIG. 46, which is a flow chart of interaction between the display apparatus and the user according to some embodiments.

step S51: receiving an operation for displaying a setting interface.

There are many ways to display the setting interface, for example, the setting interface can be presented on a menu interface; for example, a voice assistant can be set in the display apparatus, and the setting interfaces can be displayed via voice command.

Step 52: presenting the setting interface, where the setting interface includes the above HDMI control.

Figure 47:
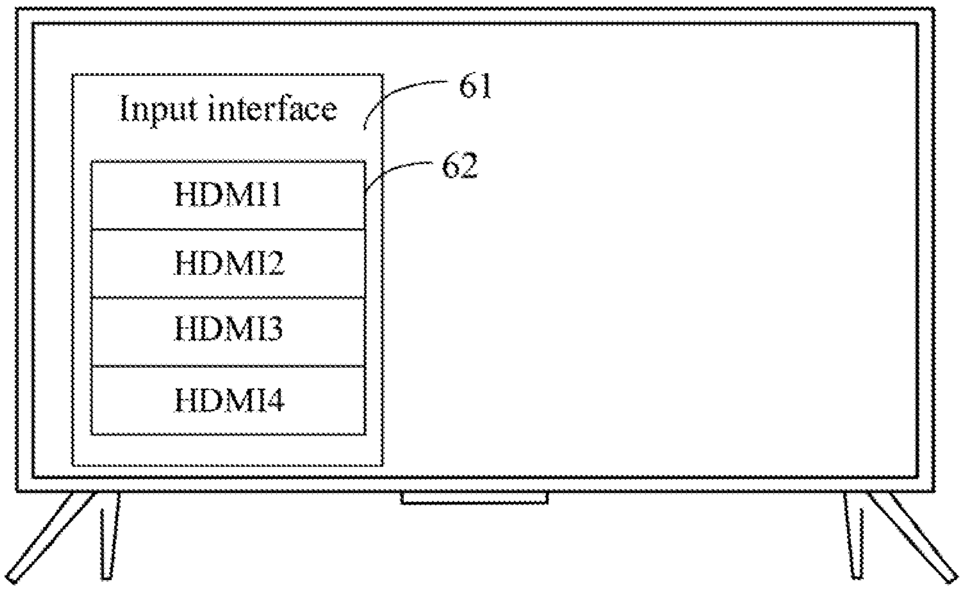
FIG. 47 is a display showing a setting interface according to some embodiments of the disclosure.

In some embodiments, the setting interface can include a HDMI control. The setting interface is described below in combination with specific drawings. FIG. 47 is a display presenting a setting interface according to some embodiments. It can be seen that there are multiple HDMI controls 62 on a prompt interface 61. The user can control the display to enter the input interface by selecting the HDMI control 62. The input interface will be described later.

When the user selects the HDMI control, in response to a command for invoking the renaming port, controlling the display to present a renaming port (S53), where the renaming port is used for receiving a custom name input from the user.

There are many ways for the user to select the HDMI control. For example, when the focus is on the HDMI control, the processor(s) can count the time duration that the focus stays on the HDMI control. If the time duration that the focus stays on the HDMI control is greater than a preset time, then the user selects the HDMI control. For another example, when the focus is on the HDMI control, if the user selects a confirmation key on the remote controller, then the user selects the HDMI control.

There are many ways to control the display to present the renaming port. The following describes a way to control the display to present the renaming port in combination with specific drawings.

Figure 48:
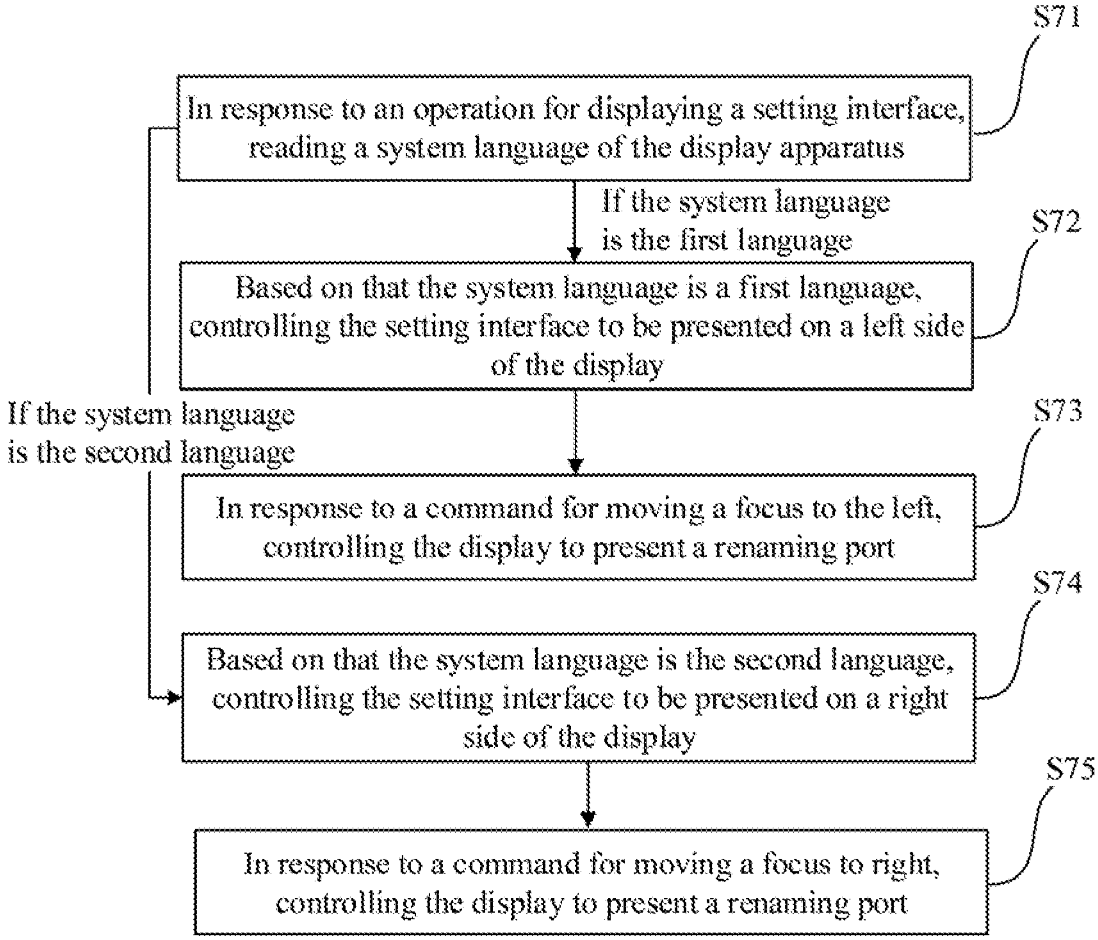
FIG. 48 is a flow chart of controlling a display to present a renaming port according to some embodiments of the disclosure.

FIG. 48 is a flow diagram of controlling a display to present a renaming a port according to some embodiments. The processor can be configured to perform steps S71-S75.

S71, in response to an operation for displaying a setting interface, reading a system language of the display apparatus.

S72, based on that the system language is a first language, controlling the setting interface to be presented on a left side of the display.

Text in most languages is presented from left to right (these languages may be referred to as a first language in some embodiments). When the system language of the display apparatus is set as the first language, an interface presented by the display is presented on the left side of the display. However, words of some languages are presented from right to left, for example, Hebrew, Persian, Arabic, etc. (these languages may be referred to as a second language in the present embodiments). When the system language of the display apparatus is set as the first language, the interface is presented on the left side of the display, and when the system language of the display apparatus is set as the second language, the interface is presented on the right side of the display. In order to meet requirements of more users, languages applicable to the display can be divided into the first language and the second language, when the current language of the display equipment is the first language, a setting interface is presented on the left side of the display, and when the current language of the display equipment is the second language, the setting interface is presented on the right side of the display.

Figure 49:
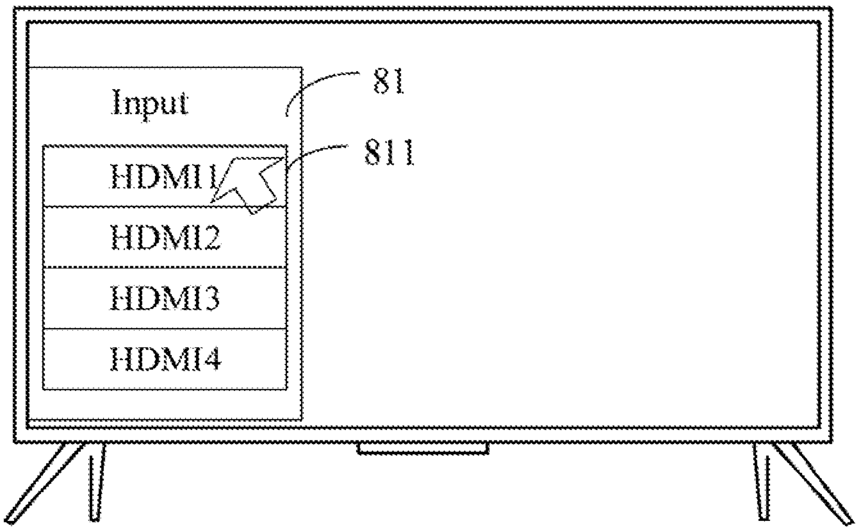
FIG. 49 is a schematic diagram of a display presenting a setting interface according to some embodiments of the disclosure.

A presenting mode of the setting interface when the language of the display apparatus is set as the first language is described below in combination with specific drawings. FIG. 49 is a schematic diagram of a display presenting a setting interface according to some embodiments. FIG. 49 shows a display presenting a setting interface 81 located on the left side of the display. The setting interface is provided with a plurality of HDMI controls 811, and the HDMI controls 811 are sequentially arranged from top to bottom. When the display presents the setting interface, one of the controls on the setting interface gets focus. Some embodiments do not limit the control that gets the focus, for example, the control that gets the focus may be the control presented at the top. For example, the control that gets the focus can be the control that is invoked the most times.

S73, in response to a command for moving a focus to the left, controlling the display to present a renaming port.

Continuing to refer to FIG. 49, FIG. 49 illustrates some embodiments where a control that gets a focus is a control presented at the top. The user can control the focus to move by pressing the "up", "down" and "left" keys on the remote control. For example, in some embodiments, the user may control the focus to move downward by selecting the "down" key. In some embodiments, the user may control the focus to move upward by pressing the "up" key. In some embodiments, if there is another interface on the right side of the setting interface, the user can control the focus to move to the another interface by pressing the "right" key. Because the focus is located on the setting interface, and the setting interface is located on the left side of the display, the focus cannot continue to move to the left when the user selects the "left" key. Based on the above reasons, in order to achieve the purpose of key multiplexing, in an application scenario where the setting interface is located on the left side of the display, the display is controlled to present a renaming port in response to a selection of the left key from a user.

Figure 50:
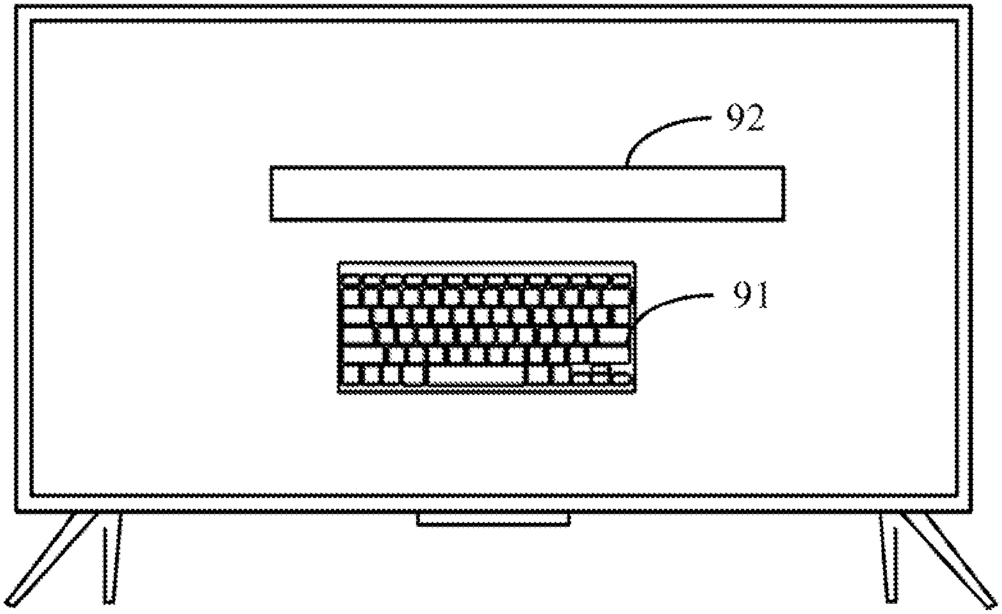
FIG. 50 is a display presenting a renaming port according to some embodiments of the disclosure.

The renaming port is described below with reference to the accompanying drawings, in which FIG. 50 is a display presenting a renaming port according to some embodiments. The user may enter a custom name into a renaming port 92 via a soft keyboard 91.

S74, based on that the system language is the second language, controlling the setting interface to be presented on a right side of the display.

Figure 51:
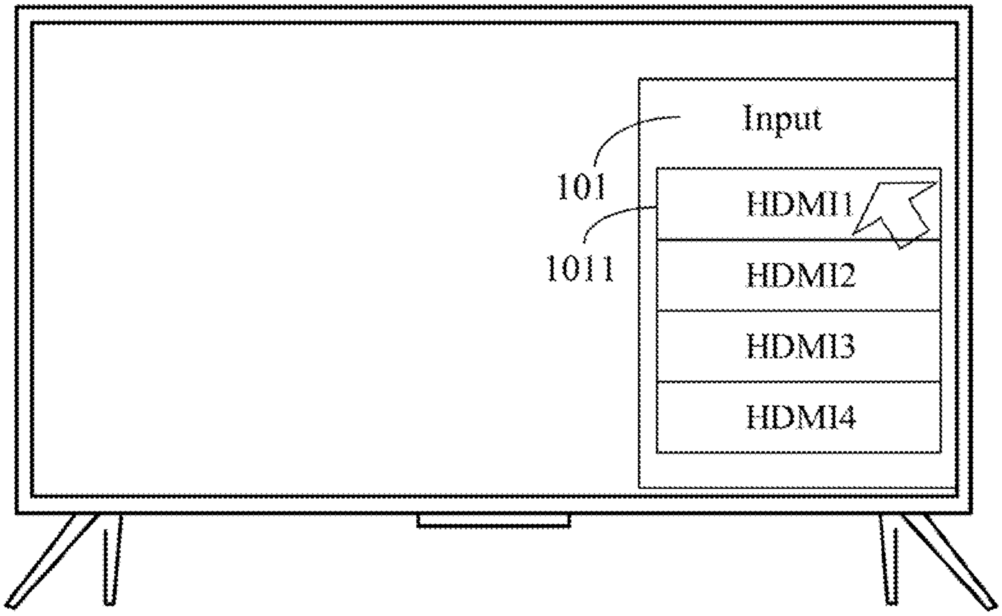
FIG. 51 is a schematic diagram of a display presenting a setting interface according to some embodiments of the disclosure.

A presenting mode of the setting interface when the language of the display apparatus is set as the second language is described below in combination with specific drawings. FIG. 51 is a schematic diagram of a display presenting a setting interface according to some embodiments. FIG. 51 shows a display presenting a setting interface 101, and the setting interface 101 is located on the right side of the display. The setting interface is provided with a plurality of HDMI controls 1011, and the HDMI controls 1011 are sequentially arranged from top to bottom. When the display presents the setting interface, one of the controls on the setting interface gets a focus.

S75, in response to a command for moving a focus to right, controlling the display to present a renaming port.

Continuing referring to FIG. 51, FIG. 51 illustrates some embodiments where a control with focus is a control presented at the top. The user can control the focus to move by pressing the "up", "down" and "left" keys on the remote control. For example, in some embodiments, the user may control the focus to move downward by selecting the "down" key. In some embodiments, the user may control the focus to move upward by selecting the "up" key. In some embodiments, if there are other interfaces on the left side of the setting interface, the user can control the focus to move to another interface by selecting the "left" key. Because the focus is located on the setting interface, and the setting interface is located on the right side of the display, the focus cannot continue to move to right when the user selects the "right" key. Based on the above reasons, in order to achieve the purpose of key multiplexing, in an application scenario where the setting interface is located on the right side of the display, the display is controlled to present a renaming port in response to a touch of the user on the right key.

The process for renaming the port is described below in combination with specific embodiments.

Figure 52:
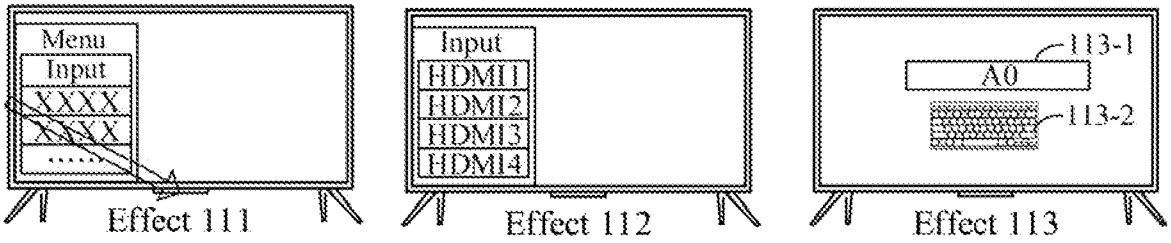
FIG. 52 is a diagram of a change in a display presenting an interface during a process of invoking a renaming port according to some embodiments of the disclosure.

FIG. 52 is a diagram illustrating a change in a display presenting an interface during a process of invoking a renaming port according to some embodiments. In some embodiments, the user invokes a menu interface, and the content presented by the display can refer to the effect 111. The user can control the display to present a setting interface by selecting an input control. In this case, the content presented by the display can refer to the effect 112. In some embodiments, the display apparatus are provided with four HDMI channels, so four HDMI controls are presented on the setting interface. In some embodiments, the system language of the display apparatus is the first language, and the setting interface is located on the left side of the display. In some embodiments, when the setting interface is presented, the focus is on the HDMI1 control. The user selects the HDMI1 control by selecting a confirmation key on the remote control. Then the user selects the "left" key of the remote controller to control the display to present a renaming port. In this case, the content presented by the display can refer to the effect 113. It can be seen that the display can present a renaming port 113-1 and a soft keyboard 113-2. The soft keyboard gets the focus. The user can use the remote controller to control the focus to move on the soft keyboard to realize input of a custom name. In some embodiments, the custom name input from the user is "A0".

Figure 53:
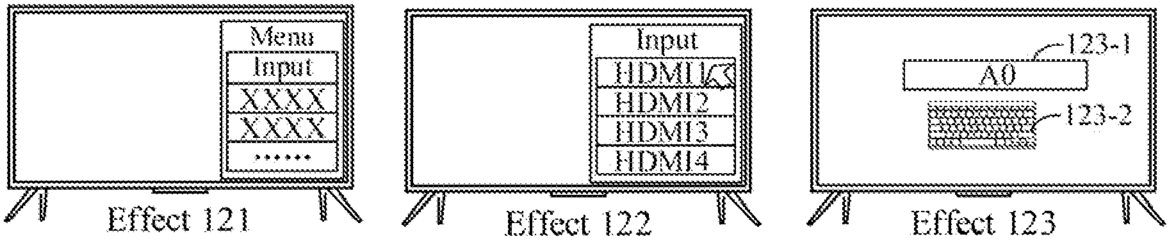
FIG. 53 is a diagram of a change in a display presenting an interface during a process of invoking the renaming port according to some embodiments of the disclosure.

FIG. 53 is a diagram illustrating a change in a display presenting an interface during a process of invoking a renaming port according to some embodiments. In some embodiments, the user invokes a menu interface, and the content presented by the display can refer to the effect 121. The user can control the display to present a setting interface by selecting an input control. In this case, the content presented by the display can refer to the effect 122. In some embodiments, the display apparatus are provided with four HDMI channels, so four HDMI controls are presented on the setting interface. In some embodiments, the system language of the display apparatus is the second language, and the setting interface is located on the right side of the display. In some embodiments, when the setting interface is presented, the focus is on the HDMI1 control. The user selects the HDMI1 control by selecting a confirmation key on the remote control. Then the user selects the "right" key of the remote controller to control the display to present a renaming port. In this case, the content presented by the display can refer to the effect 123. It can be seen that the display can present a renaming port 123-1 and a soft keyboard 123-2. The soft keyboard gets the focus. The user can use the remote controller to control the focus to move on the soft keyboard to realize input of a custom name. In some embodiments, the custom name input from the user is "A0".

Figure 54:
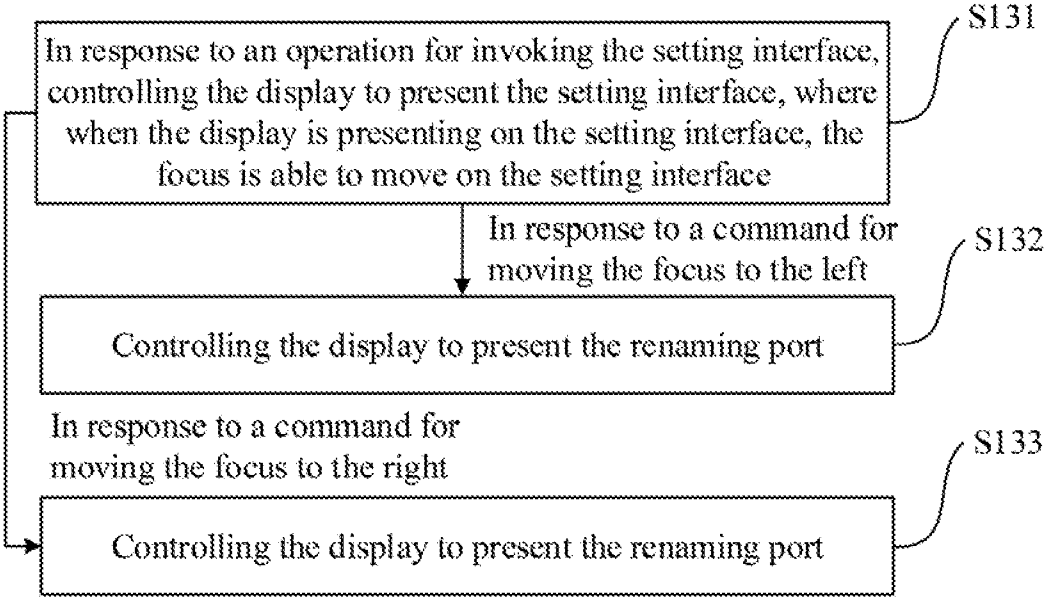
FIG. 54 is a flow chart of controlling a display to present a renaming port according to some embodiments of the disclosure.

FIG. 54 is a flow diagram of controlling a display to indicate a renaming port, according to some embodiments. The processor(s) can be configured to perform steps S131-S133.

S131, in response to an operation for invoking the setting interface, controlling the display to present the setting interface, where when the display is presenting on the setting interface, the focus is able to move on the setting interface.

S132, in response to a command for moving the focus to the left, controlling the display to present the renaming port.

In some embodiments, the user can control the movement of the focus by selecting the "up" and "down" keys of the remote controller. In some embodiments, since the focus only moves on the setting interface, when the user selects the "left" key, the focus cannot continue to move to the left. Based on the above reasons, in order to achieve the purpose of key multiplexing, in the disclosure, the display is controlled to present the renaming port in response to a selection of the left key only in a scenario where the focus moves on the setting interface.

S133, in response to a command for moving the focus to the right, controlling the display to present the renaming port.

In some embodiments, the user can control the movement of the focus by selecting the "up" and "down" keys of the remote controller. In some embodiments, since the focus only moves on the setting interface, when the user selects the "right" key, the focus cannot continue to move to the right. Based on the above reasons, in order to achieve the purpose of key multiplexing, the display is controlled to present the renaming port in response to a selection on the right key only in a scenario where the focus moves on the setting interface.

For example, the setting interface can be presented at any position or area of the display, and the user can control the display to present the renaming port by pressing a preset key on the remote controller for a long time. The preset key can be set as required, for example, the preset key can be a "Confirm" key.

The setting interface can be presented at any position or area of the display, and the user can control the display to present the renaming port by selecting multiple keys of the remote controller at the same time. In some embodiments, the number of virtual touch keys is not limited, and the number of virtual touch keys may be set as required. For example, in some embodiments, the user can select the "left" key and the "right" key at the same time to control the display to present the renaming port.

The setting interface can be presented at any position of the display, a new key may be added on the basis of the existing remote controller, and the user can control the display to present the renaming port by selecting the newly added key.

The processor(s) can perform adjusting a name of the HDMI control to the custom name in response to input of the custom name (S54).

The display apparatus according to some embodiments can include a display and a processor, where when the focus moves to the HDMI control, the processor(s) can control the display to present the renaming port in response to the command for invoking the renaming port, and the renaming port can be used for receiving a custom name input from the user; in response to input of the custom name, the processor adjusts the name of the HDMI control to the custom name. In the display apparatus according to some embodiments, in the process of renaming the HDMI control, the user only needs to output the command for invoking the renaming port, and does not need to control the focus to move to the custom name control in the input interface. According to the display apparatus according to some embodiments, the process of renaming the HDMI control is simple, and the user experience is better.

There are multiple channels of HDMI on the display apparatus, and a channel of HDMI corresponds to a HDMI control. If the HDMI controls are not renamed, a presenting sequence of the HDMI controls corresponds to an arrangement sequence of physical ports on the display apparatus. For example, the display apparatus is provided with four physical ports which are respectively a physical port 1, a physical port 2, a physical port 3 and a physical port 4, and a HDMI 1 control, a HDMI 2 control, a HDMI 3 control and a HDMI4 control are sequentially presented from top to bottom if the HDMI control is not renamed. The user can know that the physical port 1 corresponds to the HDMI1 control, the physical port 2 corresponds to the HDMI2 control, and the physical port 3 corresponds to the HDMI3 control. The presenting sequence of the HDMI controls of the existing display apparatus is determined by the names of the HDMI controls, and when the user renames the HDMI control, the presenting sequence of the HDMI can control is changed, and the user cannot know the corresponding relation between the physical port and the HDMI control.

In view of the above issues, the display apparatus is further improved in some embodiments. In some embodiments, each of the HDMI controls corresponds to a serial number, and the HDMI controls are arranged on the setting interface according to the sequence of the corresponding serial numbers.

Figure 55:
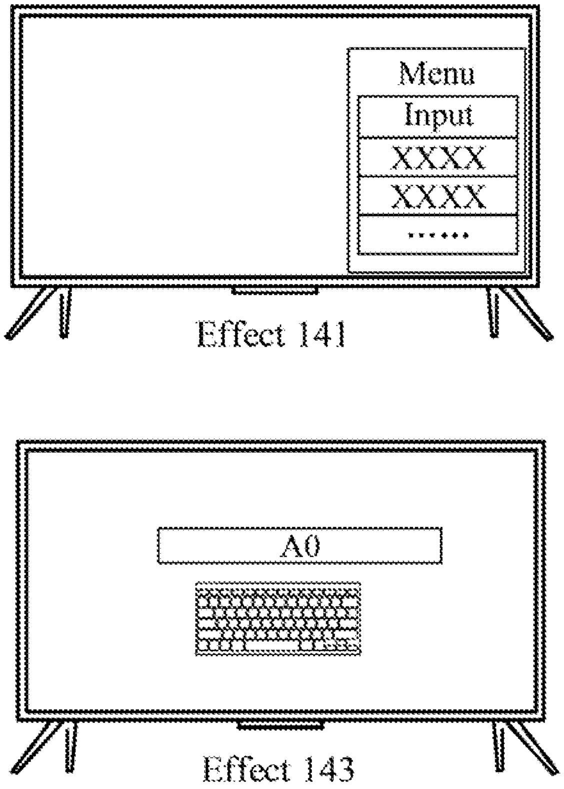
FIG. 55 is a diagram of a change in a display presenting an interface during a process of renaming the HDMI control according to some embodiments of the disclosure.

FIG. 55 is a diagram of change in a display presenting an interface during HDMI control renaming according to some embodiments. In some embodiments, the user invokes a menu interface, and the content presented on the display can refer to the effect 141. The user can control the display to present the setting interface by selecting the input control. In this case, the content presented by the display can refer to the effect 142. It can be seen that the setting interface can present the HDMI 1 control, the HDMI 2 control, the HDMI3 control and the HDMI4 control from top to bottom sequentially. The user selects the HDMI3 control through a confirmation key on the remote control. Then the user selects the "right" key on the remote controller to control the display to present a renaming port. In this case, the content presented by the display can refer to the effect 143, and it can be seen that the display can present a renaming port and a soft keyboard. The soft keyboard gets the focus, and the user can use the remote controller to control the focus to move on the soft keyboard to realize input of the custom name. In some embodiments, the custom name input from the user is "A0", and the content presented by the display in this case can refer to the effect 144.

According to the display apparatus according to some embodiments, HDMI controls are arranged on the setting interface according to a sequence of corresponding serial numbers. Even if the HDMI controls are renamed, a presenting sequence of the HDMI controls in the setting interface will not be changed, and the user can know the corresponding relationship between the physical port and the HDMI control, so that the user experience is better.

The input interface does not include a custom control; and the display apparatus according to some embodiments may rename an HDMI control in the manner according to above embodiments, so that the custom control may not be configured in the input interface.

The processor is further configured to, when the focus is moved to the HDMI control, control the display to present an input interface in response to a confirmation operation from the user, the input interface including a custom control, and when the focus is moved to the custom control, control the display to present a renaming port in response to a confirmation operation from the user. Renaming the HDMI control by using the custom control in the input interface is a method for renaming the HDMI control known by most users. Therefore, in some embodiments, the custom control in the input interface is reserved.

In a scenario where the user renames the HDMI control by using the custom control in the input interface, the user may not know a shortcut naming method of the HDMI control (the shortcut naming method is the HDMI control renaming method according to above embodiments). In order to help the user understand the shortcut naming method of the HDMI control, some embodiments further improves the display apparatus. Specifically, the processor(s) is further configured to, when the focus moves to a custom control, control the display to present a prompt interface in response to a confirmation operation from the user, where the prompt interface can include prompt words, and the prompt words are used for prompting the user a method for invoking the renaming port.

Figure 56:
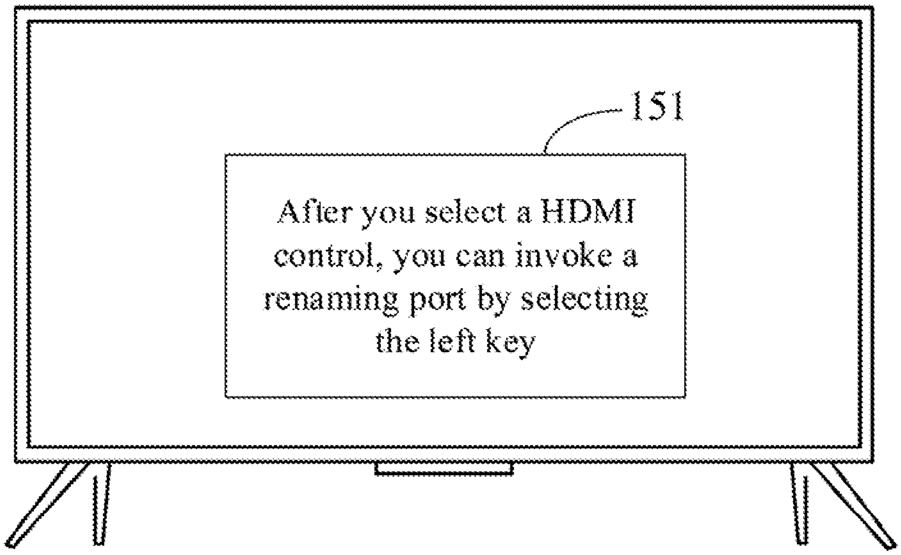
FIG. 56 is a display presenting a prompt interface according to some embodiments of the disclosure.

The prompt interface is described below in conjunction with specific drawings. FIG. 56 is a display presenting a prompt interface according to some embodiments. The prompt interface 151 can include prompt words, and the prompt words can be "After you select a HDMI control, you can invoke a renaming port by selecting the left key". It should be noted that some embodiments only exemplarily shows prompt words, and does not limit the specific content of the prompt words. In a process, any embodiment that can be used to prompt the user to invoke the renaming port can be applied as prompt words.

According to the display apparatus in some embodiments, when the user moves the focus to the custom control, the display can present a prompt interface, and the prompt interface may prompt the user of a shortcut naming method to help the user better understand functions of the display apparatus, so that the user experience is better.

In order to help the user to know the shortcut naming method of the HDMI control, the display apparatus is further improved in some embodiments. Specifically, the processor is further configured to control the display to present a prompt interface in response to an operation for invoking a setting interface, where the prompt interface can include prompt words for prompting the user of a method for invoking the renaming port.

According to the display apparatus in some embodiments, when the user invokes the setting interface, the display can present a prompt interface, and the prompt interface may prompt the user of a shortcut naming method to help the user better understand the functions of the display apparatus, so that the user experience is better.

In some embodiments, the prompt interface further can include a no more prompt control, and the display no longer present the prompt interface in response to a selection of the no more prompt control.

In some embodiments, the prompt interface further can include a set control, the display can present the setting interface in response to a selection of the set control, and the user can set how long the display can present the prompt interface at intervals on the setting interface. Some embodiments of the disclosure further show a method for naming an HDMI control, the method can include: when a user selects an HDMI control, in response to a command for invoking a renaming port, the display is controlled to present a renaming port, where the renaming port is used for receiving a custom name input from the user; based on input of the custom name is completed, a name of the HDMI control is adjusted to the custom name.

The method for naming the HDMI control according to some embodiments is applicable to the display apparatus, and the display apparatus can include the display and the processor(s). When the focus moves to the HDMI control, the processor(s) can control the display to present the renaming port in response to a command for invoking the renaming port, and the renaming port is used for receiving the custom name input from the user; in response to input of the custom name being completed, the processor adjusts the name of the HDMI control to the custom name. In the display apparatus according to some embodiments, in the process of renaming the HDMI control, the user only needs to output a command for invoking the renaming port, and does not need to control the focus to move to the custom name control in the input interface. According to the display apparatus in some embodiments, the process of renaming the HDMI control is simple, and the user experience is better.

What is claimed is:

1. A display apparatus, comprising:

a display, configured to present content from an external device or a user interface;

a communicating device, configured to connect with one or more external devices;

one or more processors in connection with the display and the communicating device and configured to execute instructions to cause the display apparatus to:

receive a first command on a first user interface from a user, wherein the first user interface is a user interface corresponding to content from a first external device, and the first command is used for indicating to present a first shortcut list;

in response to the first command, present the first shortcut list on the first user interface, wherein the first shortcut list is a movable shortcut list and comprises:

device names of the one or more external devices in connection with the display apparatus, and a skip control for indicating to present a designated page in a designated external device, a device name of the designated external device being in the first shortcut list, and a device name of a second external device different from the first external device being in the first shortcut list, wherein the skip control has a text input region for receiving a text corresponding to a to-be-presented interface input by the user;

receive a first selection command for indicating to present content from the second external device;

in response to the first selection command, switch the first user interface to a second user interface which is a user interface corresponding to the content from the second external device, and record the first user interface;

receive the first command on the second user interface after the first user interface is switched to the second user interface;

in response to the first command, present the first shortcut list on the second user interface;

receive a second selection command for indicating to present content from the first external device; and in response to the second selection command, obtain the first user interface, and switch the second user interface to the first user interface.

2. The display apparatus according to claim 1, wherein the first command is selected from the group consisting of: key value information of a designated key combination, designated voice information, key value information of a designated key, designated gesture information, or designated focus information.

3. The display apparatus according to claim 1, wherein the one or more processors are configured to execute the instructions to cause the display apparatus to:

receive a browsing command for browsing the first shortcut list, wherein the browsing command is used for indicating a to-be-browsed external device, and a device name of the to-be-browsed external device is in the first shortcut list; and in response to the browsing command, present a sub-list on the first user interface, wherein the sub-list corresponds to a position of the to-be-browsed external device in the first shortcut list, and the sub-list comprises preview information of the to-be-browsed external device.

4. The display apparatus according to claim 1, wherein the first shortcut list further comprises a first edit control for indicating to enable a function of editing an item in the first shortcut list.

5. The display apparatus according to claim 1, wherein the first user interface comprises a main content which is able to be presented in parallel with other content, and the one or more processors are further configured to execute the instructions to cause the display apparatus to:
- receive a second command for indicating to present a second shortcut list on the first user interface;
- in response to the second command, present the second shortcut list on the first user interface;
- receive a first edit command for indicating to present a target sub-content from the second shortcut list, wherein the second shortcut list comprises a sub-content from the first external device which is able to be presented together with the main content; and
- in response to the first edit command, present a third user interface comprising the main content and the target sub-content.

6. The display apparatus according to claim 5, wherein the one or more processors are further configured to execute the instructions to cause the display apparatus to:
- based on that the main content or the target sub-content is a content with no image, present the third user interface comprising overview information of the content with no image.

7. The display apparatus according to claim 1, wherein the first user interface further comprises a first content which is able to be edited based on a command, and the one or more processors are further configured to execute the instructions to cause the display apparatus to:
- receive a third command for indicating to present a third shortcut list on the first user interface; and
- in response to the third command, present the third shortcut list on the first user interface, wherein
  - the third shortcut list comprises a second content which is able to be edited, a second edit control, and a third edit control,
  - the second edit control is used for indicating a presentation state of the second content,
  - the third edit control is used for indicating to present a fourth shortcut list, and
  - the fourth shortcut list comprises available content from the first external device which is able to be added to the second content.

8. The display apparatus according to claim 7, wherein the one or more processors are further configured to execute the instructions to cause the display apparatus to:
- receive a second edit command for the second edit control or the third edit control, wherein the second edit command is used for indicating to change the presentation state of the second content and/or indicating to add designated available content to the second content; and
- in response to the second edit command, update the second content in the third shortcut list, and replace the first content in the first user interface with the updated second content from the third shortcut list.

9. A method for a display apparatus, comprising:
- receiving a first command on a first user interface from a user, wherein the first user interface is a user interface corresponding to content from a first external device, and the first command is used for indicating to present a first shortcut list;
- in response to the first command, presenting the first shortcut list on the first user interface, wherein the first shortcut list is a movable shortcut list and comprises:
  - device names of one or more external devices in connection with the display apparatus, and
  - a skip control for indicating to present a designated page in a designated external device, a device name of the designated external device being in the first shortcut list, and a device name of a second external device different from the first external device being in the first shortcut list,
  - wherein the skip control has a text input region for receiving a text corresponding to a to-be-presented interface input by the user;
- receiving a first selection command for indicating to present content from the second external device;
- in response to the first selection command, switching the first user interface to a second user interface which is a user interface corresponding to the content from the second external device, and record the first user interface;
- receive the first command on the second user interface after the first user interface is switched to the second user interface;
- in response to the first command, present the first shortcut list on the second user interface;
- receive a second selection command for indicating to present content from the first external device; and
- in response to the second selection command, obtain the first user interface, and switch the second user interface to the first user interface.

10. The method according to claim 9, wherein the first command is selected from the group consisting of: key value information of a designated key combination, designated voice information, key value information of a designated key, designated gesture information, or designated focus information.

11. The method according to claim 9, further comprising:
- receiving a browsing command for browsing the first shortcut list, wherein the browsing command is used for indicating a to-be-browsed external device, and a device name of the to-be-browsed external device is in the first shortcut list; and
- in response to the browsing command, presenting a sub-list on the first user interface, wherein the sub-list corresponds to a position of the to-be-browsed external device in the first shortcut list, and the sub-list comprises preview information of the to-be-browsed external device.

12. The method according to claim 9, wherein the first shortcut list further comprises a first edit control for indicating to enable a function of editing an item in the first shortcut list.

13. The method according to claim 9, wherein the first user interface comprises a main content which is able to be presented in parallel with other content, and the method further comprises:
- receiving a second command for indicating to present a second shortcut list on the first user interface;
- in response to the second command, presenting the second shortcut list on the first user interface;
- receiving a first edit command for indicating to present a target sub-content from the second shortcut list, wherein the second shortcut list comprises a sub-content from the first external device which is able to be presented together with the main content; and in response to the first edit command, presenting a third user interface comprising the main content and the target sub-content.

14. The method according to claim 13, further comprising:

based on that the main content or the target sub-content is a content with no image, presenting the third user interface comprising overview information of the content with no image.

15. The method according to claim 9, wherein the first user interface further comprises a first content which is able to be edited based on a command, and the method further comprises:

receiving a third command for indicating to present a third shortcut list on the first user interface; and in response to the third command, presenting the third shortcut list on the first user interface, wherein the third shortcut list comprises a second content which is able to be edited, a second edit control, and a third edit control, the second edit control is used for indicating a presentation state of the second content, the third edit control is used for indicating to present a fourth shortcut list, and the fourth shortcut list comprises available content from the first external device which is able to be added to the second content.

16. The method according to claim 15, further comprising:

receiving a second edit command for the second edit control or the third edit control, wherein the second edit command is used for indicating to change the presentation state of the second content and/or indicating to add designated available content to the second content; and in response to the second edit command, updating the second content in the third shortcut list, and replacing the first content in the first user interface with the updated second content from the third shortcut list.

* * * * *